United States Patent
Enright et al.

(10) Patent No.: US 8,165,707 B2
(45) Date of Patent: Apr. 24, 2012

(54) ENTERPRISE FACTORY CONTROL METHOD AND SYSTEM

(75) Inventors: Kerry J. Enright, South Burlington, VT (US); Thomas D. Furland, Essex Junction, VT (US); David B. Lutton, II, Cambridge, VT (US); Michael J. Maslack, Colchester, VT (US); Steven R. Pike, East Fairfield, VT (US)

(73) Assignee: International Business Machines Corporation, Armonk, NY (US)

(*) Notice: Subject to any disclaimer, the term of this patent is extended or adjusted under 35 U.S.C. 154(b) by 141 days.

(21) Appl. No.: 11/834,187

(22) Filed: Aug. 6, 2007

(65) Prior Publication Data

US 2008/0009959 A1    Jan. 10, 2008

Related U.S. Application Data

(63) Continuation of application No. 10/904,536, filed on Nov. 15, 2004, now Pat. No. 7,305,278.

(51) Int. Cl.
G06F 19/00 (2011.01)
(52) U.S. Cl. .................. 700/115; 700/103; 700/108
(58) Field of Classification Search .......... 700/29, 700/95–97, 99, 100, 103, 121, 108, 115; 705/8, 10, 28; 709/203, 223, 224
See application file for complete search history.

(56) References Cited

U.S. PATENT DOCUMENTS

| | | | |
|---|---|---|---|
| 4,958,292 A * | 9/1990 | Kaneko et al. | 705/29 |
| 5,237,508 A * | 8/1993 | Furukawa et al. | 700/100 |
| 5,983,194 A * | 11/1999 | Hogge et al. | 700/97 |
| 6,202,000 B1 * | 3/2001 | Rheem | 700/121 |
| 7,069,101 B1 * | 6/2006 | Arackaparambil et al. | 700/121 |
| 2002/0035447 A1 * | 3/2002 | Takahashi et al. | 700/121 |
| 2002/0042735 A1 * | 4/2002 | Narahara et al. | 705/10 |
| 2002/0103726 A1 * | 8/2002 | Jones et al. | 705/28 |
| 2002/0152140 A1 * | 10/2002 | Kondo et al. | 705/28 |
| 2002/0156548 A1 | 10/2002 | Arackaparambil et al. | |
| 2002/0165629 A1 * | 11/2002 | Ho et al. | 700/82 |
| 2002/0198756 A1 * | 12/2002 | Ghaisas et al. | 705/8 |
| 2003/0014500 A1 * | 1/2003 | Schleiss et al. | 709/218 |
| 2003/0126043 A1 * | 7/2003 | Chen et al. | 705/28 |
| 2006/0036498 A1 * | 2/2006 | Iida et al. | 705/8 |

* cited by examiner

*Primary Examiner* — Charles Kasenge
(74) *Attorney, Agent, or Firm* — Richard Kotulak; Roberts Mlotkowski Safran & Cole, P.C.

(57) ABSTRACT

A system, method, service and media for managing both supplier-owned and non-owned manufacturing asset types utilizing a supplier model of a product which goes across the manufacturing asset types. The invention maps the model to instances of the asset types and uses a network to control and monitor the assets. The monitoring and control occur according to the model, rules and services and does not require the vendors of non-owned manufacturing asset types to change their manufacturing execution systems.

24 Claims, 39 Drawing Sheets

ENTERPRISE FACTORY CONTROL METHOD AND SYSTEM

CROSS-REFERENCE TO RELATED APPLICATION

This application is a continuation of, and claims priority on, U.S. patent application Ser. No. 10/904,536 filed Nov. 15, 2004, now U.S. Pat. No. 7,305,278 and titled "Enterprise Factory Control Method and System," which is incorporated by reference herein in its entirety.

FIELD OF THE INVENTION

This invention relates to manufacturing execution systems ("MES") used in the general manufacture of products. More specifically the manufacturing system contemplated by this invention is one in which an Enterprise (herein known as the Supplier), wishes to contract with one or more Customers, to manufacture one or more of their product(s), across some or all of the product levels of assembly, utilizing both Supplier's and vendors' manufacturing and testing capabilities.

BACKGROUND OF THE INVENTION

In today's complex world of product manufacturing, there is an ever-increasing need for flexibility: customers want multiple suppliers; suppliers want to engage multiple vendors, etc. In most all cases, the driving forces are time-to-market for a customer's product, the cost of its manufacturing, and the availability of appropriate technology to enable that manufacturing. At the same time, there is a growing desire for "one-stop-shopping", in which the customer can engage a supplier as a manner of "general contractor", who will accept their product and information requirements, and then assemble the right type and quantity of assets and capabilities, be they supplier or vendor. The supplier accepts responsibility for the finished product and information results, across all parties involved in its manufacture.

FIG. 1 is an illustration of these relationships. Today, each aspect, or level of assembly for a customer product is built at one or more manufacturing locations, depending upon the complexity of the product. Typically each manufacturing location is an independent entity, run by a dedicated set of business processes and software solutions, especially their manufacturing execution system (MES). This diversity of behavior and systems make it difficult for the customer to ever see an integrated view of their product during manufacturing. More importantly, it prevents any supplier to the customer from achieving an overall view of manufacturing locations and processes, from either a monitoring or control point of view. It also inhibits the supplier from easily tailoring a vendor's behavior on behalf of a customer without disruption to the vendor environment.

This heterogeneous collection of customers, suppliers and vendors produces and consumes a great deal of information that needs to flow up, down and across the supply network. As illustrated in FIG. 3 significant 'vertical' integration is required between all of these participants for information such as product order status (e.g. location, schedule, etc.), as well as product quality and technical data (e.g. construction results—tests, measurements, inspections).

At the same time, significant 'horizontal' integration is necessary between vendor(s) and supplier to pass information required for correct product flow and construction, and to enable proper oversight by the supplier across the end-to-end product lifecycle (e.g. product order management across vendors and manufacturing stages, as well as technical data supporting product construction—recipes, programs, etc.).

With a diverse set of processes and systems involved, the resulting integration nightmare causes lengthy time-to-market for the customer's products, especially if any customization is required at any point in the manufacturing process. In addition, there is little to no flexibility available to the supplier in their choice and use of vendor production facilities for either specialization or capacity variability.

This integration is further complicated by the need for timely event and characteristic information from each of the manufacturing stages' execution systems to be fed to the supplier enterprise systems, such as order processing and fulfillment, financial management, logistics planning and product/process engineering as illustrated in FIG. 1. Numerous different execution systems drive the need for equally numerous interfaces, adding complexity in upkeep, reduced flexibility, and often inaccuracies in data and synchronization.

SUMMARY OF THE INVENTION

This invention enables a supplier to implement and manage its manufacturing relationships in an on demand fashion, in multiple dimensions. The invention provides an infrastructure to support variable capacity within a manufacturing stage or product level of assembly. This can involve the addition or removal of both supplier and/or vendor manufacturing assets. It also supports for variable collections of product levels of assembly. This can involve the addition or removal of multiple types of manufacturing assets, either supplier or vendor. This enablement allows a supplier to choose to build all or some of a product's scope (e.g. fabrication vs. test vs. assembly, etc.). In order to accomplish this invention produces a serial model of a manufactured product's scope across a plurality of manufacturing asset types; then it provides for the mapping of the serial model to variable instances of manufacturing asset types; and then it provides for the management of the execution of the manufacturing asset types.

The invention provides a method of managing both supplier-owned and non-owned manufacturing asset types, comprising the steps of: building a supply model of a product across manufacturing asset types; mapping the model to instances of the asset types; and using a network to controls the asset types according to the model.

The invention also provide a system which integrates customer/supplier/vendor manufacturing: one in which a simple and singular definition of a product's lifecycle is created, and then applied to a flexible set of manufacturing assets, capable of tailored real-time behavior, and integrated to the degree necessary for proper monitoring and control, as well as ongoing customer visibility to work in process.

The system thus enables a singular interface to a supplier's enterprise systems, further enabling rapid integration of the necessary manufacturing assets. Although some of the illustrative examples provided herein relate to semi-conductor manufacturing this invention can be applied in any manufacturing domain having multiple manufacturing assets and stages.

DETAILED DESCRIPTION

Figure 1:
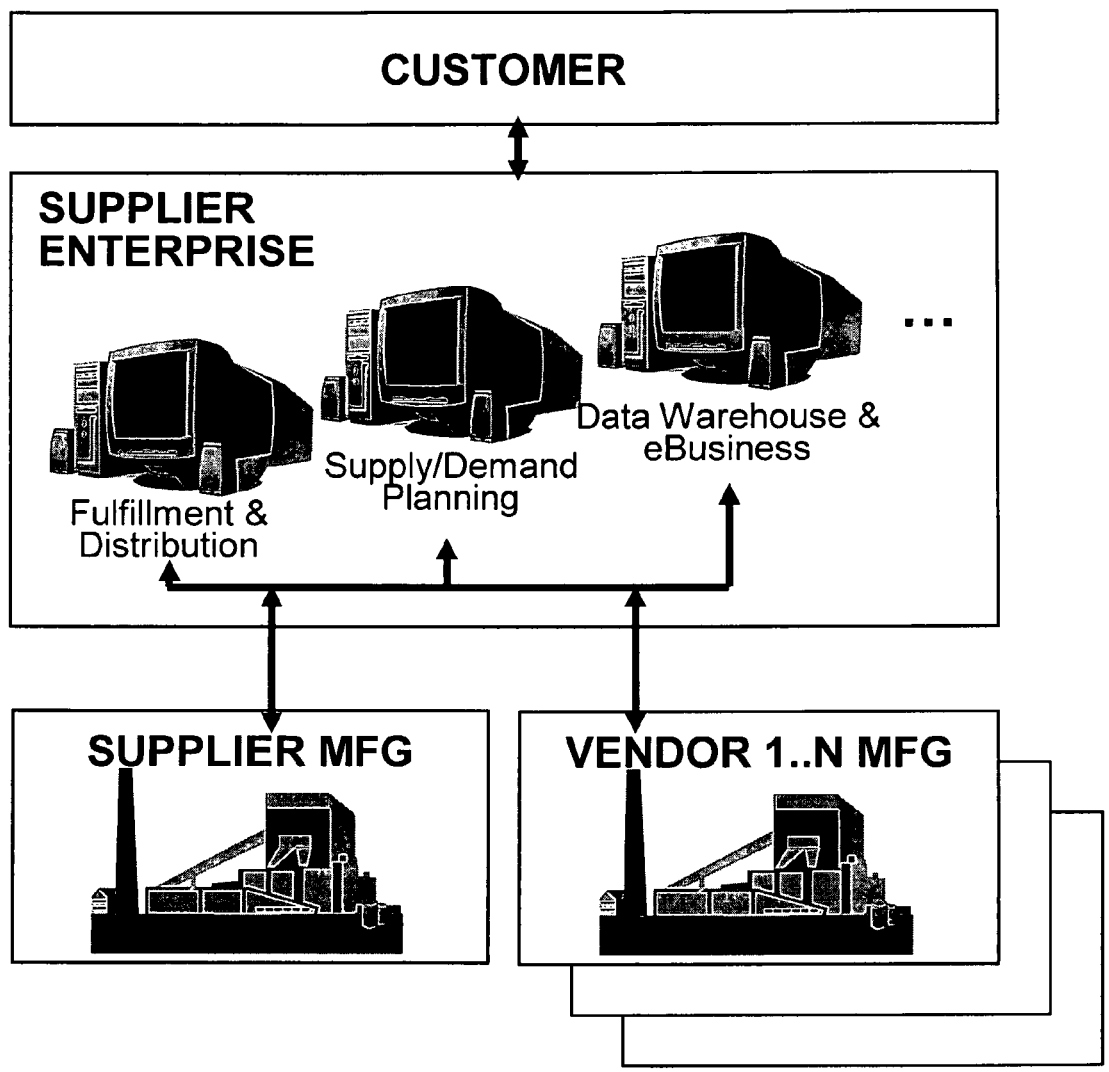
FIG. 1 illustrates the general relationships between customers, its suppliers and vendors.
Figure 2:
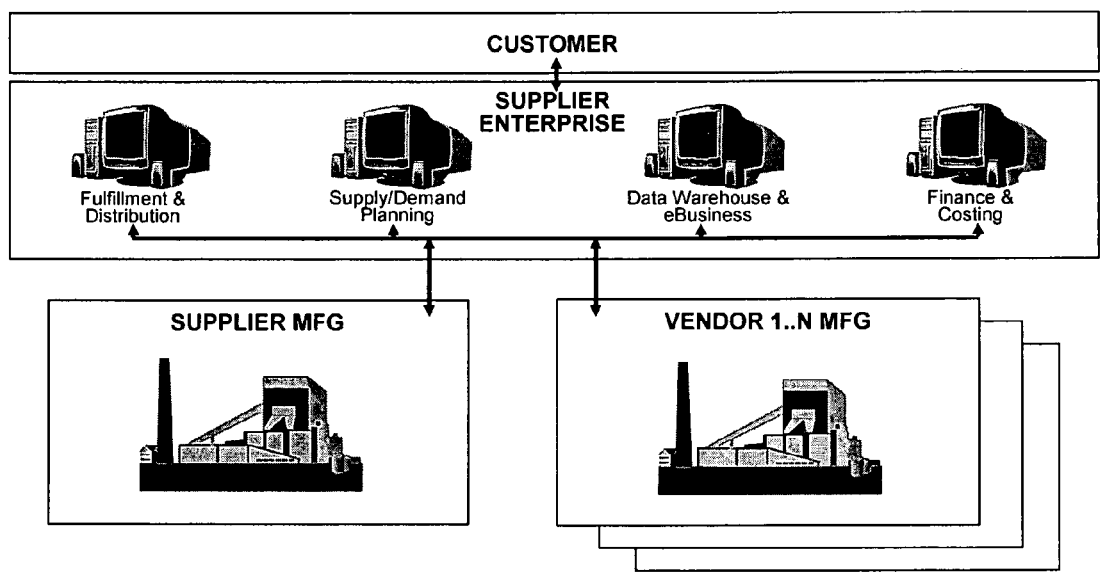
FIG. 2 illustrates the horizontal and vertical relationships in a typical supply chain.
Figure 3:
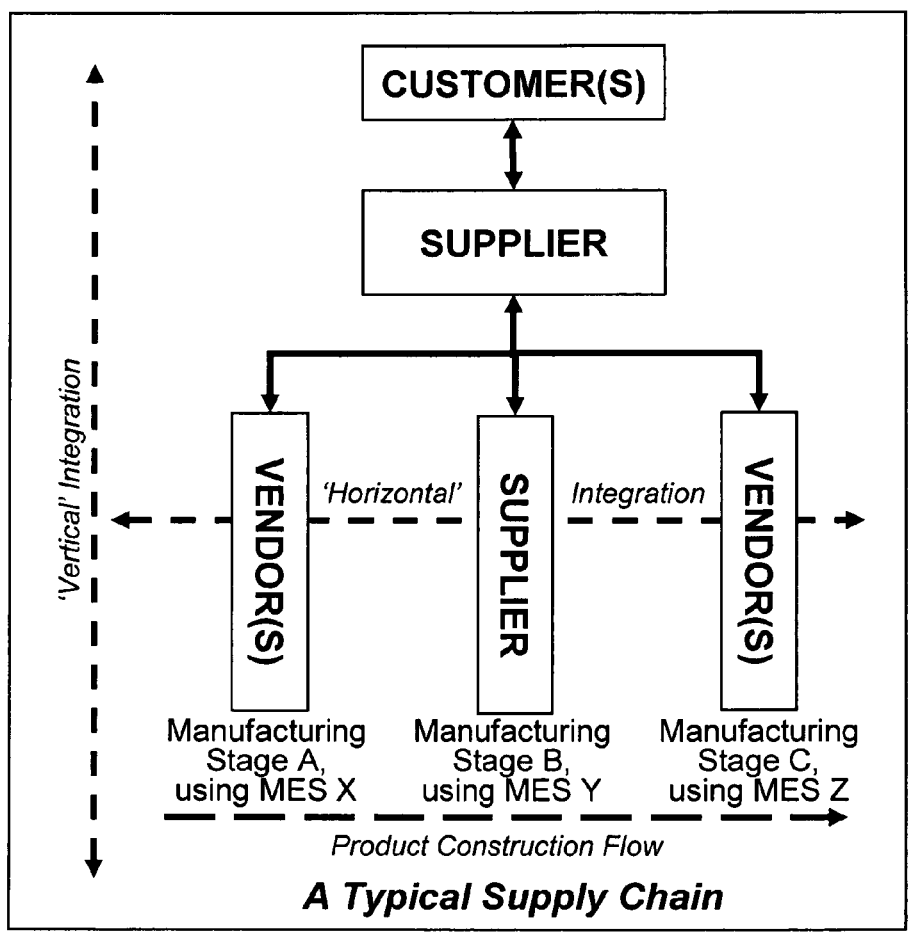
FIG. 3 illustrates a flexible manufacturing supply network using the MES Backbone.
Figure 4:
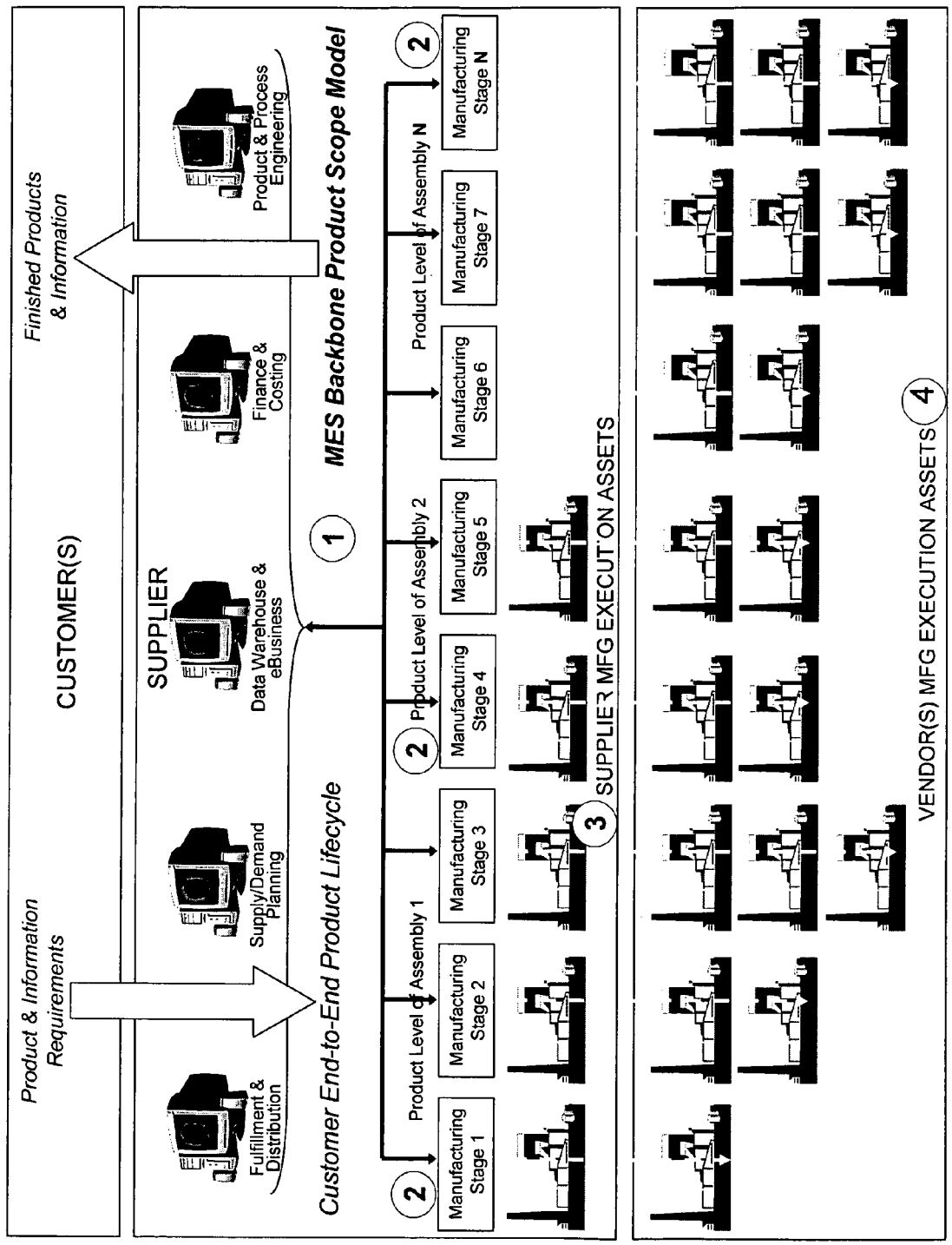
FIG. 4 illustrates the flexible manufacturing environment provided by this invention.

The flexible manufacturing supply network of this invention is illustrated in FIG. 4. It comprises a MES Backbone and its end-to-end product lifecycle model 1, support for multiple product levels of assembly 2, and a mapping to variable sets of manufacturing asset types 3 and 4.

The system elements described below comprising a Manufacturing Execution System (MES) Backbone and the Manufacturing Data Integrator (MDI) enable this new flexible manufacturing supply network. They introduce processes, methods and systems to enable the business objectives of speed, flexibility, and cost. Figure illustrates some of the major concepts embodied in this invention, namely (a1) that the invention creates a single model for the entire product scope, as opposed to multiple, segmented models historically. In addition, this model and its execution result in (a2) the amelioration of enterprise system intervention between manufacturing stages, historically required to implement costly and time-consuming stocking and release points. The single product scope model enables all stages of manufacturing to execute seamlessly, as a single logical factory.

FIG. 4 also illustrates some of the variable customer/product flow enabled within a single supplier, e.g. (a3) different products, represented by the different hash marks, can be built simultaneously, using and reusing different types and quantities of manufacturing assets, dependent on product requirements.

The remainder of this description will explain in detail the concepts and components of the invention, their structure, behavior, capabilities, benefits and implementation.

As set forth above, one of the major elements of the invention is an infrastructure (the MES Backbone) for supplier monitoring, management and control of a customer's end-to-end supply network, involving any mix of supplier and/or vendor manufacturing assets across one or more product levels of assembly through the novel utilization of a standard Manufacturing Execution System (MES) at the supplier. Components of this process include:

A single end-to-end (E2E) product model, defined as a route within the MES, spanning all levels of assembly for the customer product. This model describes all of the manufacturing operations that will be required, and groups those operations into collections called site manufacturing stages, which represent the smallest collection of operations that can be done in a single physical manufacturing facility (either supplier or vendor). Each stage will also have appended to it a prefix and suffix set of operations describing carrier, lot and quality confirmation steps to enable reconciliation between stages;

A mapping of the product model containing these site manufacturing stages to one or more physical (real) manufacturing assets for each stage, based on capacity needs. This includes identification and assignment of unique identifiers for each site, to be used in maintaining uniqueness in product identifiers during manufacturing;

The set of product flow rules that will be used by the MES to direct product from asset to asset at site manufacturing stage boundaries, utilizing the WIPShip and WhereNext functions which will be discussed below. These rules direct product movement across assets without involving any Enterprise logistics system, thus removing costly and time-consuming inventory operations that would historically be required between manufacturing stages. The entire E2E manufacturing process can now take place within the domain of the single supplier MES system (See FIG. 4);

A method for the capture of Work-In-Process (WIP) events originating at a site manufacturing stage remote from the supplier and integration with locally-generated events, to produce a single view of all WIP, with site identifiers maintained (Remote WIP Tracking);

A single interface at the supplier from the MES Backbone system to the Enterprise systems, to enable support from Supply/Demand Planning, Financial and Data Warehouse/Analytical solution components. This interface is independent of the type or quantity of product levels of assembly, or number and diversity of site manufacturing stages involved;

An infrastructure for the unique identification of the manufactured product, across all site manufacturing stages and product levels of assembly, and across any logistic events (e.g. split or merge) for a period of years. An aggregate of this identifier over time produces the actual path of manufacturing across all assets that the product encountered.

By integrating the various, often heterogeneous manufacturing assets necessary to the customer's supply network in such a singular manner, this backbone system enables the supplier to act in an overall governance role, managing product flow/priority, communicating product specifications for construction, and gathering construction results data, all in a uniform manner, independent of the characteristics of the execution system(s) employed for a particular supply chain stage.

The resulting capability enables a supplier to assemble the necessary segments of a customer's supply chain in an on demand fashion, integrating the appropriate local and vendored supply network segments without constraint of their associated MES characteristics, and without the need for costly and time-consuming point-to-point integration between each information system component.

Figure 5:
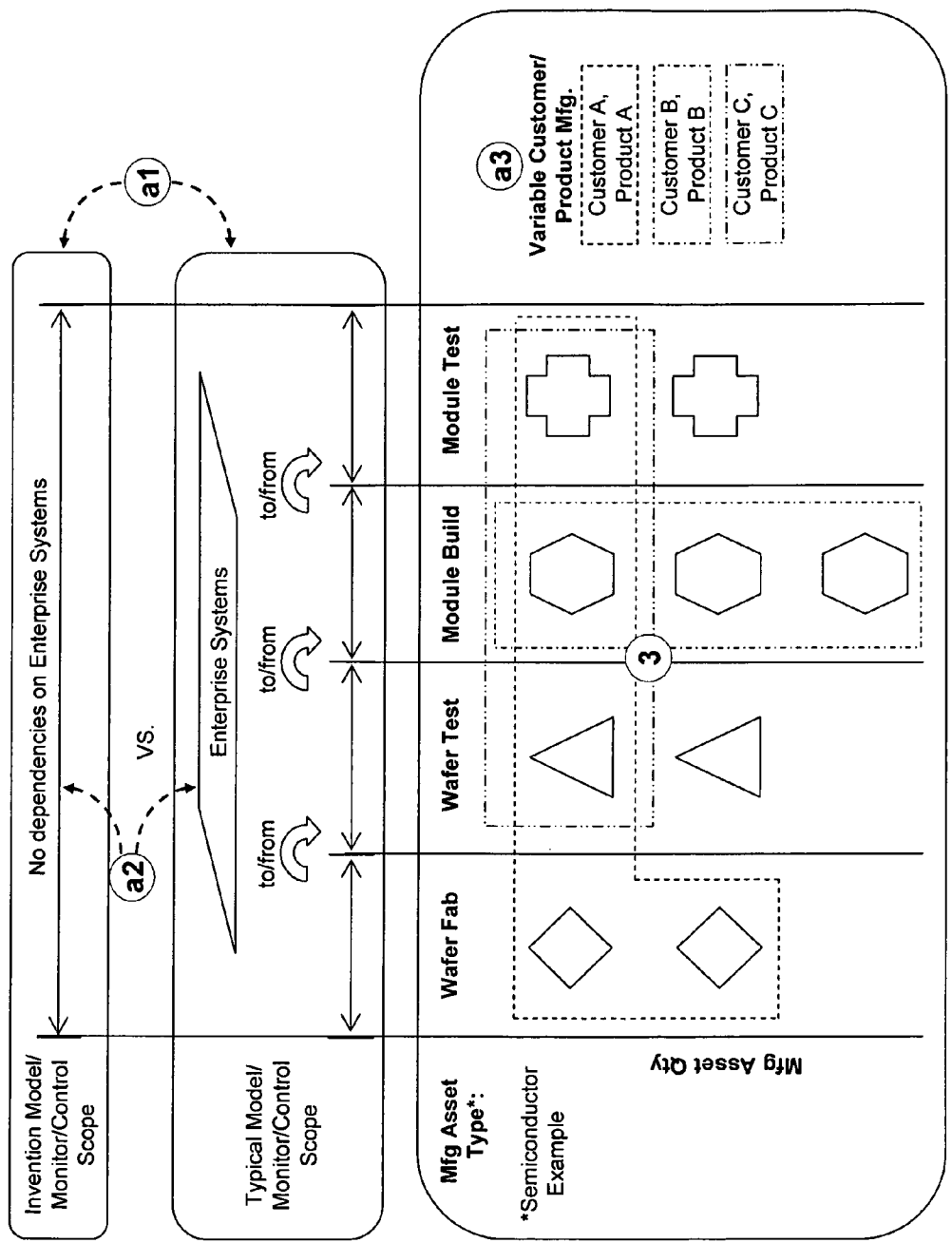
FIG. 5 illustrates enterprise level manufacturing with a MES Backbone.

The MES Backbone has these fundamental characteristics which by corresponding legends are illustrated in FIG. 5:

b1. Integration of one or more heterogeneous manufacturing assets/systems, either Supplier-owned or Vendor-owned;

b2. Convergence of all manufacturing assets/systems to a single interface to/from Supplier Enterprise systems;

b3. Transparent aggregation of data provided by all manufacturing assets/systems to a single standard and integrated form; and b4. Transparent management control of all manufacturing assets/systems in real-time, defining control points, parameters and rules to enact in producing Supplier- or Customer-owned products.

Figure 6:
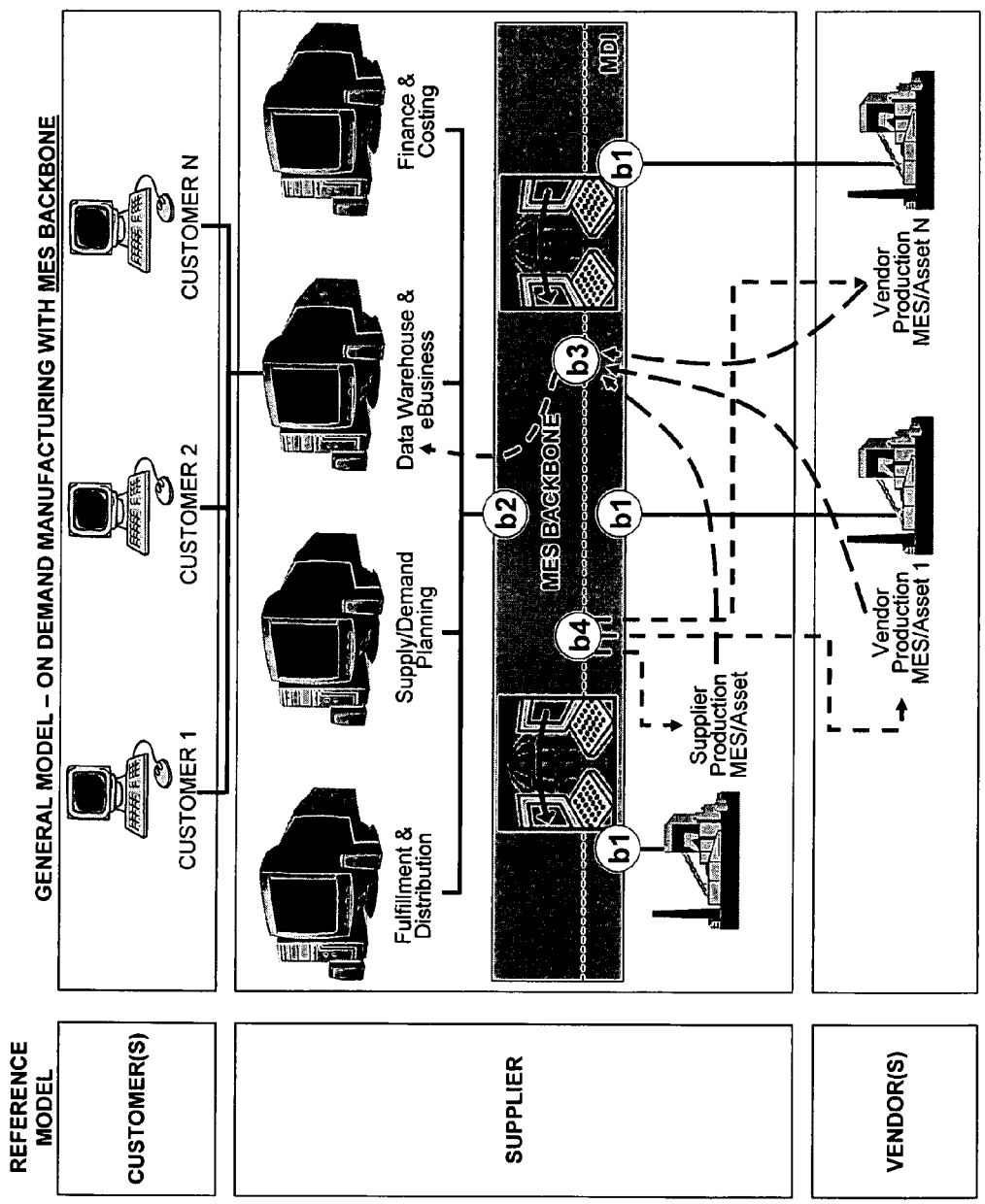
FIG. 6 illustrates some of the benefits of a MES Backbone.

The benefits associated with the deployment of the MES Backbone are listed below and illustrated in FIG. 6 with corresponding legends:

A. Integration of one or more heterogeneous manufacturing assets/systems to perform a single manufacturing process stage;

B. Integration of one or more manufacturing process stages into a product level of assembly, independent of participants;

C. Integration of one or more product levels of assembly into a single, end-to-end view of manufacturing, independent of participants; and D. Flexible expansion and contraction of manufacturing capacity, in both process stage and level of assembly dimensions, through on demand integration of Vendors with a Supplier.

MES Backbone

The End to End (E2E) Product Route (model), is the aggregate description of a hierarchical representation of the path a product will take from start to completion of the customer product. Its atomic elements are the individual operations that must be performed, in sequence, in order to produce the customer product. This definition of a product route is distinguished from normal manufacturing routes in two aspects:

First, it extends the manufacturing process scope beyond that which an individual supplier is typically capable of by itself; and second, a route that is contiguous end-to-end can be similarly contiguously tracked through the aggregate supplier/vendor manufacturing processes.

Figure 7:
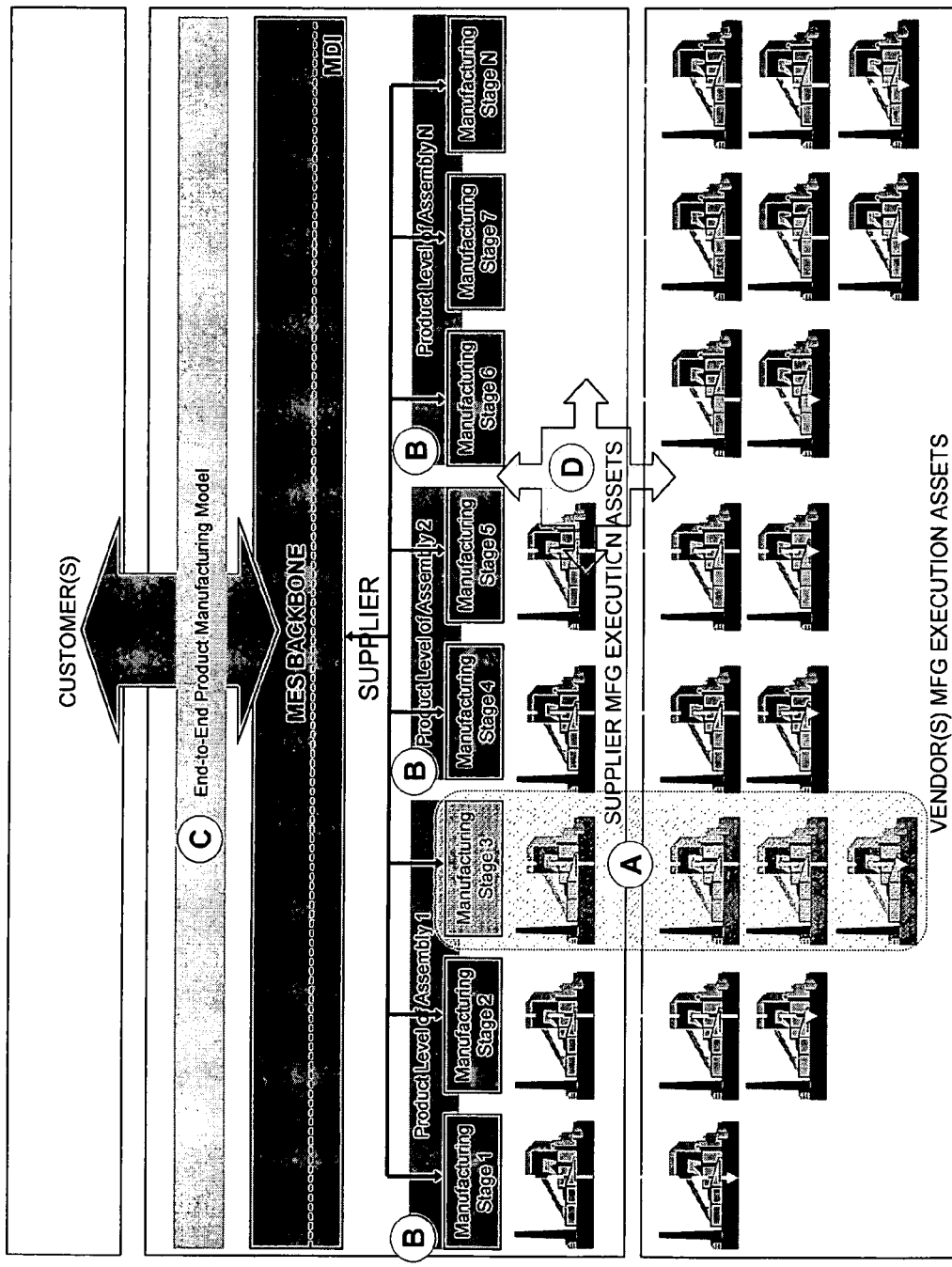
FIG. 7 illustrates end-to-end product route structure.

Given an end-to-end product flow route, including its operations, a mapping is defined for subsets of these operations to specific manufacturing assets, both supplier and vendor. Each collection of operations tied to a specific asset is called a site manufacturing stage, and represents the collection of work that can be done consecutively within that individual manufacturing location. The site manufacturing stage is distinct from normal stages in its explicit design for vendor site separation. Because the next site manufacturing stage may exist at a completely different location or vendor, all site manufacturing stages are encapsulated with inbound/outbound carrier, lot and quality confirmation operations to ensure incoming and outgoing reconciliation between stages and vendors. This product flow model (route), its operations and stages and their relationship is illustrated in FIG. 7.

Within each manufacturing stage, the operations contained can be many or few, depending upon the nature of production work performed during that particular stage (e.g. fabrication vs. test vs. packaging, etc.). The supplier examines each manufacturing stage and determines which manufacturing processes are required to be executed at the same location. Some considerations include efficiency, contamination, skill, technology, form/fit/function-matching and timeliness to the next operation (e.g. transportation, physical proximity).

Product Flow Rules and Event Triggers

With the product flow define via the model, and stages mapped to manufacturing assets, units of product (lots) are introduced into the route, and the manufacturing process via the Start Lot function, which consists of a lot start signal, the lot quantity, the product type and lot attributes including priority, quality codes and source manufacturing site. This information can be passed to the local (supplier/vendor) MES to travel with the product lot through the manufacturing stage. The Start Lot function thus allows a lot to be started at any location with sufficient information to initiate and control the lot throughout its entire production life cycle.

An infrastructure is defined to identify the endpoints of each manufacturing stage within the overall route, and thus provide the necessary triggers for the product movement functions, WIPShip and WhereNext.

The Work in Process (WIP) Ship function contains a shipment trigger integrated with the supplier's shipment function and with the MES Backbone. This allows the lot to be sent from one manufacturing stage to another, from one location/vendor to another, without having to remove the lot from the MES Backbone WIP. When a product lot completes a stage, it triggers a shipment to the destination for the next route stage. WIPShip also passes the lot attributes first generated from the Start Lot and updated in the WIPControl (discussed below).

WhereNext is a rule-based function that determines where a product lot should go once it has completed a manufacturing stage. The rules, defined within the product route structure, include, the following conditions against supplier and vendor facilities: site plan volume mix, current WIP loading by site, daily going rate by site, vendor contractual specifications, quality levels, cycle time and cost. The WhereNext function, when triggered by arrival at a stage boundary in the route, provides an identifier of the destination manufacturing stage.

Manufacturing Data Collection

Given the route structure definition and incorporation into the MES Backbone, an infrastructure is defined for the entry of data from the various manufacturing stages into the MES Backbone data schema. Remote WIP Tracking is the entry of WIP events at each manufacturing stage, including operation claim, lot split, merge, Bill-of-Material (BOM) consumption, lot hold, lot release, stage complete, ship, lot count or quantity and lot attribute change. For all events, the stage and site identifier is maintained, so that traceability to source is possible.

A format is defined for the specific use of an identifier (Universal Lot Label-ULL) that allows the tracking of a lot across multiple manufacturing stages and locations with multiple product splits and merges and yet remains unambiguous over a period of years. The ULL is defined to contain original manufacturing site identification, subsequent manufacturing site identifiers, split and merge identifiers and overrun schemes.

Integration of the MES Backbone with Enterprise Systems

The method for integrating the MES Backbone with Enterprise Systems is simply to define a single interface from the MES used as the Backbone, to each of the necessary Enterprise Systems. In most cases, as the Backbone is intended for use an existing Supplier MES instance, these interfaces may already be defined. It is important to understand that despite the singularity, the interface takes on the role of integrating all of the manufacturing stage execution systems as well, via the Backbone.

Building the Backbone

The steps necessary to reproduce an MES Backbone are as follows:

1. Route, Stage, Site Creation

Route creation—The supplier confers with the customers to determine what for them represents a complete product manufacturing solution. Based on this, the supplier selects an MES that best fulfills the product process needs and defines a product manufacturing route that describes the entire end-to-end process, including all manufacturing process operations necessary for product completion.

Example

Route Selection

Figure 8:
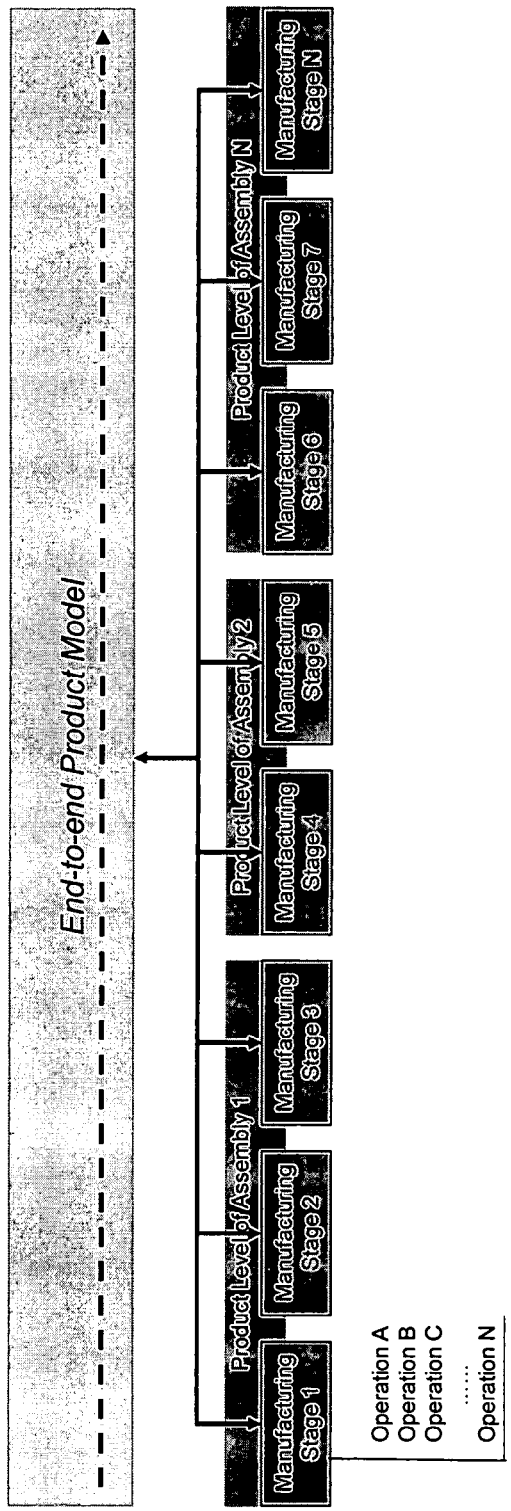
FIG. 8 illustrates an example semi-conductor flow subset for a fabless semiconductor customer.

For example, referring to FIG. 8 a fabless semiconductor Customer ABC requests a semiconductor Service Provider XYZ to produce custom wafers with solder bumps and wafer test. These represent the portions of the manufacturing process from the semiconductor service provider that the customer could not manage itself. At the end of wafer test, Service Provider sells the tested wafers, together with the test data and the logistics data, to Customer ABC for their management.

Example

MES Selection

Figure 9:
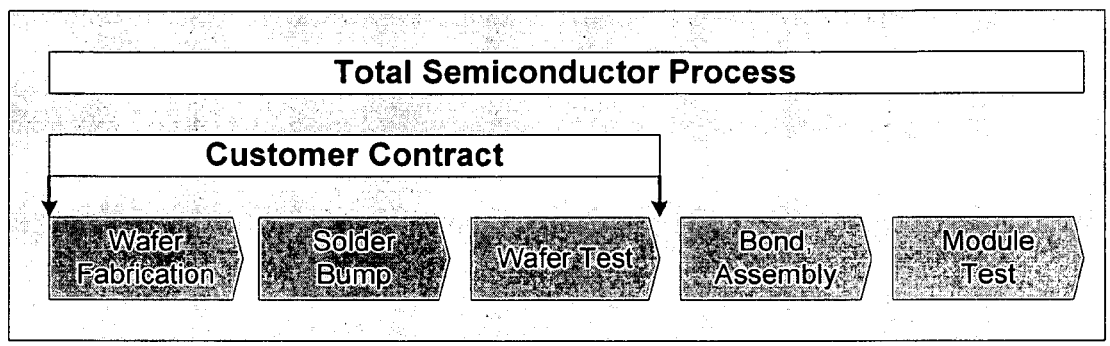
FIG. 9 illustrates a Service Provider MES view corresponding to the products and processes selected by a customer.

Referring to FIG. 9, the Service Provider XYZ selects a manufacturing execution system that can manage the appropriate products and processes selected by the customer. In this case, the service provider selects AssemblyView, a software product offered by International Business Machines Corporation ("IBM"), (also known as AsmView) as an electronics manufacturing execution system that can manage both wafers and die therefore covering fabrication to wafer test portion of the process as requested by the customer. Service Provider sets up a centralized server using AsmView on an AIX system, an operating system also offered by IBM, to manage the customer selected processes.

Manufacturing Stage creation—The supplier examines each manufacturing process operation and determines which are required to be executed at the same site. Some considerations include efficiency, contamination, skill, technology, form/fit/function matching and timeliness to the next operation. The resulting collection of process operations is defined to be a site manufacturing stage. Each site manufacturing stage is also defined to have input and output control points to verify lot quantity and quality. The supplier, having defined the stages, then modifies the end to end route into these segments in the MES Backbone. The end of each stage therefore becomes a trigger point for the Where Next and the WIP Ship functions.

Example

Stage Creation

Figure 10:
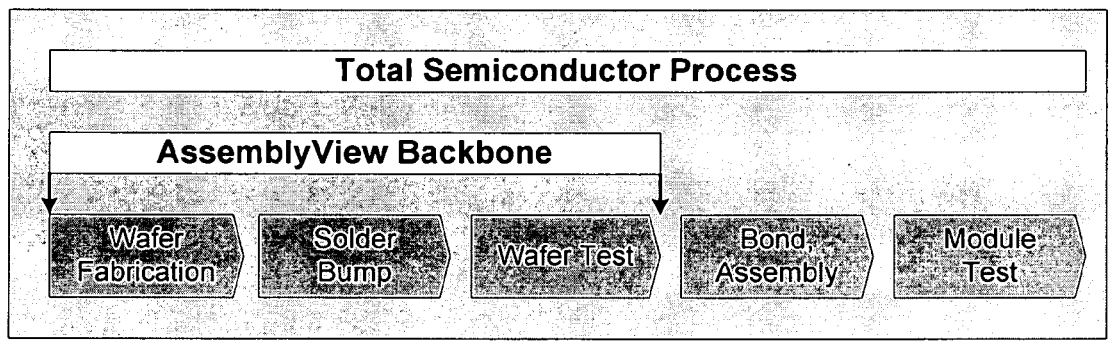
FIG. 10 illustrates a manufacturing asset determination by a Service Provider.

Referring to FIG. 10 Customer ABC decides to choose manufacturing assets both from Service Provider and other vendors that meet specific cost and location requirements and asks Service Provider to manage them. Customer ABC has assembly facilities in Southeast Asia and therefore selects vendors A and B because of their location is Taiwan. The result is a mix of manufacturing assets and locations managed by Service Provider under a single backbone.

Example

Data Set Creation

Figure 11:
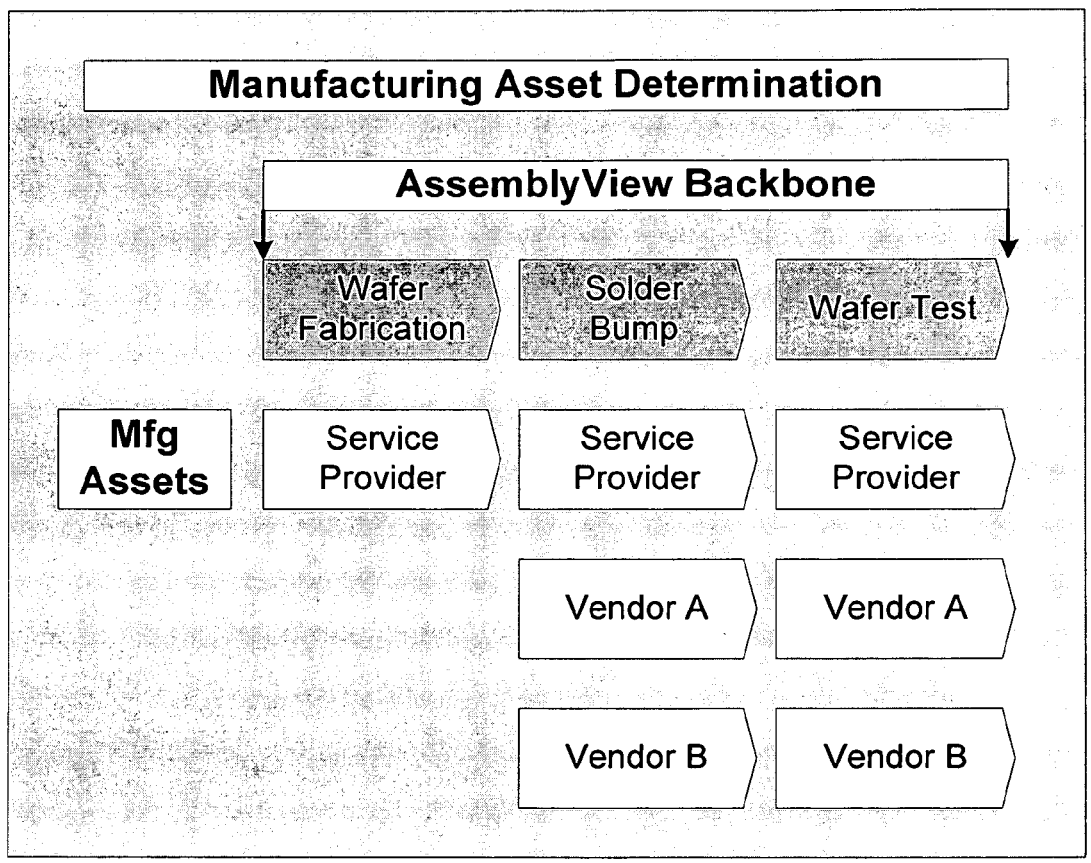
FIG. 11 illustrates key transition points within assets as determined by a Service Provider.

Referring to FIG. 11, Service Provider has previously established the end to end production route inside of AsmView based on control principles. For every manufacturing stage, Service Provider sets logical groupings based on linked operations and interoperation timing considerations. Second, Service Provider defines the key transition points within a stage designating these points as gates which will be recorded to the Backbone. Gates represent major stage exit points, where the form of the product is significantly changes, where major inspection points occur or where financial recognition takes place. These gates are entered into the AsmView Backbone's database, DB2. Both the Service Provider's as well as the Vendors' manufacturing sites will send in data using Rosetta Net 7B1 PIP for transactions at these gates. Rosetta Net is a business to business internet standards body whose membership includes many the major information management providers. A typical example for the semiconductor industry gate structure is provided below.

Example

Control Point within a Gate

Figure 12:
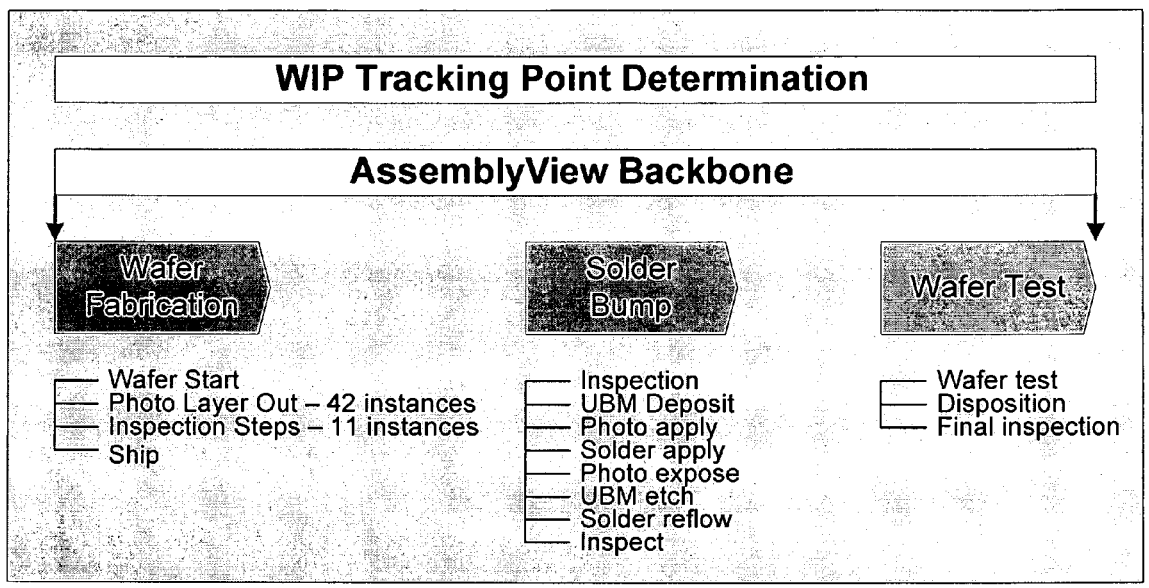
FIG. 12 illustrates process control points at a gate.

Referring to FIG. 12, although Customer ABC selects the vendors for cost and convenience they desire. The Service Provider desires the same control mechanisms as if the products were produced at Service Provider's sites. Service Provider therefore establishes critical control points and parameters to ensure optimum process control. Using the AsmView Backbone, Service Provider establishes three levels of process control over their own and the vendor's manufacturing assets—at a gate, between gates, between sites.

The control point at a gate serves the purpose of establishing the initial control parameters with each manufacturing asset and compares site transactions against the lot information and parameters. It also provides ad hoc lot control functions as required. The AsmView Backbone transmits initial lot information together with critical control parameters such as the lot's individual quality identifier and priority. This information is transmitted to the sites using Rosetta Net 7B5 shop floor papers PIP. AsmView tracks the site that the lot is sent to by updating and storing a site identifier in the lot record.

The vendors or Service Provider's own manufacturing sites send WIP updates using Rosetta Net 7B1 WIP Claim PIP. The Penalty Box interfacing to the AsmView Backbone checks with AsmView to determine the correctness of the Universal Lot Label, the operation that is claimed and that the lot split or merge was executed correctly. If any of these are incorrect, the Penalty Box will return an error to both the Service Provider and the manufacturing site first by the Rosetta Net 0A1 error transaction and second via e-mail.

At times, the Service Provider will identify lots that have exceptional conditions and will issue control commands. The designated person at the Service Provider will enter a command into the AsmView Backbone to hold, release, redirect or scrap a lot. AsmView Backbone generates a Rosetta Net 7B1 transaction that is transmitted to the vendor's MES system. AsmView will know which site to send the control command to because of the site identifier on the lot.

Example

Control Point within a Manufacturing Stage

Figure 13:
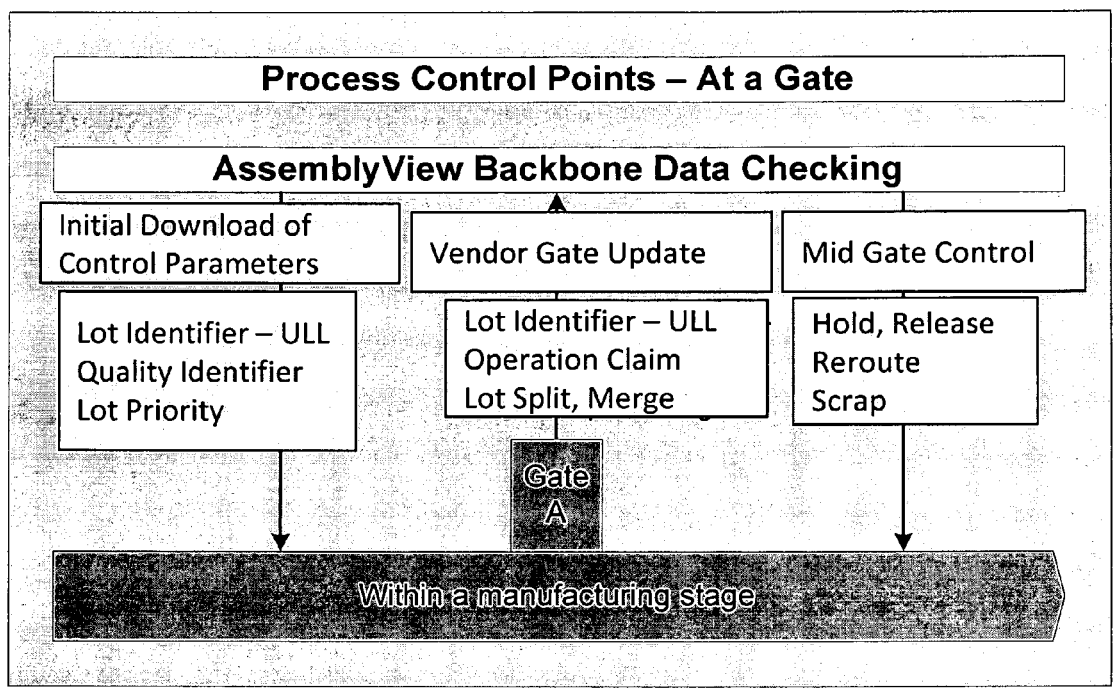
FIG. 13 illustrates process control points within a manufacturing stage.

Referring to FIG. 13, the AsmView Backbone acts as a control mechanism for tracking lots between Gates within a Manufacturing Stage. Specifically, the Backbone checks the lot count, the operation and the content of the WIP claim data to ensure that everything is complete and correct when compared to the previously claimed operation. This is executed by the Penalty Box receiving the Rosetta Net 7B1 WIP claim transaction from the vendor and querying the Backbone's current lot state. If anything is incomplete or incorrect, the Penalty Box returns an error using the Rosetta Net 0A1 error transaction and sending an e-mail to Service Provider and the vendor. (The operation of the Penalty Box will be discussed further below.)

Example

Inter-Site Controls

Figure 14:
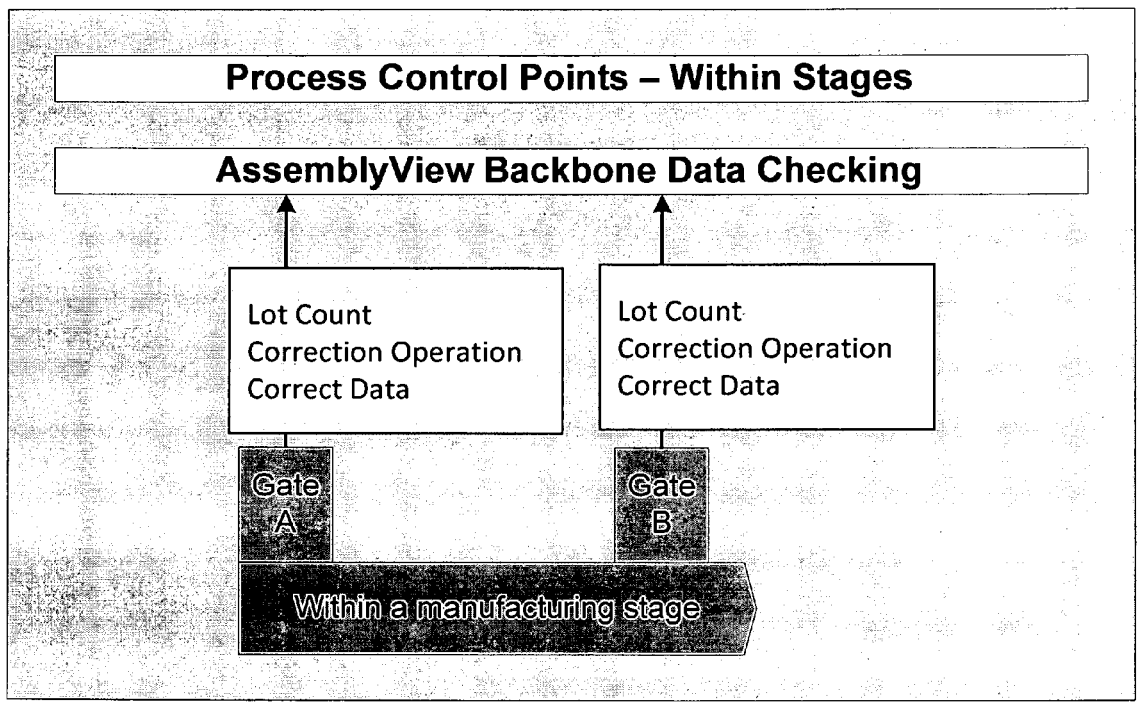
FIG. 14 illustrates process control points between manufacturing stages.

Referring to FIG. 14, because goods can move from vendor to vendor without stopping at Service Provider's facilities, Service Provider establishes a series of controls to reconcile the WIP. In this example, AsmView Backbone captures lot identification, wafer identification and carrier identification from the first vendor and provides this information for the second vendor. The second vendor loads this information on their MES and when the lot arrives, they check the incoming paperwork for the correct lot id, read the carrier for the correct carrier id and identify the individual wafers inside the carrier to complete the lot reconciliation. Once the inspections are complete, the second vendor sends the data verification back to the AsmView Backbone. A fourth check, the comparison of outgoing and incoming inspection data, is managed through a separate channel to be described elsewhere. In total, these four inspections ensure that lots can be reconciled from regardless of processing site and final destination.

Manufacturing Site(s) selection—Given the manufacturing stage definitions, the eligible participants (vendors or supplier) for each stage need to be selected and a site identifier assigned to each in the MES Backbone. The Where Next and WIP Ship functions will use the site identifier in the MES Backbone when triggered at execution time.

Example

Manufacturing Site Selection

Figure 15:
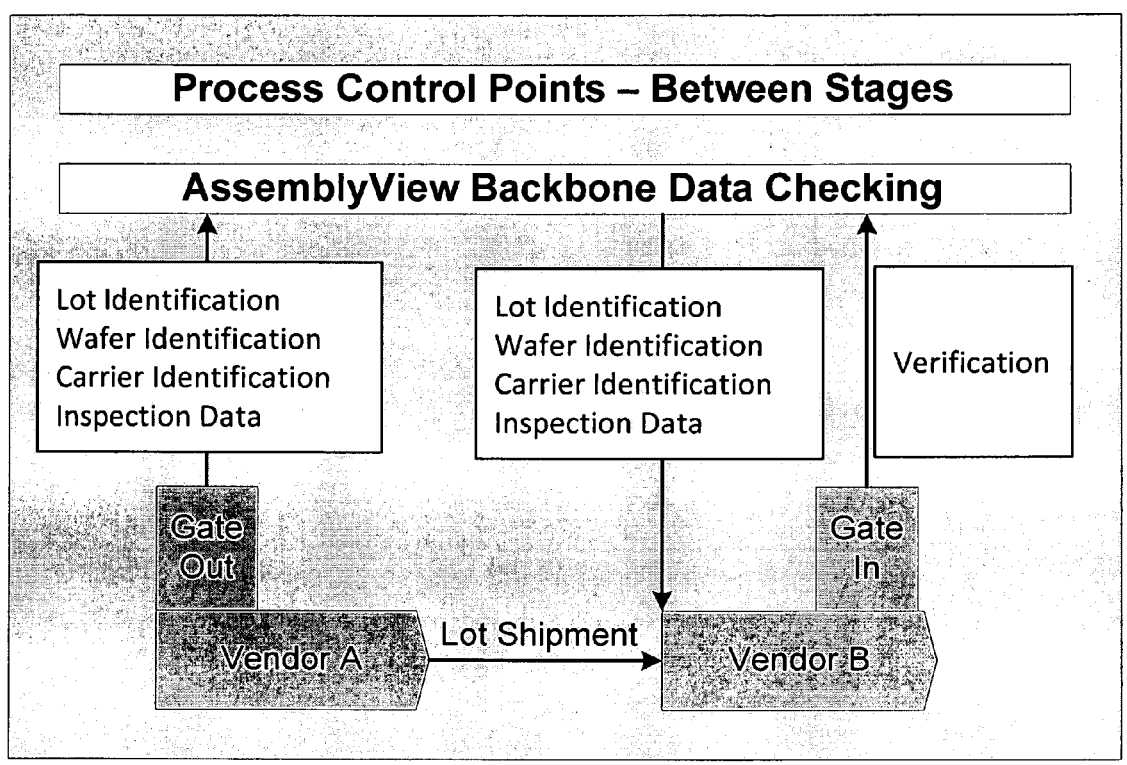
FIG. 15 illustrates the selection of the site for the next manufacturing stage.
Figure 16:
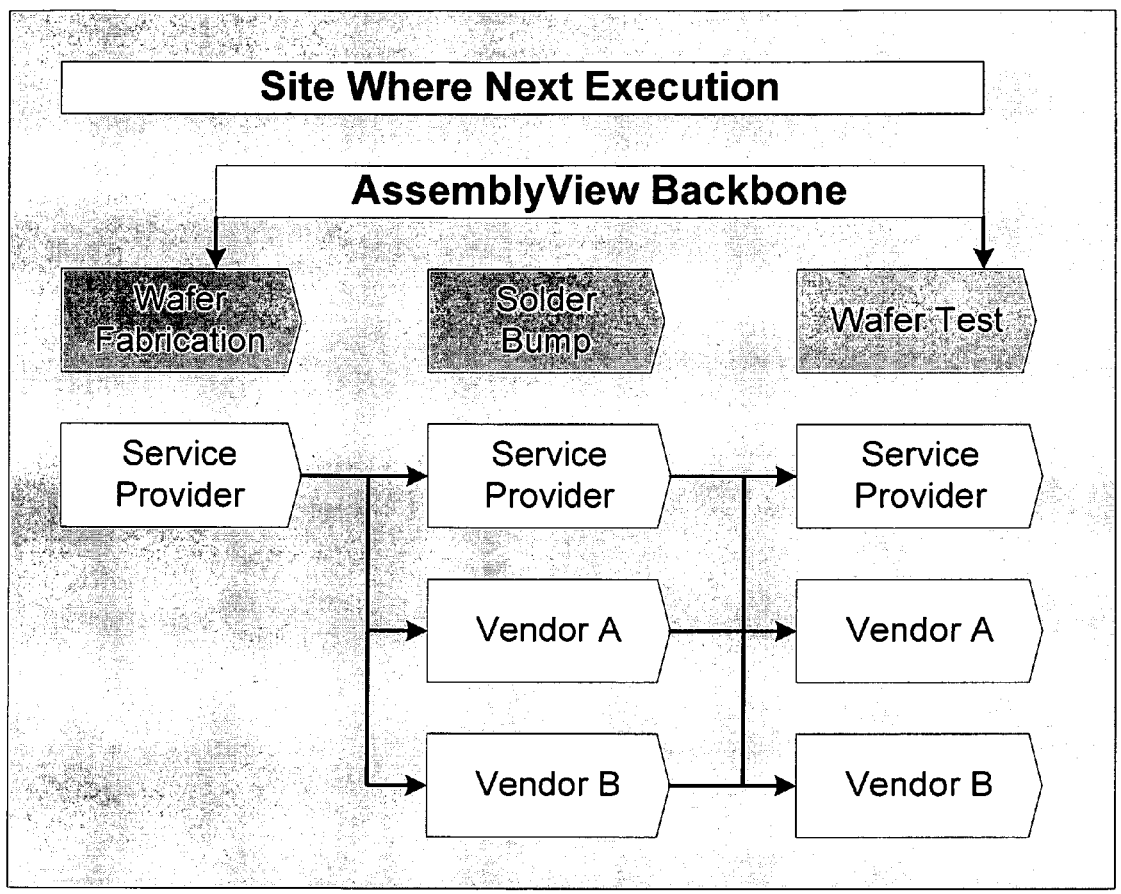
FIG. 16 illustrates the ability to manage multiple customers within an MES backbone.

Referring to FIG. 15, at the beginning of the wafer process, the Where Next function, described below, selects all of the process sites where the wafer lot will be processed. This information is organized as a Manufacturing Plan stored as a lot record in the AsmView Backbone. The Backbone sends a Rosetta Net 7B5 Shop floor Papers transaction to Solder Bump manufacturing site. When the lot reaches the end of the Manufacturing Stage, the wafer fab looks up the 'Ship To' code and sends the lot to the next site and sends a Rosetta Net 3B2 Advanced Ship Notice to the Backbone. The Backbone then triggers a 3B2 transaction to the next manufacturing site so that they can anticipate the shipment.

Example

Multiple Customers

Service Provider supports multiple customers. In this case, Customer DEF wishes to utilize a different set of manufacturing assets than Customer ABC. The MES Backbone architecture allows for multiple assets to be executed on the same backbone with different customer using different assets without conflict.

WIP Tracking Creation

Start Lot—The supplier defines a lot initialization process from the MES Backbone to the vendor for WIP tracking. The supplier defines the critical lot attributes and control codes in the MES Backbone and then passes these attributes from the Backbone to the vendor to initiates the lot(s) on the vendor's system.

Example

Semiconductor Industry

Service Provider sets up lot attributes in the AsmView Backbone to be carried through product ship including the following:
Universal Lot Label
Vendor lot label
Customer lot label
Quality identification
Wafer ids
Product code
Part number
Priority The Backbone sends this information in XML format to Websphere Business Integrator, WBI, an internet tool offered by IBM for routing to the vendor. WBI converts this into IDOC format and transmits it to the vendor's MES.

Remote WIP Tracking—The vendor sends WIP updates to the supplier's MES Backbone as the lots pass through the vendor's site manufacturing stage, to keep a current track of the vendor lot location within the Backbone.

Example

Rosetta Net

Service Provider, being a semiconductor manufacturer, utilizes the Rosetta Net protocol for automated transmission of WIP information. The 7B1 protocol is used for WIP claims, 7B5 is used for shop floor papers and the 3B2 is used for advanced ship notices.

The exchange of transactions between the Backbone and the sites' MES is therefore automatic. AsmView Backbone generates and transmits the Rosetta Net 7B1 transactions, while WBI and WBI-C generate and send the 7B5 and 3B2 transactions.

WhereNext—The supplier defines this function by providing the vendor contract rules, the preferred weighting between sites, the site daily going rate and the cycle time, cost and quality weights. In addition, the supplier links the WhereNext function to the MES Backbone for live data feeds of the WIP levels to ensure that lots entered at the vendor do not exceed the WIP levels against the daily going rate.

Example

Semiconductor Industry

Service Provider integrates a stand alone dispatch tool with the AsmView Backbone. When the Backbone creates a lot, it requests a "WhereNext" request to the dispatch tool and the dispatch tool generates a Manufacturing Plan for the Backbone containing all of the 'Ship To' locations for the lot. Service Provider creates two types of Manufacturing Plans—Wafer: from wafer start to stocking of die in wafer form, Module: from die release to finished modules.

The dispatch tool such as LCPS available from IBM or RTD offered by Brooks Automation creates Manufacturing Plans by combining predefined rule sets and current WIP data. The dispatch tool looks up current information from the Backbone, such items as vendor WIP loading and total lots available, and calculates that against the rules. The result is a set of 'Ship To' codes for the type of Manufacturing Plan that the lot is on and is stored as lot attributes in the Backbone.

WIP Ship—The supplier configures the WIP function to transfer lots from one site manufacturing stage to another, using the rules defined in the WhereNext function. The triggers are set at the site manufacturing stages in the MES Backbone route and with the enterprise shipping system to initiate the physical WIP movement.

Example

Semiconductor Industry

The Backbone generates a WIP Ship trigger when the lot reaches the last gate of a Manufacturing Stage and sends that trigger to WBI. WBI accesses the information required for a Rosetta Net 3B2 from the enterprise systems such as the SAP products offered by SAP AG to capture purchase order number and line item code for the vendor contract. This information, combined with the shipping information from the current vendor—master airway bill, manifest number—is converted into Rosetta Net format by WBI-C.

Universal Lot Label—The supplier decomposes an identifier to define the original manufacturing source digits, the manufacturing site digits, the split and merge digits, the overflow digits, and their respective domains of values.

Example

Semiconductor Industry

Service Provider knows that each customer uses SAP as an enterprise system and therefore needs to have a lot identifier that is constrained to ten digits. In addition, Service Provider knows that the customer wants to track the lots for its full lifecycle without change for the parent lot and that the child lots should have a visibly obvious relationship to the parent lots. In addition, Service Provider knows that the customer wants to have the possibility of the lot being processed at a multiplicity of sites yet avoid any duplication of lot identification for a minimum of five years and not contain any false information. Service Provider also knows that the vendors must split and merge lots in real time and therefore cannot accept a system of centralized control.

Figure 17:
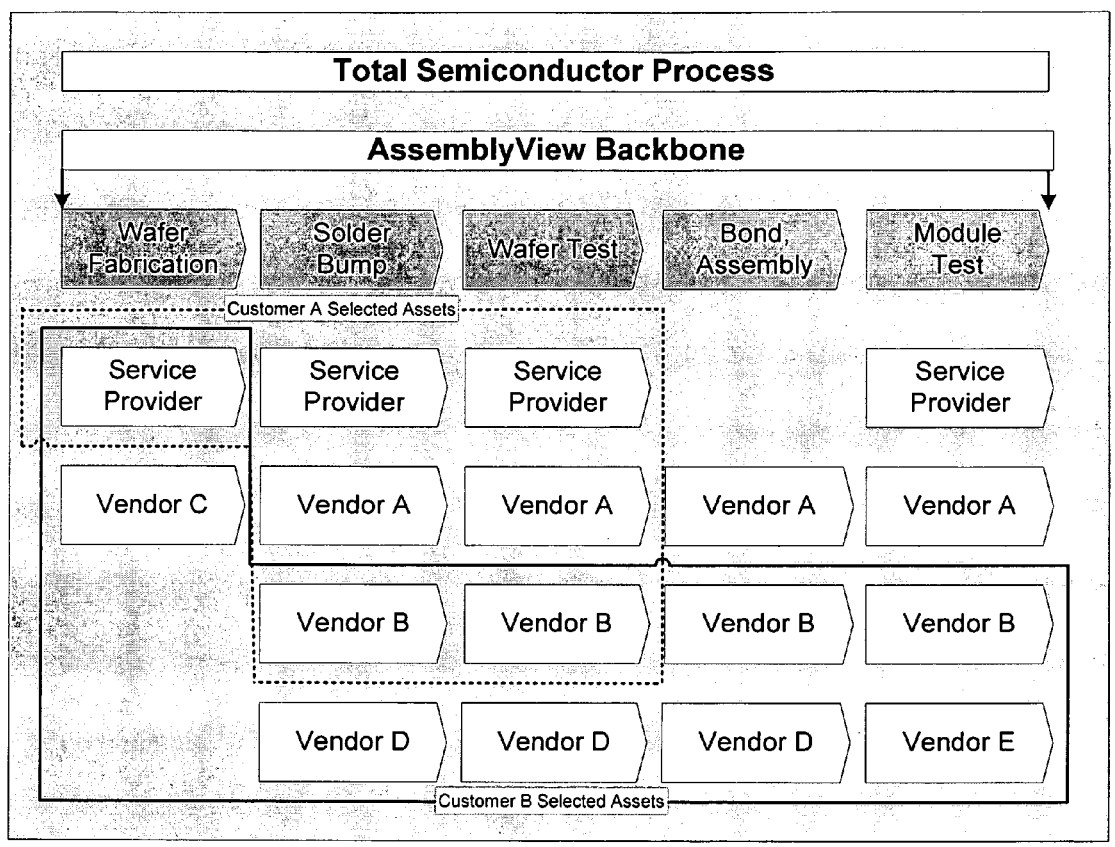
FIG. 17 illustrates a Universal Lot Label format used in an example of this invention.

To this end, Service Provider creates a Universal Lot Label with the following alphanumeric lot naming scheme set forth in FIG. 17:

Code Meaning

S:

The purpose of the four digits is to allow a single fabrication to produce parent wafer lot labels for five years without duplication.

F:

The fab digit allows Service Provider to manage up to 33 (no I, O or X) fabrication sites without duplication

W:

These wafer digits allow the fab to create up to 1,156 child lots, necessary for design of experiments, out of a single parent wafer lot while in the fab.

P:

Unique post-fab digits are assigned to each manufacturing site allow up to 1,156 sites.

M:

This module digit allows the post-fab site to create up to 34 child lots from a single parent wafer lot.

Rules: Service Provider applies the following operational rules to the AsmView Backbone and the Manufacturing Data Integrator:

Wafer Rules:

At wafer start, the fab sets the first five digits of the parent wafer lot with the rest as zeros.

The fab enters its code in digit 5 and adds the next sequential alphanumeric in digits 1-4.

For child lots, the fab creates sequential ids starting from 00 in digits 6 and 7 while the keeping the first five digits the same.

Different parent wafer lots cannot be merged until after the product is assembled and marked.

Before marking, child lots can be merged into its parent wafer lot or a child from the same parent wafer lot.

The merged child lot takes the ULL of the parent wafer lot or the lower child wafer lot id.

Module Rules:

Service Provider assigns unique site codes to each of the post-fab manufacturing sites.

When a post fab site receives a lot, they do not change the ULL unless they split or merge the lot.

If they split a lot, they leave the parent lot id unchanged and write their site code in digits 8 and 9 in the child lot and a sequential alphanumeric for each child.

If in post-marking operations two different parent wafer lots are merged, the post-fab site overwrites digit 5, fab code, with an X and writes the next sequential number in digits 1 through 4.

Operational modes: The ULL process can operate in two modes—alias and non-alias. The alias mode is where the vendor is unable to carry the Universal Lot Label in its MES and therefore, the Backbone must create the ULL's for all lot starts, splits and merges. In this case, the vendor sends their own lot label for to the Backbone using Rosetta Net 7B5 for lot start events and 7B1 for lot split and merge events. The AsmView Backbone captures the vendor lot events, generates a ULL and stores the ULL as the primary lot identifier and the vendor lot label in a separate field.

For the non-alias mode, the vendor is able to carry ULL's in their MES. When they have a lot start event, this can occur either by the Backbone sending a lot start using a 7B5 with the ULL to the vendor via Websphere Business Integrator or the vendor's MES requests a ULL from the MDI server using a SOAP interface and the MDI server provides the ULL designated for that vendor.

The Manufacturing Data Integrator (MDI)

The another attribute of the invention is a codified system framework for deploying supplier manufacturing behavior and capabilities at a vendor manufacturing site to ensure compliance to customer requirements. This system/services-oriented framework component called the Manufacturing Data Integrator (MDI) is deployed at the vendor as a way to provide local execution of function and business rules, supporting services and data, to support the product route as it is executed at a manufacturing stage. Components of this framework include:

A mechanism for personalizing the real-time behavior of a site manufacturing stage (either supplier- or vendor-operated) on behalf of the customer supply network, by providing functional services that can compliment, and if necessary, replace functions native to the site;

A mechanism for stand-alone operation within a site manufacturing stage, to simply serve as the means for functional enhancements in a legacy MES scenario, where local modifications are costly and time-consuming, and significant investment in standardized behavior across assets through legacy system migration is not feasible;

A mechanism for integration of an MDI instance at the manufacturing site, with a second MDI instance centrally deployed at the supplier location, to provide input to the MES Backbone for near-real-time monitoring and control integration by the supplier over the aggregate supplier/vendor manufacturing assets. This configuration of multiple MDIs enables a mechanism for control of work in process across a distributed network of manufacturing assets (WIP Control), directing commands to alter product movement, content and quality;

A methodology for encrypted information flow management to include:

A mechanism for end-to-end data and transaction handling via middleware;

A mechanism for the homogenization of mixed technologies, data types and business rules via an isolation layer.

A mechanism for eliminating a distributed system's dependency on wide-area-network performance/availability through implementation of node-independent processing for extended time periods.

A mechanism for the monitoring and collection of error notifications, traffic logging and statistics across the nodes of a distributed system;

A mechanism for the controlled disposition of transactions or transmissions that are deemed incomplete or incorrect, pending corrective action, while allowing the free flow of complete/correct information (Penalty Box).

A mechanism for mapping industry-standard protocols to/from the MES-specific protocols implemented in the MES Backbone, and the manual entry of data into the Backbone from site manufacturing stages (Protocol Converter).

The MDI is described in two contexts:

1. The first is the stand-alone, or local execution mode, installed at an individual site manufacturing stage. Here the general intent is to provide a virtual "Factory-in-a-Box" (see below)—a system framework with functional services, rules and data, that can be integrated with local services in order to stand alone as the sole automation provider, or to augment local services.

Augmentation of the local services has two flavors, a) a general extension of functionality in a case where the local or legacy execution system is expensive or complex to change, yet new functional requirements exist; and more typically b) a specific extension of functionality, in the case where the stage is working on behalf of supervisory role, and is tailored in its behavior to meet expected results, using supplier-provided services, rules and data.

2. The second usage context is the distributed mode, involving multiple MDI instances, arranged in a star schema topography, with a centralized instance added as point of control for the distributed nodes, typically integrated with an MES Backbone to create an aggregate distributed manufacturing business. In this context, an additional array of services exists to manage the distributed nature of communication required between instances.

The "Factory in a Box" concept refers to the notion that you can construct a packaged solution (typically implemented as a single system) that can be installed into a factory environment to provide some or all of the automation services the factory requires to operate. This solution is aimed at solving two primary problems associated with bring-up of factory automation—cost and bring-up time. To implement a "Factory in a Box" solution, several criteria are important:

The solution should be adaptable—different manufacturing environments or disciplines will require different service sets, thus different configurations;

The solution must be deployable within a relatively short period of time. Time-to-market concerns necessitate fast bring-up, so infrastructure components must be able to come on-line quickly;

The solution should be robust—high-volume manufacturing requires steady, reliable access to IT resources; and The solution should be secure—the owners of the solution will most certainly not wish to have their intellectual property compromised.

All of these characteristics are addressed in the design points for the MDI and its supporting infrastructure environment.

In either usage context, the MDI enables real-time adjustments to vendor processing equipment to achieve tailored results consistent with supplier specifications. The inputs for such real-time adjustments can exist within the vendor environment (e.g. product test results), or be provided by the supplier (e.g. feed-forward data from an earlier supply chain segment/vendor result). This ability to interact with vendor equipment is independent of any similar capabilities local to the vendor and their own MES. Specific to the distributed context, supervisory logistics and production control communication between the supplier and vendor MES and equipment are also possible.

Another important aspect of this invention is that implementation of such integration via the MDI component requires no tailoring or impact on a supply chain segment's MES, processes or organization, and simple integration to their equipment, all because of the design of the MDI itself. Thus integration can take place either inside the supplier or involving one or more vendors.

Figure 18:
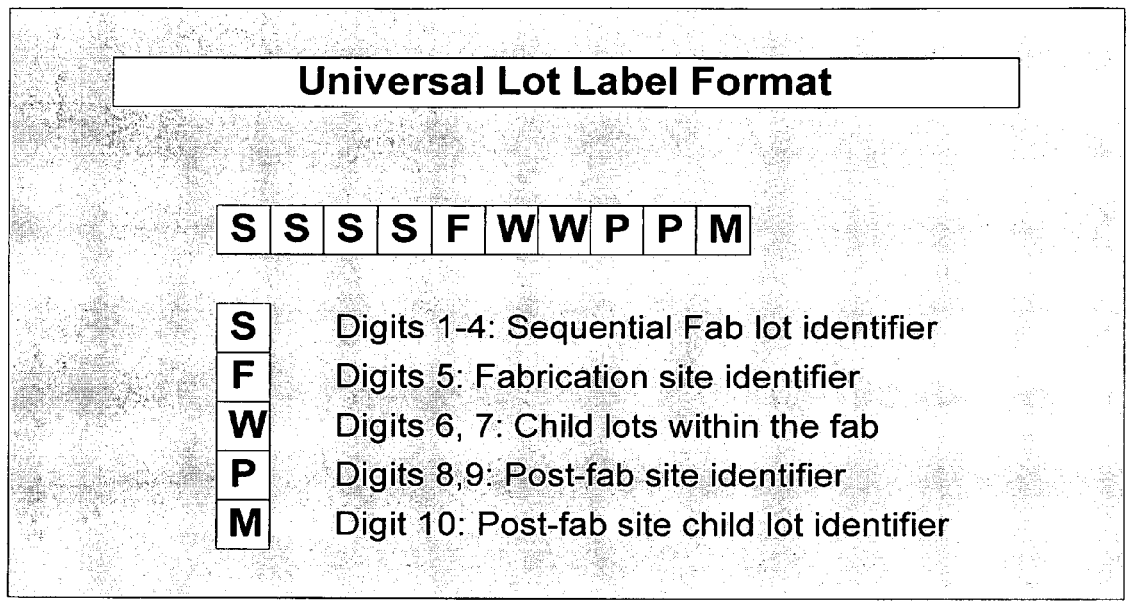
FIG. 18 illustrates the characteristics of the MDI.

The MDI has these major characteristics which are illustrated by like legend in the block diagram of FIG. 18:

c1. Minimally-invasive integration into a site manufacturing stage and its systems, to provide real-time customized behavior;

c2. Flexible integration of multiple site manufacturing stages into a single larger logical/physical enterprise;

c3. Data aggregation across multiple site manufacturing stages to a central supervisory location, including the MES Backbone; and c4. Distributed control of multiple site manufacturing stages from a central supervisory location, using both central and distributed rules and services.

The MDI is a service component, designed to address and solve the remote manufacturing problem. Implemented as a network-accessible server (or server array), MDI encapsulates the array of services, business logic, and interfaces that are required by the local processes at a site manufacturing stage. These services and interfaces are designed to be called at key points in the manufacturing process to implement decision processes, combination logic, data feed-back/feed-forward, data collection, and control.

The MDI's internal design is based on a services-oriented model, in which an array of services is made available as discrete components that can be called upon (by internal or external entities). Each of the available services adheres to a standard set of interface and functional requirements to enable:

"Plug-in" installation; and

Utilization of industry standard techniques for access.

Some of the typical services that can be implemented on the MDI include:

Product disposition service—receives data (results) from local tooling and makes rule-based decisions regarding the disposition of the manufactured goods;

Lot label generation—creates unique labels for lots (batches), or algorithmically creates traceable sub-labels when lots must be sub-divided;

Tool recipe service—provides automatic distribution of context-sensitive tool setup information (i.e., a tool recipe);

Composite logic—logically (via rules) combines the results of one or more manufacturing operations to produce new composite data, to be fed forward as control data for a subsequent operation; and Batch split—handles the logistics of sub-dividing a batch into two parts (each of which must have a unique identifier, and which must remain associated).

The services array described above can be expanded to meet changing requirements. Most of the services are oriented toward providing functionality to other applications and external entities (vendor systems, for instance), but many can also provide services to other services—i.e., one service may call upon one or more other services to carry out its assigned task(s). Thus the MDI may be deployed in a more general capacity, as a means for adding functionality to a legacy manufacturing system environment, via simple interfaces, rather than legacy system modification.

When production processing must be executed in a remote location (a vendor), but the controlling organization (the supplier) requires tight integration with the remote processes, there is a need to implement a service component at both the remote site manufacturing stage and the supplier central/master location, to provide the necessary connectivity, services, and business logic (rules) to maintain the desired levels of control, integration, and feedback.

In this instance, such integration is provided by the interconnected messaging and control between a central and local instance of the MDI. The central instance is configured as a 'Master' node, and as such, manages the routing of control information to one or more 'Slave' nodes, present at vendor manufacturing sites. Business behavioral rules and data are synchronized via integration of the central MDI instance with the supplier's MES Backbone.

Included among the capabilities that are enabled by such component integration is, WIP Control, a set of process and product control signals that can be sent (via the MDIs) from the Backbone to a site's MES for lot management. The WIP Control commands contained includes lot start, product/lot quality restrictions, split and merge, change of priority codes and lot hold/release/scrap rules and actions. Packaging and passing rules and actions information in this manner enables a single consistent point and manner of WIP Control via the MES Backbone, while local control systems continue to receive their necessary inputs to assure integral execution.

The following are itemized functions/features within the middleware supporting the MDI, and through it the MES Backbone. The numbers correspond to the illustrated description of MDI provided in FIG. 20.

d1. End to end data and transaction handling—robust middleware layer with encryption chosen to host the data flow between components. Management of end to end dataflow is delegated to the middleware as a service layer, isolating components from WAN (Wide Area Network) concerns.

d2. Business rules hosting—A discrete component that allows for business rules that can map, route and manage transactions and data based on industry standards and, where required, proprietary interfaces. Pulling business rules from software components.

d3. Services—The heart of the infrastructure is the services that the business rules engine can invoke for data handling and customization to the industry in which the infrastructure is tuned.

d4. Isolation Layer—The infrastructure must create an environment where mixed technologies, data types and directives can be in simultaneous usage by different interest groups but without the concern for contamination or insecure areas. Also, the infrastructure should preferably support large volumes of data, mixed with small transactions and monitoring data without collision, loss of priority. Data security and robust prioritized handling are independent of communication layers.

d5. Node processing—Each node within the infrastructure preferably should be capable of stand alone operation, with no dependencies on any other node for a period of time as determined by the environment. Each node preferably is capable of full function for limited periods of time, allowing for seamless operations over wide variances in connections.

d6. Monitors—As a distributed infrastructure, the ability to monitor and collect error notifications, traffic logging, and statistics is important to the maintenance and supportability of the infrastructure. Also important is detection and correction of problems at a business level.

d7. Penalty Box—A place to put WIP tracking signals that are erroneous either for transmission or transaction problems, before they are transacted by the MES. The Penalty Box capabilities comprise checking transmission completeness, checking critical fields for complete and correct data, checking transactions for correct order, lot id, identified components and lot quantity. It contains a place to set aside erroneous transmissions and transactions for repair while allowing good transmissions and transactions to continue. It also contains a feature to send alerts to designated audiences for recovery of efforts. The Penalty Box sets aside lots that have errors while allowing the continuous operation for good lots.

It enhances WIP tracking quality while allowing continuous operation by the MES Backbone for good lots. It places the erroneous lots in a location where they can be viewed and resolved without interrupting the MES Backbone process. The penalty box is part of monitoring and architecturally in the nodes as part of the MDI, as a service as well as the Backbone.

d2 and d3. The Protocol Converter—contains a set of functions that take industry standard transmission inputs such as XML and convert then to the transaction methodology of an MES system and from MES transaction methodology back to industry standard protocols. Likewise, the Protocol Converter accepts manual inputs and converts them to appear the same to the MES system as automated inputs. It resides between the rules and engine and services on in the Figure. This converter allows to be easily and consistently entered from multiple vendors and systems. It allows the integration of multiple vendors with multiple styles of transmission into a common format and system.

In addition to the services array, MDI is equipped with a core set of functions that facilitate standard manufacturing-related operations. These core functions include:

Data collection and transport (including arbitrary or proprietary file types)—enables automated collection, delivery, distribution of data elements between the vendor systems and the process owner's systems;

Automated distribution of "working set" from process owner's central databases to remote MDI;

Map management (validation, storage, distribution, etc.). Manufacturing systems (particularly those related to semiconductors) routinely generate result maps, which must be stored and possibly served to subsequent processes;

Business-to-business (B2B) interface—handling of the flow of messages between the vendor and the process owner, which report changes to the status or location of work in progress (WIP) in the vendor's manufacturing line; and Separated business logic—a message-brokering component which is a participant in inter-application and inter-domain communications, and which implements workflows around those messages. This component contains all of the business logic for the processes supported by the MDI—it triggers specific actions when certain conditions are satisfied or when certain messages are detected as they pass from application to application.

Some of the services and core functions currently implemented in present-day MDI systems are oriented towards semiconductor manufacturing. This reflects the fact that the MDI concept has its origins within that industry. However, the architecture is not specific to the semiconductor industry—it is applicable to virtually any process that deals with production of goods, and where WIP must be tracked, data must be collected, tools must be managed, product disposition must be automated, etc.

The MDI contains several types of data (in the form of code, business logic, and operational data) that could be considered confidential intellectual property by the data owner. Because the MDI will likely be used in an environment that is not directly controlled by the owning organization, and because the data exchanged between the MDI and that organization will likely have to travel over public networks while in transit, access control and security are important design points. MDI's external design reflects a high level of attention to security concerns.

MDI Security

To protect potentially sensitive intellectual property (IP) that may be stored on the MDI, the server is installed within a carefully designed network environment to ensure that it is accessible to the hosting and controlling organizations, but completely inaccessible to entities on the public Internet. This environment is created using well-known network "DMZ" (demilitarized zone) techniques involving dual firewalls—one to shield the MDI from the public Internet, and a second one (internal) to provide a controllable barrier between the MDI and the vendor's internal systems.

Careful configuration of the Internet firewall element filters incoming network traffic and enables connectivity to the MDI from only selected systems. Furthermore, connectivity is typically also restricted to only a small subset of TCP/IP ports. For example, a typical outsource configuration would specify an Internet firewall at the vendor location that only enables connections to the MDI on ports 1414 (MQSeries) and 22 (Secure Shell, or SSH), and only from a handful of systems specified by the controlling organization.

Configuration of the internal firewall is typically at the discretion of the vendor. A small set of ports should be designated as pass-through from the MDI to certain internal systems (for example, testers) but the decision regarding whether or not to close other ports (FTP, Telnet, etc.) is optional.

Network architecture, combined with physical access control, provides the first layer of MDI security (i.e., control over what entities are capable of reaching the MDI, and from where). The next layer deals with logical access—once an entity has direct, or network, access to the MDI, there must be controls to prevent unwanted access to MDI internals. This layer is managed by the user ID and account management functionality that is built into the MDI operating system.

From the MDI's perspective, the world is first divided into only two major groups—those that can access the MDI (either directly or via the network), and those that cannot. This separation is realized through the use of network barriers, i.e., firewalls, as described previously. Now the first group (those that can access the MDI) must be further divided—those who can access the MDI's internals (the controlling organization), and those who can only access specific predefined service interfaces (the vendor organization). This division is realized through a combination of user ID management and application design.

In general, no vendor entity is granted access to the MDI's internals. This means no one can log in, or use FTP or any other access method to enable them to view, modify, or other manipulate any of the MDI's internal private data. In this sense, the MDI is effectively a "black box"—the vendors send data to it, retrieve data from it, and communicate with it via specific interfaces, but are otherwise unable to determine the details of its internal operation.

In contrast to the "no access" restriction typically placed on the vendor entities, the controlling organization generally requires direct internal access to enable basic support, configuration, installation of business rule changes, etc. This is accomplished by granting user accounts on an individual, justified need basis, and engaging standard account management techniques (automated password expiration, failure counting/locking, etc.).

The last layer of security that should be addressed is transport-level security. Advisedly, all data passing into and out of the MDI should be encrypted to prevent eavesdropping as that data passes over unsecured networks. For example, all data and message channels could be implemented on message-oriented middleware, which uses 128-bit strong SSL encryption, and which uses SSL certificates and third-party authentication to guarantee source and destination authenticity. All remote logical access (i.e., logins) use industry standard secure shell (SSH) methods, which also employ strong encryption to protect passwords, commands, and data from eavesdropping.

Building the MDI

Figure 19:
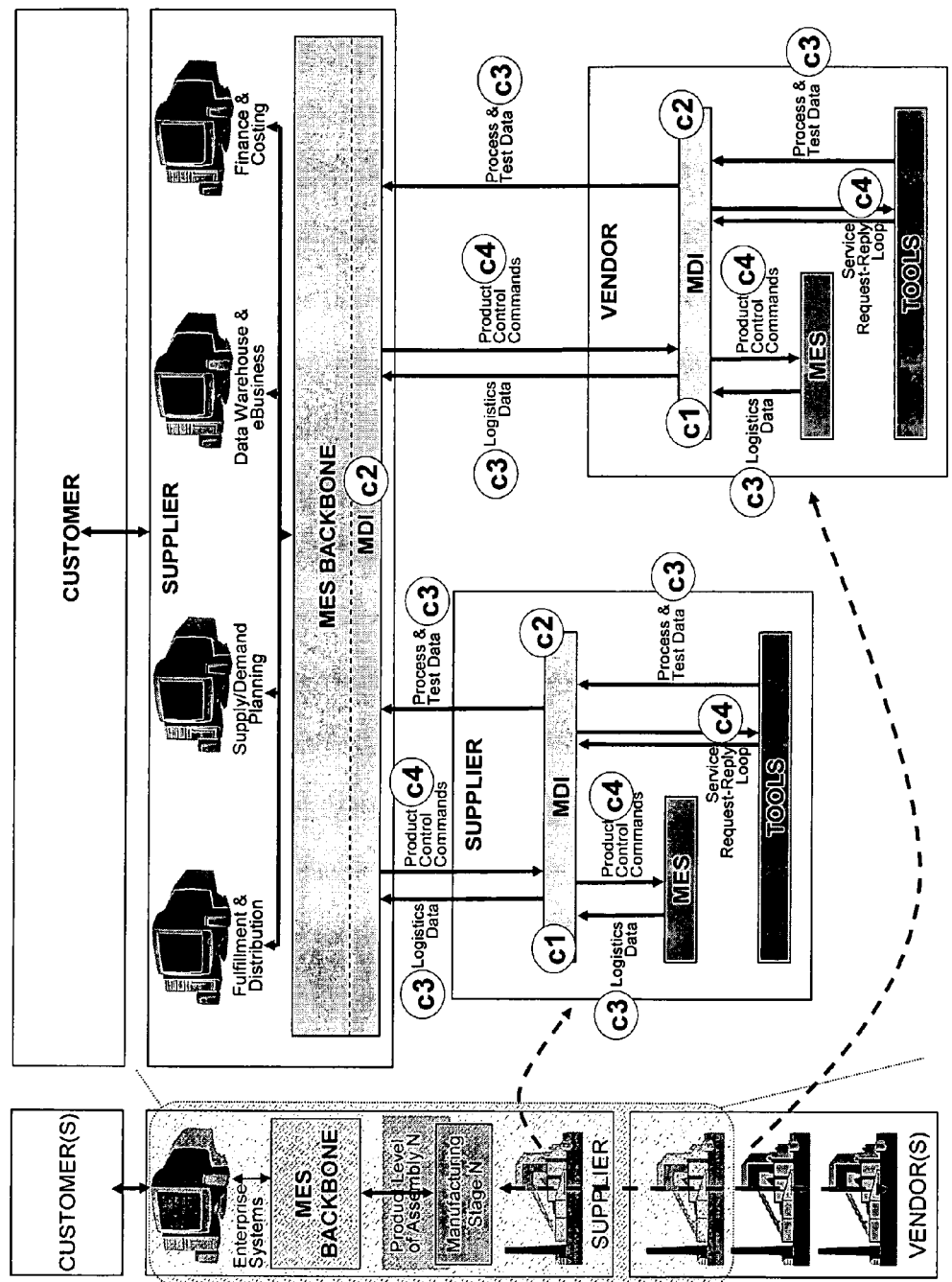
FIG. 19 illustrates functions/features within the middleware supporting the MDI.
Figure 20:
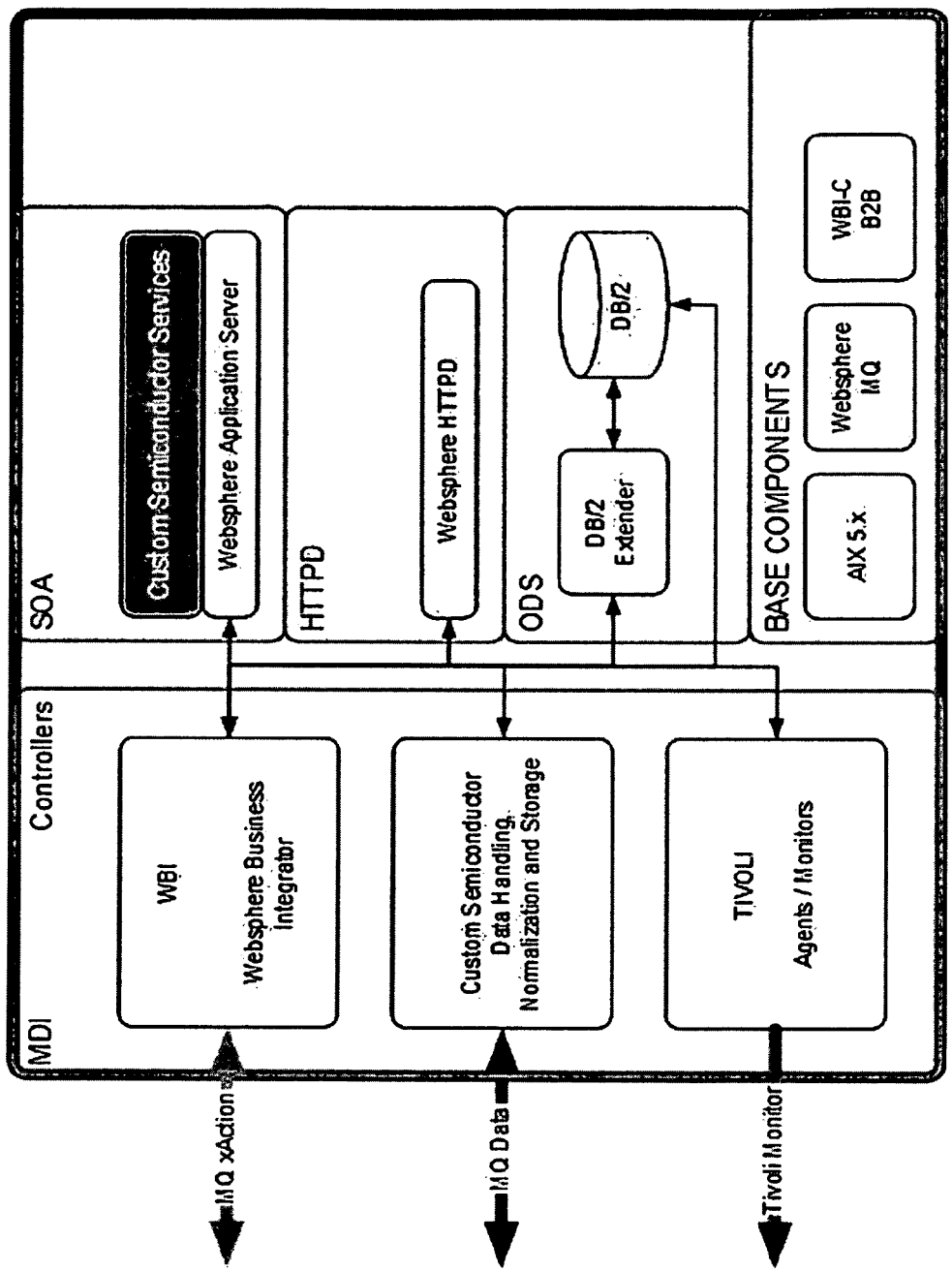
FIG. 20 illustrates the components of the MDI.
Figure 21:
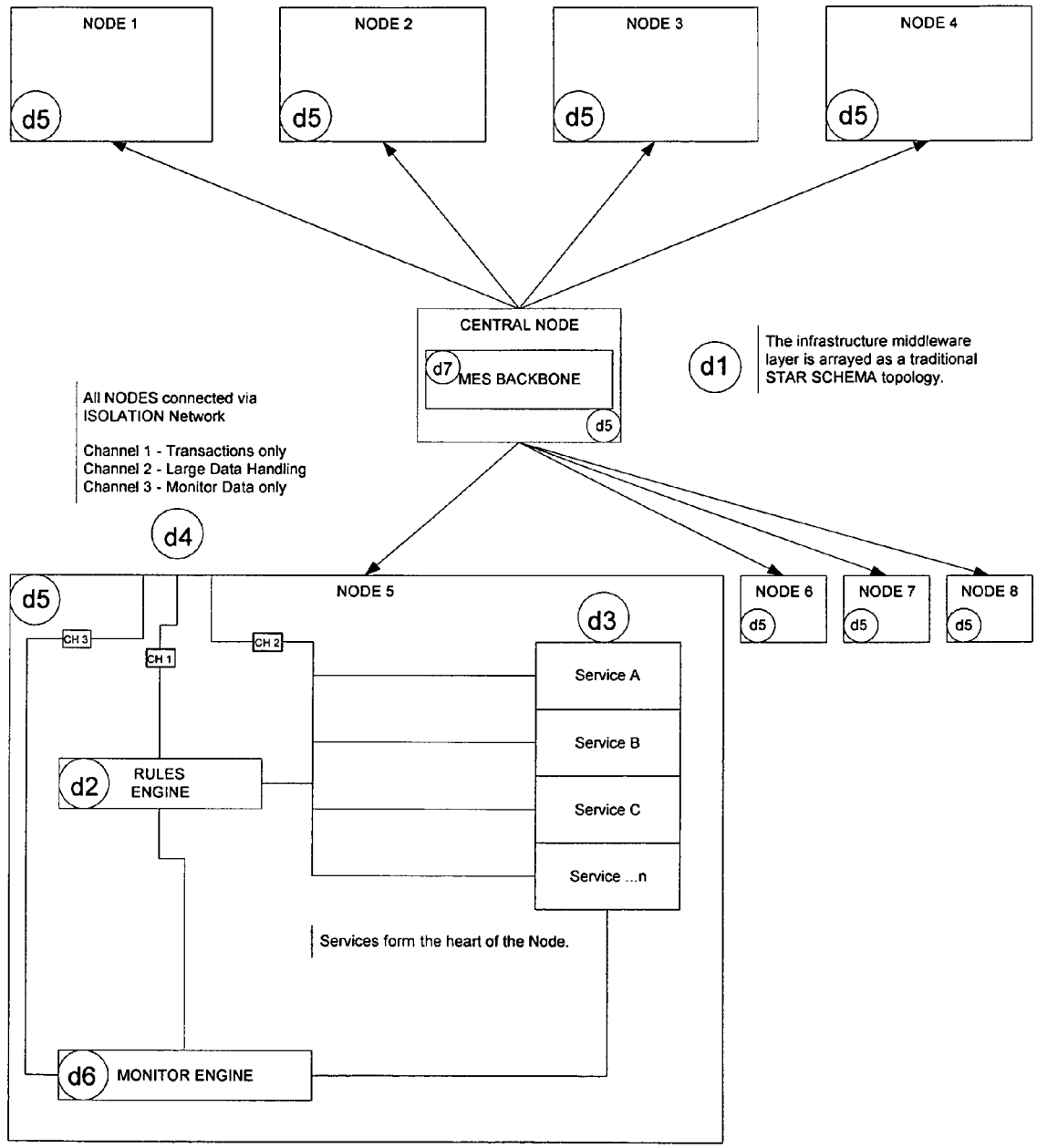
FIG. 21 illustrates the MDI topography.

The components listed below are organized to create and build an MDI infrastructure that is capable of dynamic outsource connection, peer to peer processing, and central hub reporting. The infrastructure can adapt to changing conditions and business opportunities real time. An embodiment of the MDI comprising installed product components is illustrated in FIG. 19. The alpha-numeric heading each component correspond to legends for components illustrated in FIG. 20.

d1. The connection layer between processing nodes consists of a message oriented middleware (MOM) that is broken into multiple channels for isolation. This layer is fully responsible for source and sink of data transactions from one node to another, ensuring transmission, integrity and security of the data in open public networks. Specific to the implementation of FIG. 20 IBM Websphere MQ is utilized to fill the MOM requirement. MQ Series was implemented using clustering architecture to provide for fault tolerance and load distribution.

d2. The business rules engine is a component within the infrastructure that provides the methodology necessary to instantiate a non-invasive component within a vendors manufacturing environment. Rather than attempting to provide unique software code, patches and solutions, the business rules are organized to drive software components "on-demand". Within the implementation illustrated in FIG. 20, the Websphere Business Integrator Message (and Event) Broker application was chosen. This application allows rules to be generated by Websphere Business Modeling tools and from other sources that utilize the Business Process Execution Language (BPEL).

d3. The Services framework within the MDI system infrastructure allows for the actual customization of the nodes to the business opportunities required at a given location. The combination of the services with the BRE (Business rules engine) and the middleware transport layers allows the MDI to execute in an "On Demand" environment. One of the more generic services implemented in the example solution, was to provide a service that would validate various datasets returned from process tooling and testers against the logistics stream often broadcast in the industry across Rosetta Net, in this instance a 7B1 PIP which has WIP (Work in Progress) information. Often the data arrives separate from the logistics feeds forcing manual reconciliation. The service instantiated will allow a "Rule" to be placed in the rules engine that states, when a 7B1 arrives call service X to see if the data channels have the proper and matching data for this transaction. The services are crafted to provide simplistic YES/NO or GO/NO GO responses. Services can be very extensive or very simplistic; this is left to the design of the given node. The key element is that if services are not resident within the node for a given new rule, a second rule will be called to "Get" the required service from a central Node, instantiate that service locally, and then handle the request. This simple but powerful concept allows the MDI system to be a fully "On Demand" system that requires little more than installation of rules. It will then populate itself with the services required for the node where it is executing. Specific to implementation of a web services platform, the IBM Websphere Application Server was used (FIG. 20). This allows the service generation to be accomplished using several choices. The inventors choice for SOAP and J2EE services was to utilize Java as the source build language. Additionally, components that ship with the IBM Websphere application server, such as the HTTPD server and on board UDDI services were utilized. In addition to the WAS environment, the inventor also placed an IBM DB/2 relational Database (RDB) into service to handle persistence of the service data and to act as a transient repository for various datum.

d4. The infrastructure to work effectively must properly handle data and transactions and be able to effectively communicate priority transmissions and large data streams without contention or impacts. An Isolation layer allows for this by developing "channels" within the communications stream to handle differing data types.

d5. Each node has at least one MDI system to form the channeled interconnect, and nodes must connect through the MDI systems. Other domain level systems can be formed with the node and can run standalone. The central node is a unique instance that forms the "hub" of the spoke and hub network. This instance provides the centralized processing. This implementation of the hub used MDI in addition to the IBM Assembly View Manufacturing Execution System (AsmView MES).

d6. The monitor engine is responsible to collect system alerts and to provide error notification both remote and locally. The implementation preferred in FIG. 20 uses the IBM Tivoli agent. This agent monitors both the hardware subsystem (IBM RISC 6000 system) and the software components. All of the IBM Websphere products are designed to integrate to the Tivoli monitoring suite. The monitor engine is enabled to send email via SMTP local or remote. In addition Tivoli interacts as the 3rd channel in the isolation network, on port 93 sending monitor and alert data back for central consumption by support groups.

d7. The MES backbone, is a portion of the unique node with a dedicated MDI system. The embodiment described herein used the IBM AsmView system.

The MDI system to be effective needs to communicate with the vendor systems using several common protocols and specifications. The IBM Websphere Business Connect tool was used to bring to bear full Industry standard B2B transactions (Rosetta Net). Also native protocols, HTTP, HTTPS, FTP, SFTP, TELNET, SSH, DNS, round out the MDI capabilities. Many of these come as an extension of the IBM AIX operating system.

The services described below are examples of MES Backbone and MDI services that fulfill the business goals of managing products serially across multiple manufacturing assets integrated into a single enterprise architecture while controlling manufacturing remotely in real time.

Figure 22:
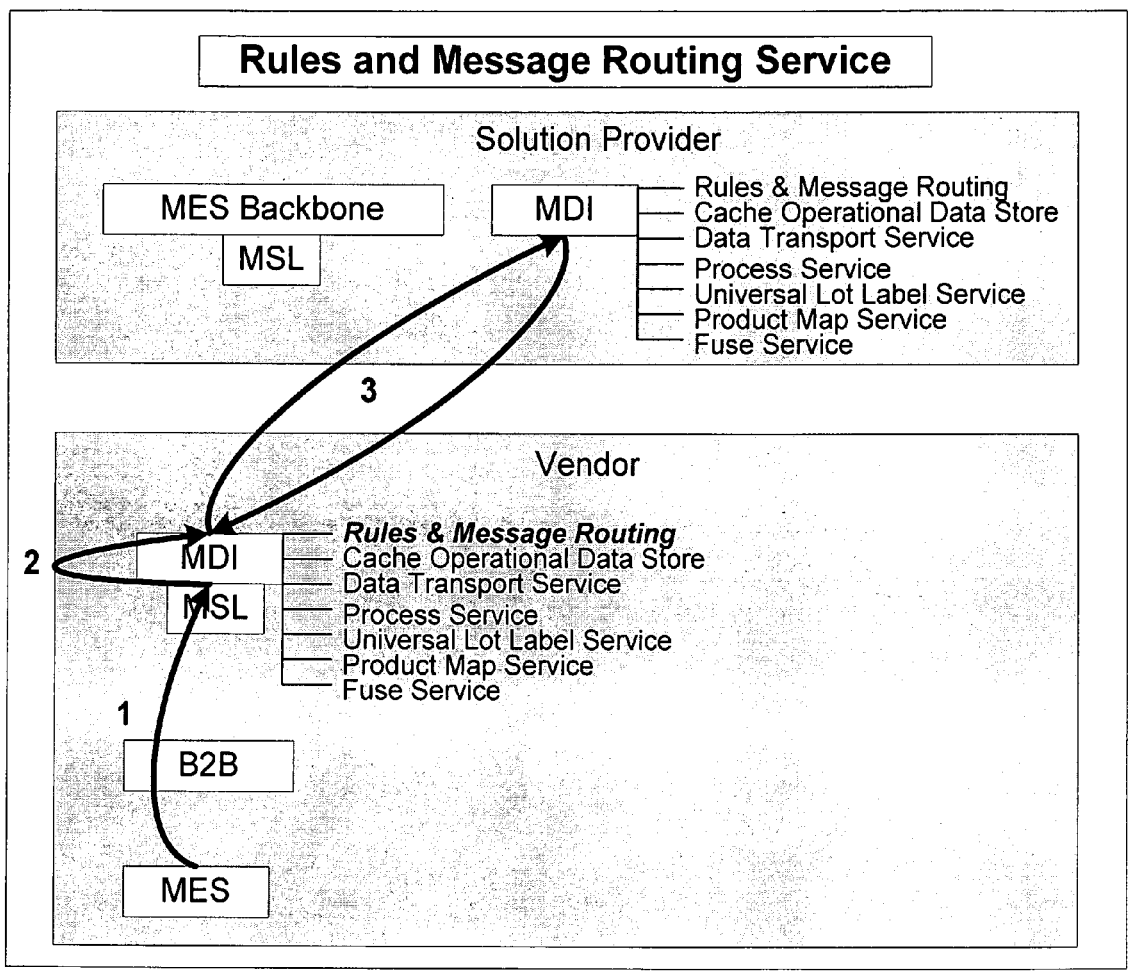
FIG. 22 illustrates the MDI Rules and Messaging Service (Part A).
Figure 23:
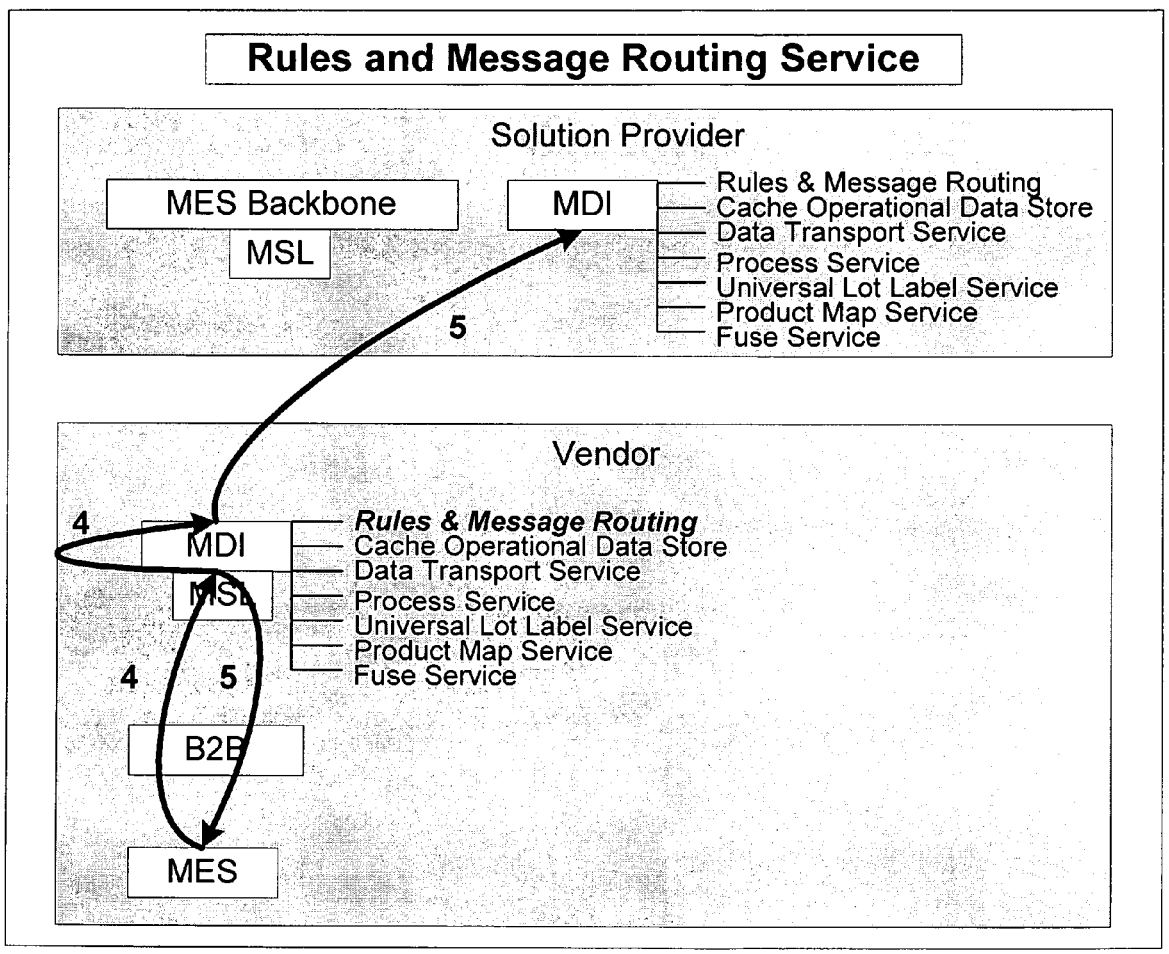
FIG. 23 illustrates the MDI Rules and Messaging Service (Part B).

Rules & Message Routing Service Operational mode (FIGS. 22&23):

1. The Rules and Message Routing Service receives a service request from any of the systems in the solution and directs it to the most appropriate service 2. If the service is not activated on the vendor system, it will activate the service 3. If the service is not available, it will request the service from the master MDI at the solution provider.

4. If the message is a lot/operation transaction, it will check the transaction for correct execution including operation sequence, unit count, lot state and attributes.

5. Errors are detected and notification is sent to a distribution list at the vendor and solution provider.

Business Benefits:

1. This service enables manufacturing assets to be located in any number, at any place by any company.

2. It integrates each manufacturing asset seamless to the Backbone as a virtual enterprise 3. When employing the RosettaNet transaction protocol set, message transmission is completely automated to enhance timeliness of execution, quality of execution and cost of execution.

Figure 24:
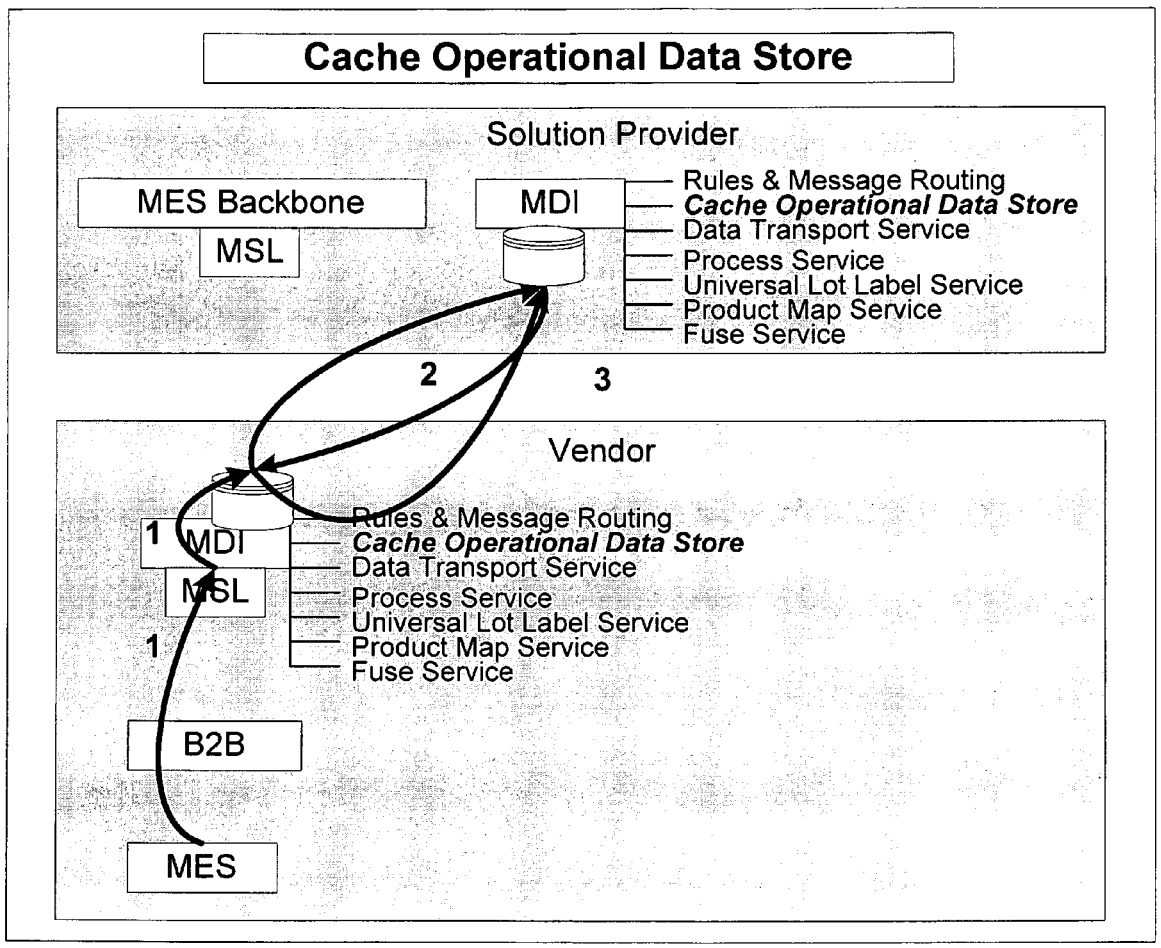
FIG. 24 illustrates the MDI Cache Operational Data Store.
Figure 25:
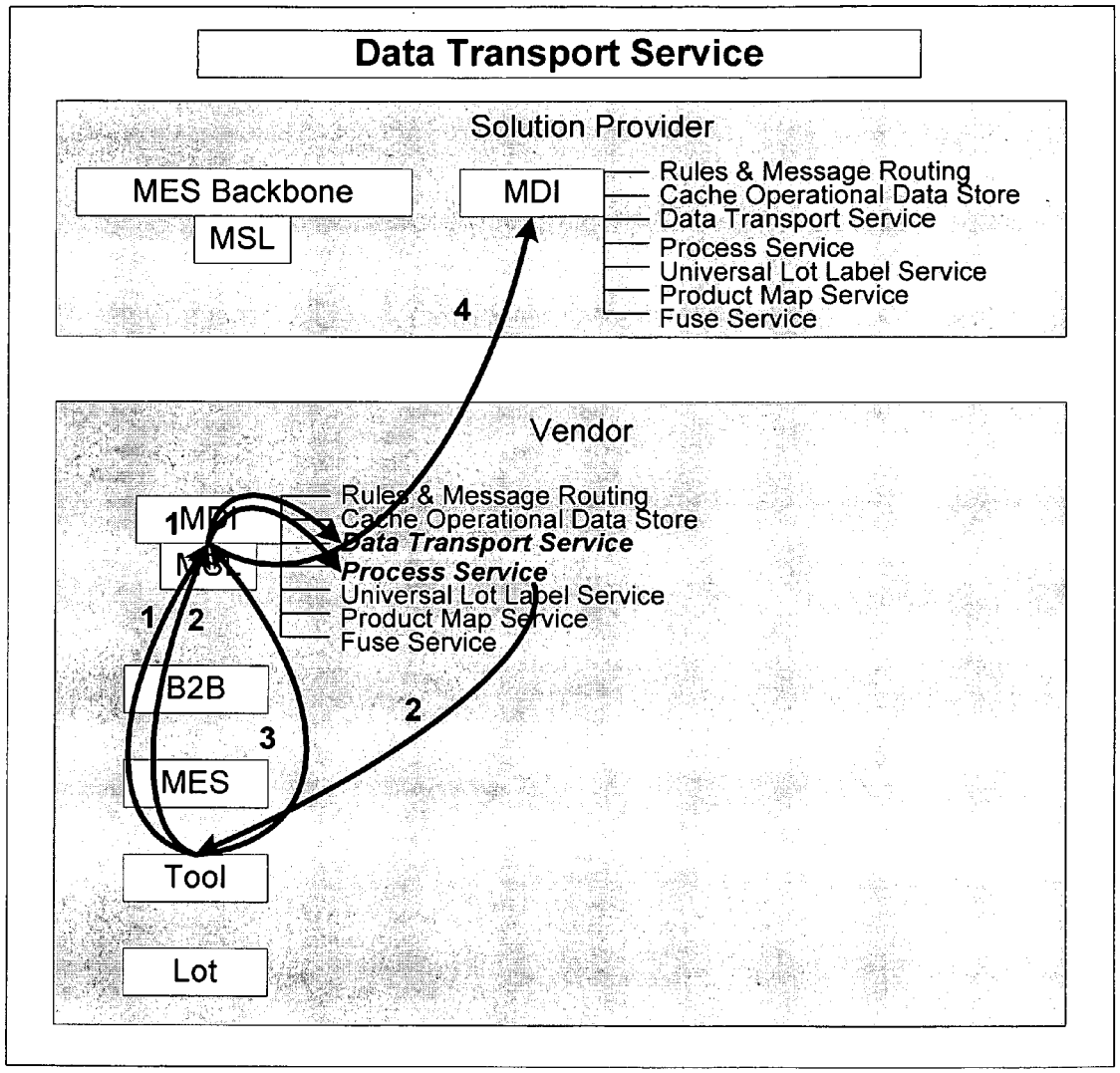
FIG. 25 illustrates the MDI Transport Data Service.

Cache Operational Data Store, CODS FIG. 24:
Operational Mode:
1. The CODS function receives calls for data from the services and caches the data to allow the service to execute.
2. If a service requests data that is not available, it calls for the data from the solution provider's master MDI server and caches the data for the local service.
3. The CODS will send batch updates of the locally cached data to the solution provider's master MDI Business Benefits
1. Every site has the most current copy of execution parameters to ensure quality of execution
2. Information is downloaded on demand to ensure timeliness of execution Data Transport Services (FIG. 25)
Operational Mode:
1. The Data Transport Service will initially check to see if a product map is both required and present. If it is not, it will prevent the test from commencing.
2. As the test progresses, the Data Transport Service compares the incoming test results with the Process Service and if the Process Service detects abnormal results, the Data Transport Service will send a command to the test to halt the test and send an error notification to the vendor.
3. Once the test data is collected from the vendor's test equipment through a firewall, it is converted into a standardized data format.
4. The collected data is sent out through a firewall via the Internet to the solution provider's master MDI server.

Business Benefits
1. The service ensures quality of execution by providing correct operational parameters to the tool and by checking the actual in-process execution results
2. Timeliness of execution is ensured by checking the available of lot maps before execution.

Figure 26:
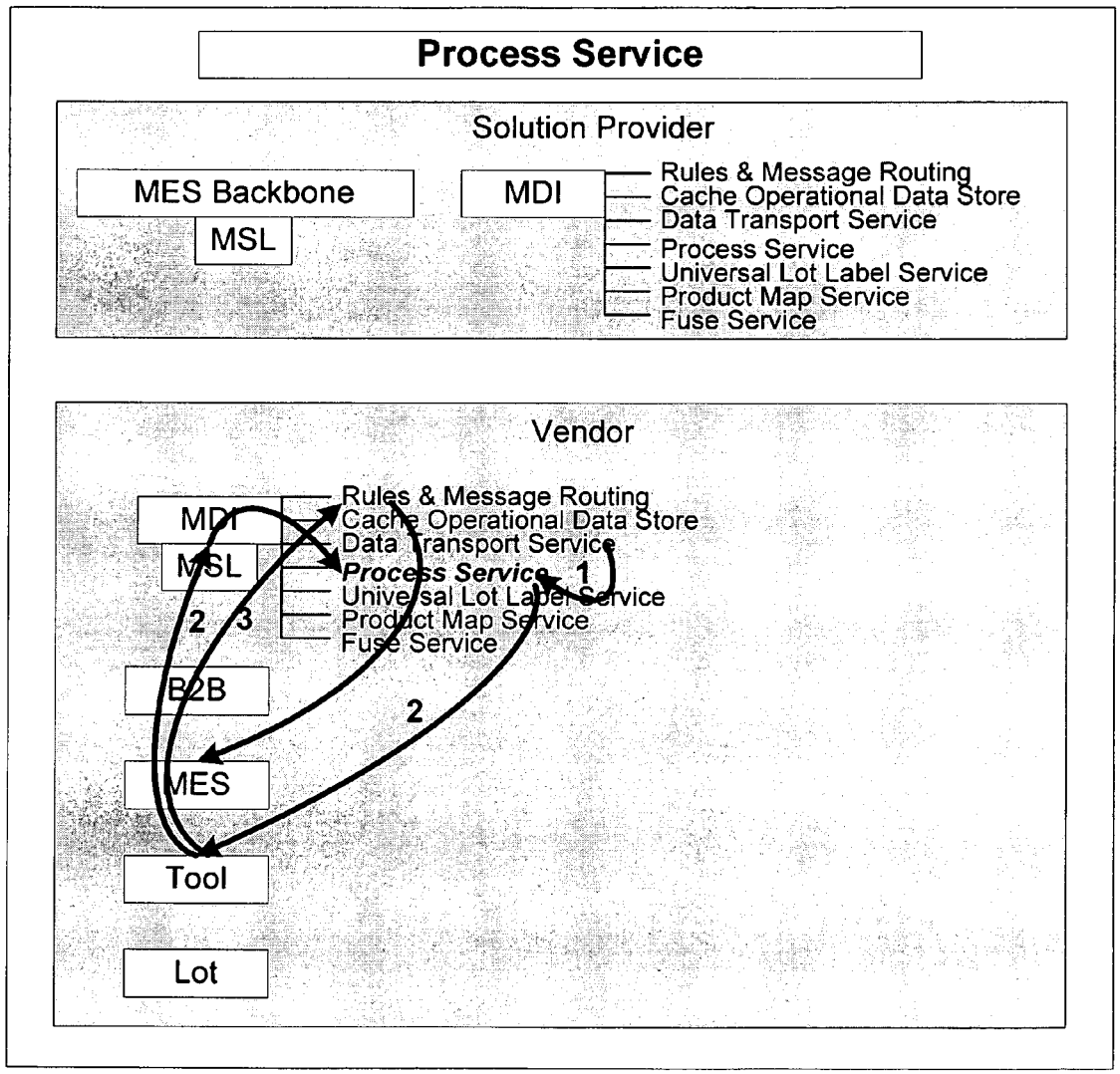
FIG. 26 illustrates the MDI Process/Disposition Service.

Process Service (FIG. 26)
Operational Mode:
1. The Process Service disposition engine receives test input from the Data Transport Service and checks the results against the disposition rules for abnormalities.
2. If abnormalities are discovered during a run, the Disposition engine sends a signal to the Data Transport Service to interrupt the run.
3. If the test run completes, the Disposition engine provides the results to the Rules and Message Routing Service for distribution either to the user interface or directly to the vendor's execution system.
4. The results include the disposition of the defective material—retest, rework, hold or scrap—based on product specific rules.

Figure 27:
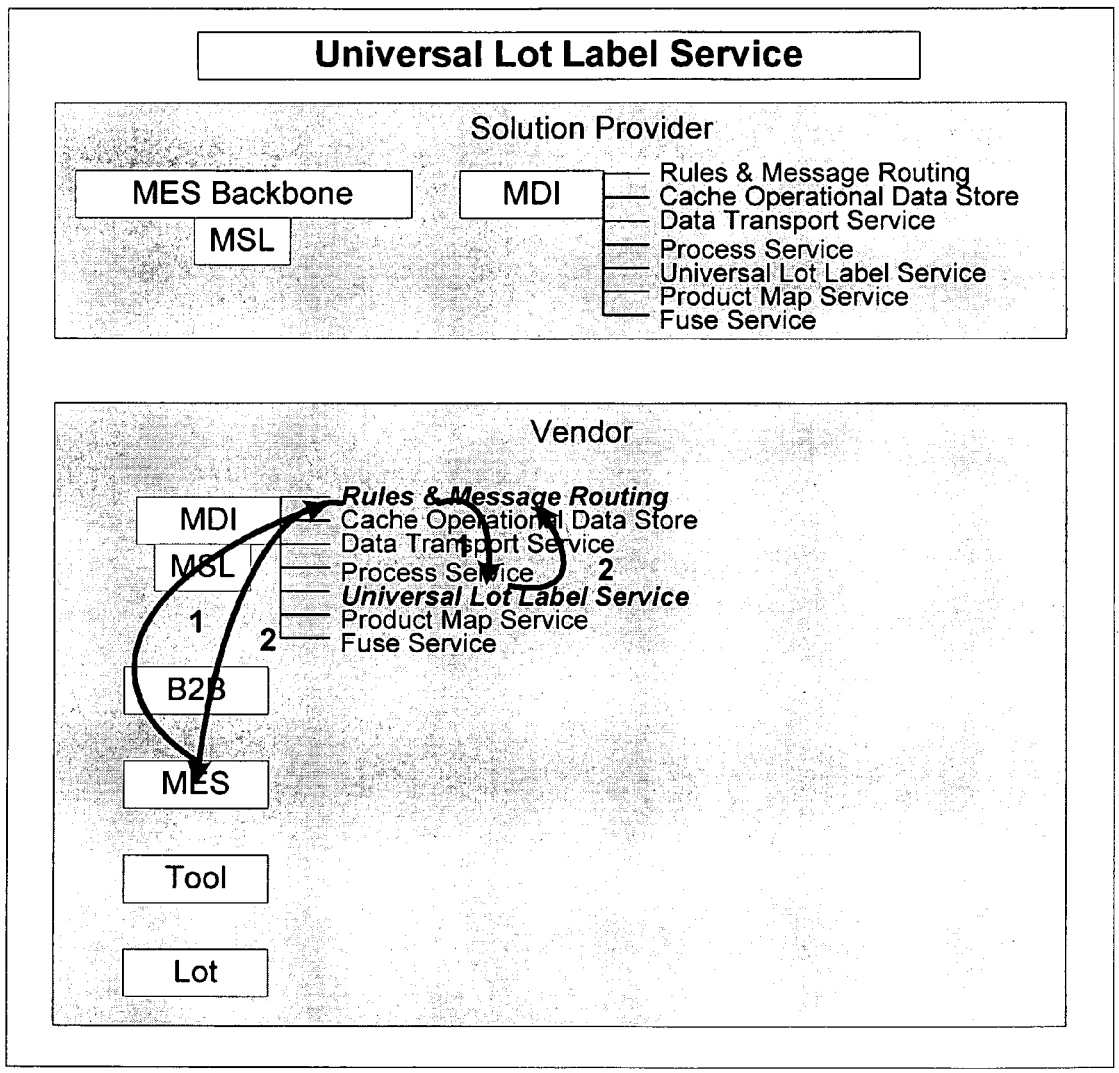
FIG. 27 illustrates the MDI Lot Label Service.

Business Benefits:
1. This service allows uniform management of lot abnormality and exceptions ensuring consistency of quality across sites.
2. The automated service allows timeliness of operation Universal Lot Label, ULL, Service (FIG. 27)
Operational Mode:
1. The universal lot label service will receive a request either through the manual interface or directly from the vendor's execution system via the Rules and Message Routing Service.
2. The ULL service checks the parent lot label and the operation requested and returns an appropriate lot label.
3. If customer or vendor lot labels are required, these are created as well and returned.

Business Benefits:
1. The ULL service provide complete site uniqueness in splitting and merging lots ensure quality of data
2. The complete lack of ambiguity enhances lot parentage traceability thereby enhancing control over the containment of quality issues.
3. The universality of the lot label allows the end customer to follow the lot from beginning to end regardless of the manufacturing asset used.

Figure 28:
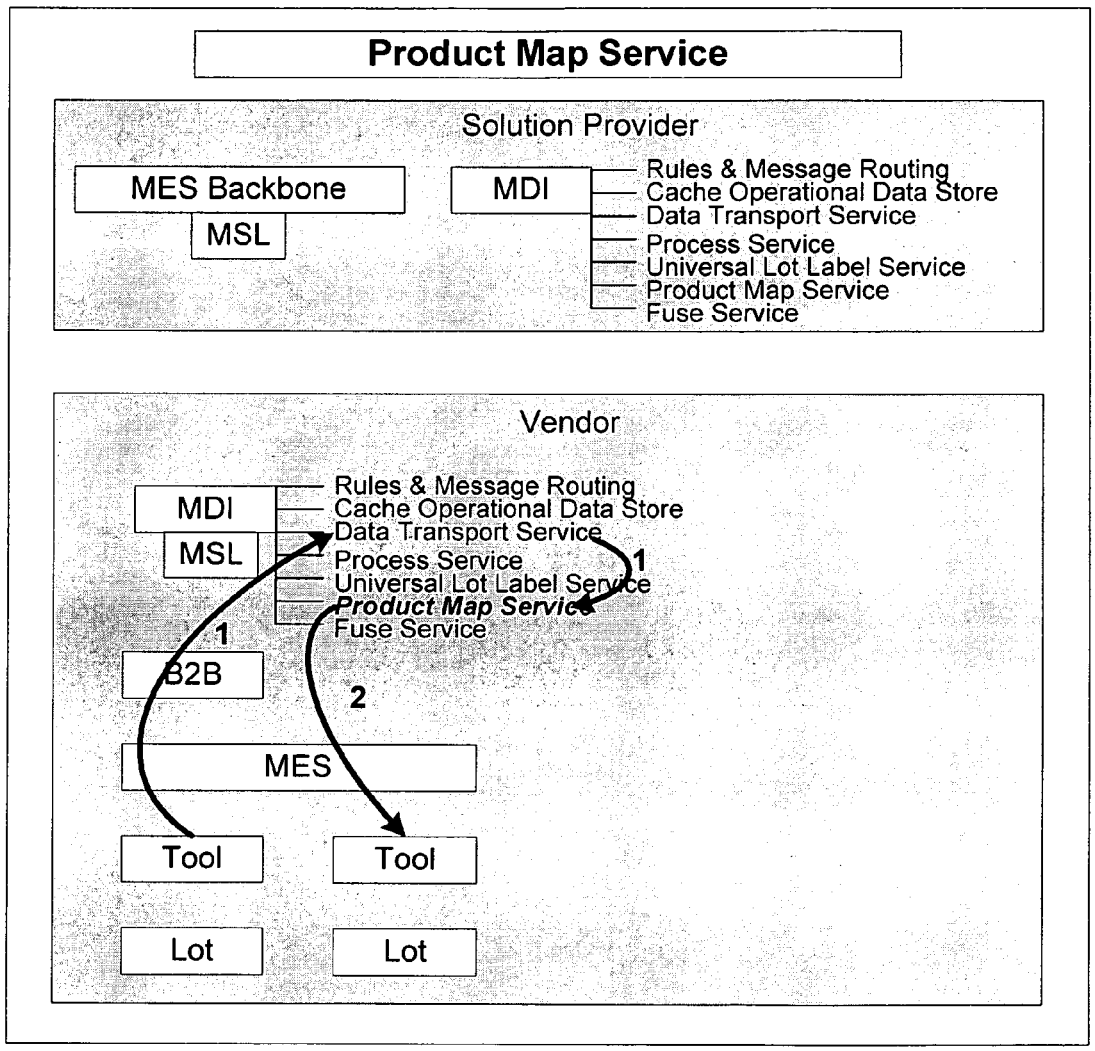
FIG. 28 illustrates the MDI Product Map Service.

Product Map Service (FIG. 28)
Operational Mode:
1. The Product Map Service accepts product maps from the Data Transport Service and combines the latest results with the product maps fed forward.
2. The Product Map Service will provide the new combined map upon request for the next operation Business Benefits:
1. The service allows product test and inspection results to be carried forward from operation to operation, from manufacturing asset to manufacturing asset creating a complete virtualization of the manufacturing process.
2. The service allows product optimization for maximum yield
3. Sequential lot map creation allows optimum yield analysis for product and process improvement.

Figure 29:
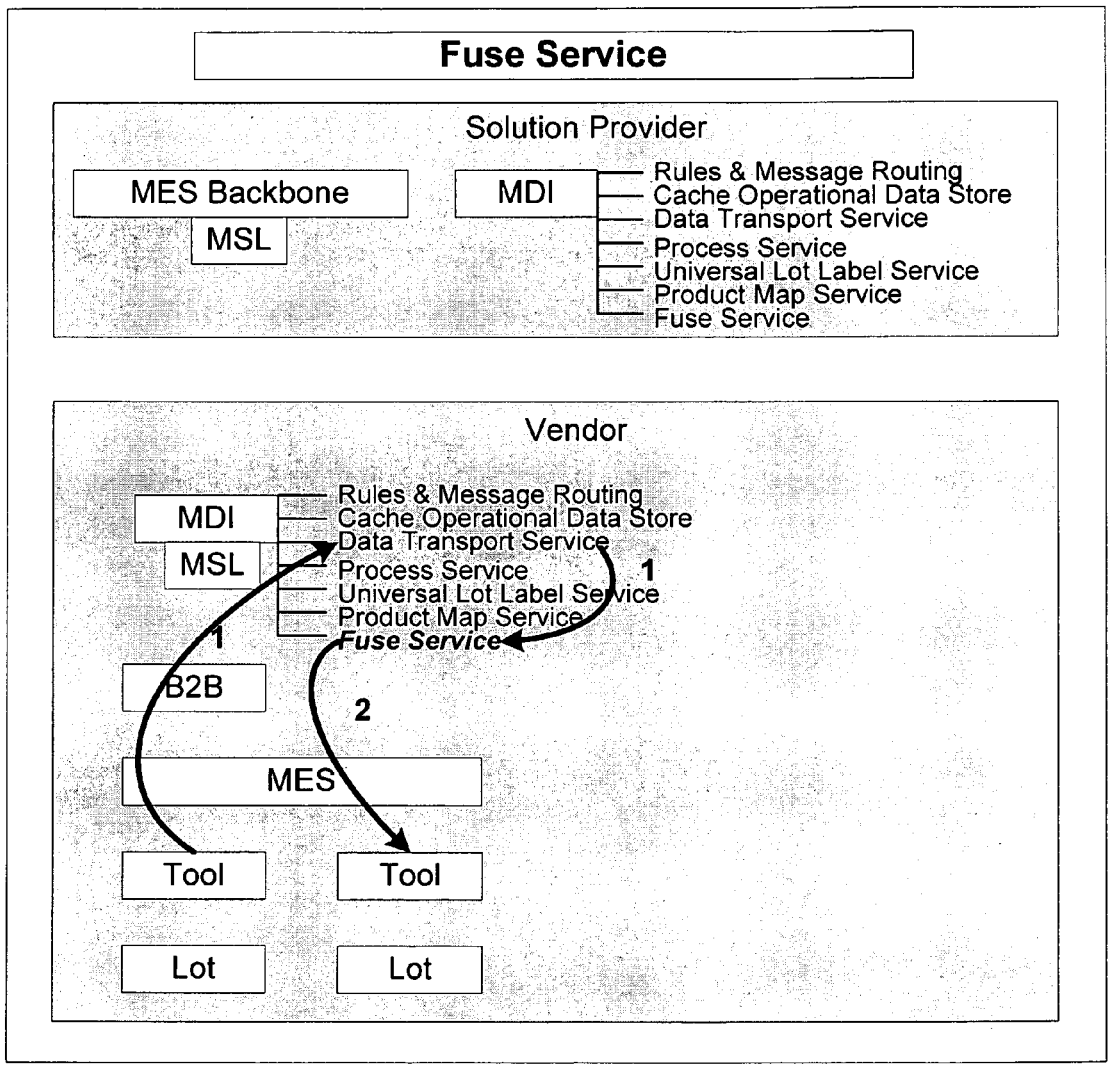
FIG. 29 illustrates the MDI Product Fuse Service.
Figure 30:
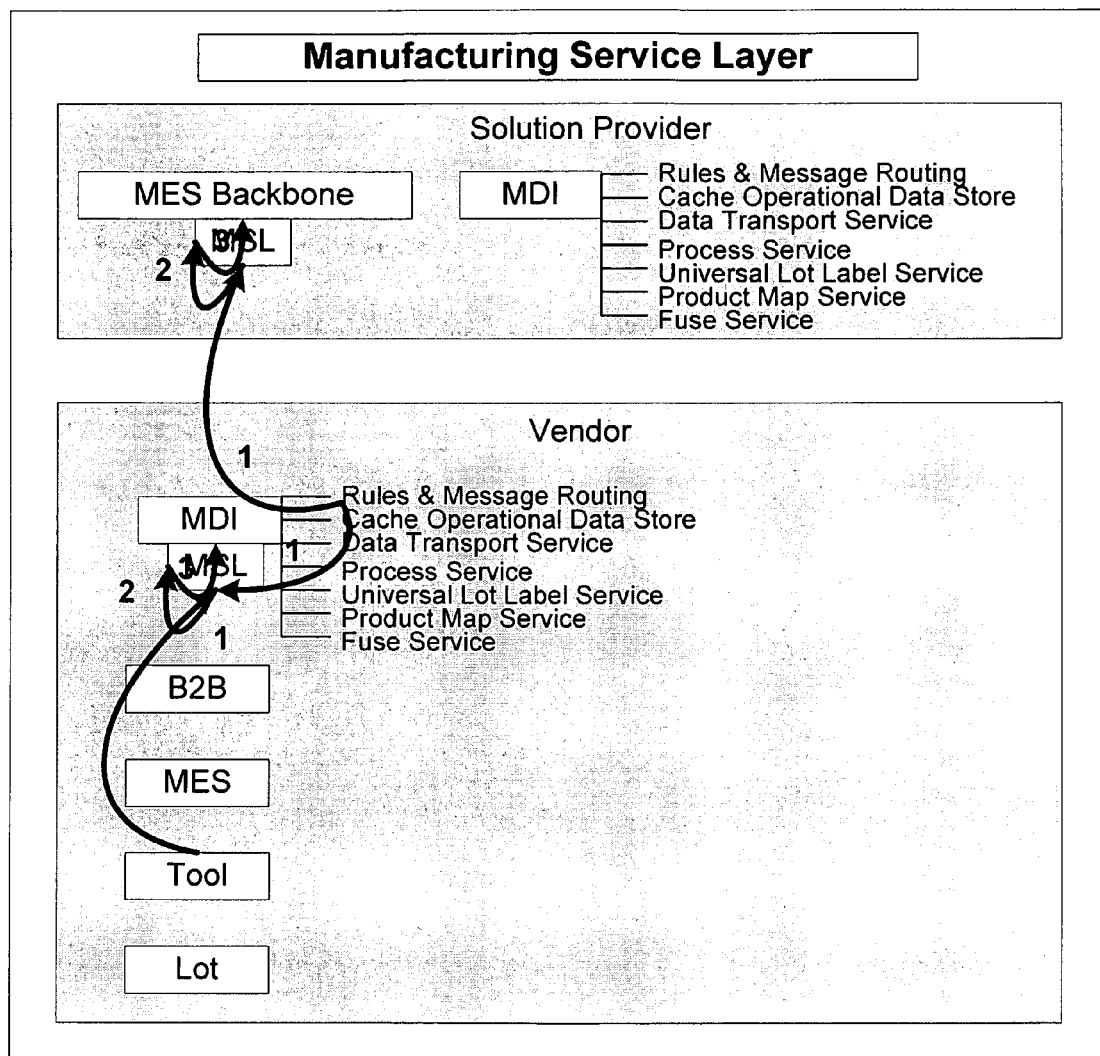
FIG. 30 illustrates the MDI Manufacturing Service Layer.

Fuse Service (FIG. 29)
Operational Mode:
1. The Fuse Service requests fuse product specific fuse string geometry
2. It calculates which fuses need to be blown
3. The service outputs the fuse maps to the tester Business Benefit:
1. The service allows remote product alteration to improve yield or to customize to specific customer requirements Manufacturing Service Layer, MSL (FIG. 30)
Operational Mode:
1. The MSL receives incoming transmissions from the vendor over their gateway or from the Rules and Message Routing Service.
2. It checks each transmission for correctness including sequential order, data accuracy and all master fields filled in.
3. If the transmission is correct, it is formatted into a transaction for the MES Backbone or the MDI
4. If the transmission has an error, the transmission for that lot is set aside and all subsequent transmissions for that lot are set aside until the error is corrected.
5. All lots that do not have transmission errors can continue to be passed.

Business Benefits:
1. The service ensures execution quality at remote locations ensuring a common quality of execution at every manufacturing asset from end to end.
2. The service provides early warning for problems for timely correction
3. Data quality is assured at the source before it feeds the enterprise systems.

Figure 31:
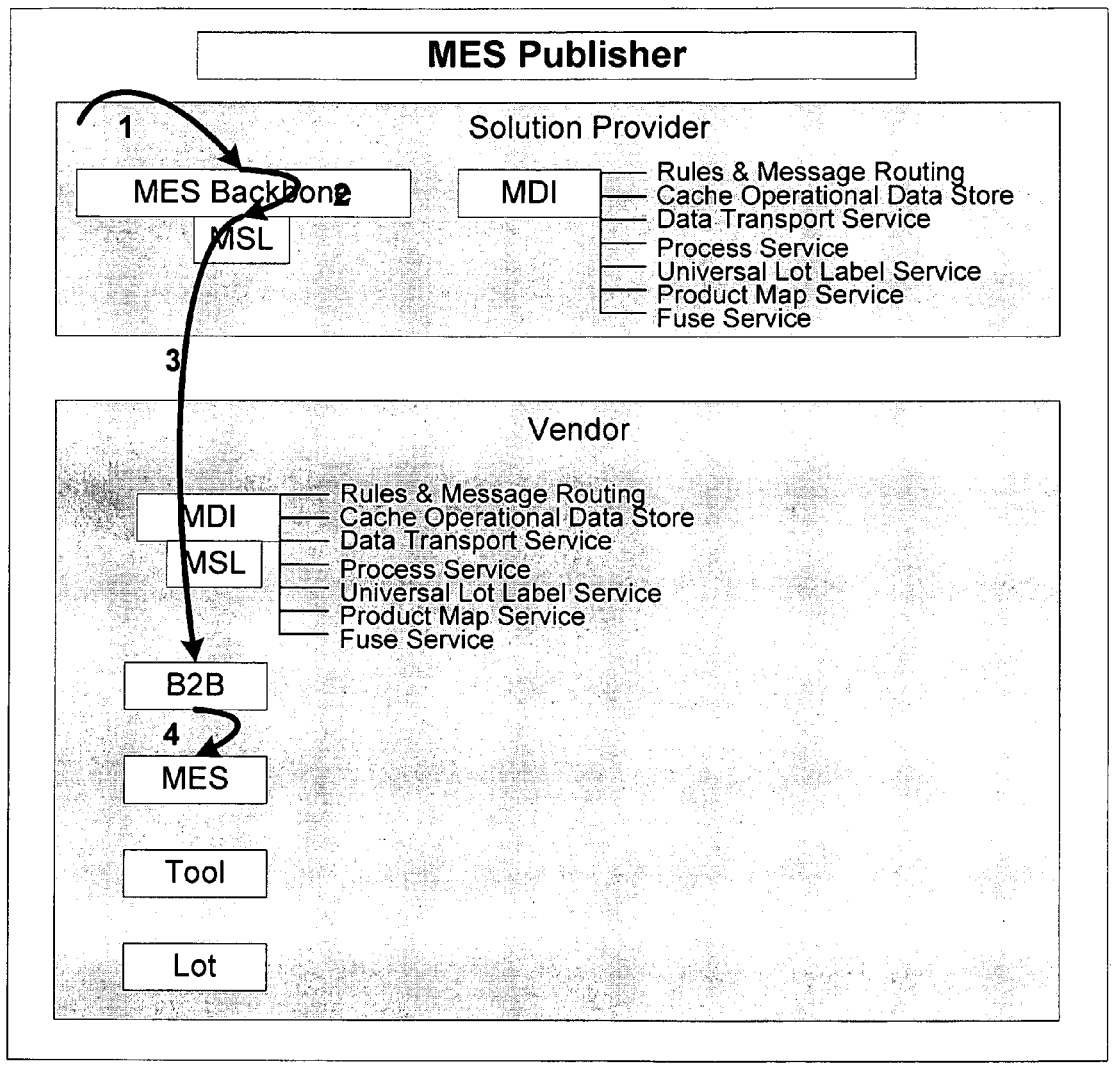
FIG. 31 illustrates the MES Backbone Publisher Service.

MES Backbone
MES Publisher (FIG. 31)
Operational Mode:
1. The MES Backbone accepts external inputs for changes in lot attributes.
2. These changes are detected as requiring publishing.
3. The MES Backbone publishes these transactions in industry standard XML format to be sent to the vendor that is processing the lot
4. The transaction is passed to the vendor's execution system.

Business Benefits:

1. This service provides universal control over a virtualized manufacturing enterprise
2. It allows on-demand changes to lots at any position in the end to end manufacturing process
3. When used with the Rosetta Net standard, it allows for automated control minimizing time, errors and cost.

Figure 32:
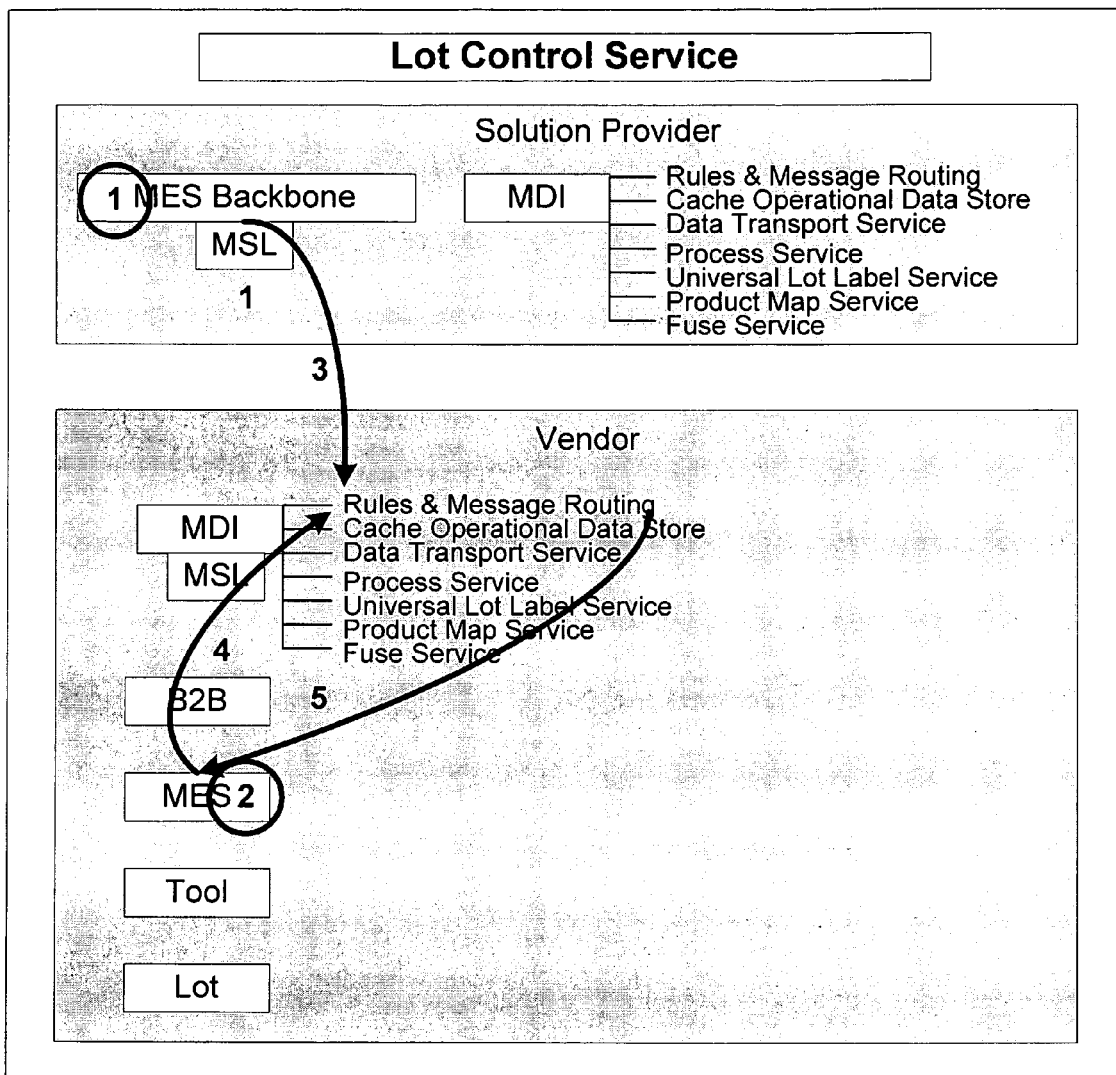
FIG. 32 illustrates the MES Backbone Lot Control Service

Lot Control Service (FIG. 32)

Operational Mode:

1. Lots are set up in the MES Backbone with the status flags set up for their correct process governing hold, release, merging or stocking.
2. The vendor sets up their execution system to recognize these status flags
3. The processing rules are set up in the Rules and Message Routing Service for execution review.
4. When these flags are set, the Rules and Message Routing Service checks against the actual execution to determine if the lot was process correctly.
5. If the lot was not processed correctly, the Rules and Message Routing Service returns an error to the vendor and solution provider Business Benefits:

1. Lots can be control uniformly from end to end and across every manufacturing asset
2. The service provides product and data conformance for reliability.

Example of Operational MES Backbone and MDI

In order to understand the function of the MES backbone and the MDI, it is helpful to place them in the context of a typical (though generic) real-world scenario.

The MES backbone and MDI combine to form an infrastructure that enables a manufacturing line to be segmented and distributed among several entities (vendors), each of which handles a portion of the overall process, while the supplier is able to manage them as an integrated chain. Each segment can also be represented by multiple vendors, with each entity being capable of executing the same processes. Using real-time capacity analysis and dynamic routing, the supplier dynamically selects entities at each line segment based on various factors.

It is also quite possible that the manufacturing line may be partially implemented by the supplier itself. For example, the supplier may handle initial fabrication for a particular product, engage several vendors to execute the next stages of manufacture, and then complete the process itself. Regardless of the degree of line segmentation, and regardless of which entities execute which segments, the backbone architecture ties the segments together into a single, continuous manufacturing process.

The MES backbone and MDI architecture is scalable and expandable, allowing a manufacturing line to be divided into an arbitrary number of segments, and to have at each segment an arbitrary number of execution entities from which to choose. However, the operation of the MES backbone and MDI can be adequately illustrated using a simple example involving a small number of line segments and a small number of vendors.

The Customer/Supplier/Vendor Business Model

For purposes of demonstration, let us construct a scenario in which a company (which we will refer to as the "supplier") has been contracted to manufacture and produce a set of "widgets" for another company (which we will refer to as the "customer"). The term "widget" is used in place of a specific identifier, since the exact definition of the widgets is unimportant for this example—the processes and interactions described here are not specific to the manufacture of a specific product.

Let us also assume that the widgets are to be manufactured in large volumes, simply because the MES backbone architecture is best justified against a backdrop of high volume manufacturing. Production of the widgets requires a multistage manufacturing process (for simplicity, let us assume there are three major manufacturing stages, each of which contains numerous discrete process steps).

In accordance with their business agreement, the customer has a set of expectations on the supplier, which the customer will be paying the supplier to meet. The supplier will:

Design and implement a manufacturing process that results in the production of the "widgets".

Manage the end-to-end manufacturing process as a seamless, continuous flow

Provide quality monitors and controls to guarantee sufficient levels of product quality Meet contractual obligations regarding customer-level cycle time and product quantity (if the supplier chooses to use the services of other vendors, the supplier is responsible for managing cycle time and product quantity at the vendor level)

Provide the customer with access to various forms of data for the purpose of analysis and audit Maintain tracking and traceability throughout the entire manufacturing process. If a lot must be split into multiple sub-lots, or multiple lots must be merged into a super-lot, the relationship between them must be apparent For reasons that are not important in this example, the supplier has decided to engage the services of several external vendors to execute three of the four manufacturing process stages. We will refer to them as "Vendor A", "Vendor B", "Vendor C", and "Vendor D". Note that it is possible that any of the vendors may also be playing a supplier role, subcontracting to additional vendors as their business processes deem necessary. However, this is not significant as long as the vendor is able to meet its obligations to the supplier, and as long as it is able to function as an apparent vendor to the supplier.

Vendor B and Vendor C both perform the same manufacturing processes. The supplier maintains a parallel, but separate, relationship with both vendors to enable the supplier to more effectively manage capacity—when sufficient manufacturing capacity is not available at Vendor B, processing can be dynamically routed to Vendor C, and vice versa. The backbone infrastructure enables every line segment to be served by one or more vendors. The number of line segments, of course, depends largely on the type of product being manufactured. There is no particular limit on the number of vendors that can be made available to supply services to a particular line segment, other than the practical limits imposed by cost and complexity. However, to preserve the simplicity of this example scenario, we will limit the number of line segments to three, one of which is served by only two choices of vendor.

Figure 33:
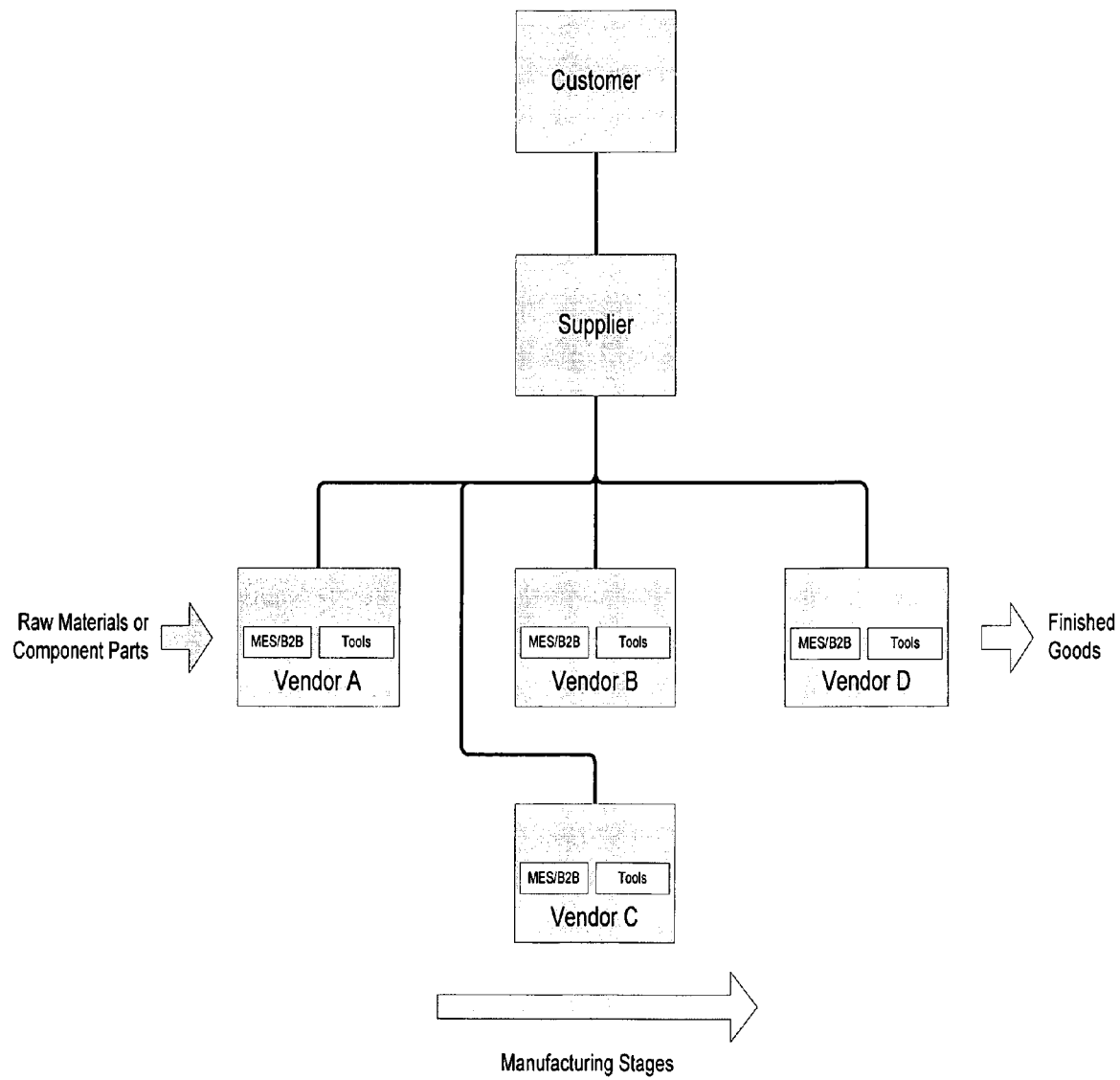
FIG. 33 illustrates in block form the customer-supplier-vendor business model.

We have now constructed an example business scenario that includes six significant participants in each of three significant categories (customer, supplier, and vendor). The customer will pay the supplier to manufacture a set of goods, presumably according to a design supplied by the customer. The supplier, in turn, will pay several vendors to execute the actual manufacturing operations. The supplier will supervise and manage the vendor operations, effectively creating a continuous, integrated manufacturing line out of disparate segments. This relationship between the participants is illustrated in FIG. 33.

Figure 34:
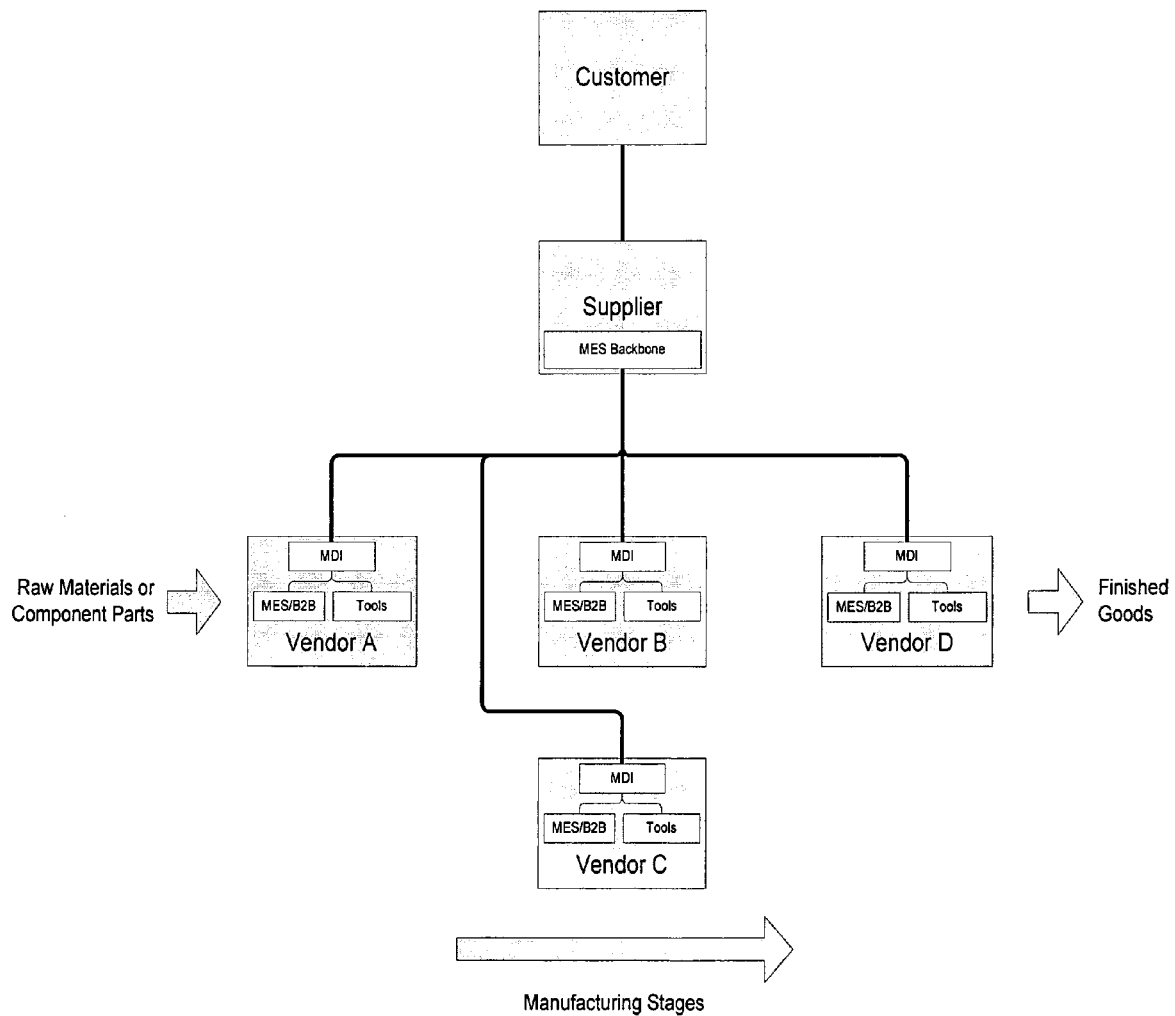
FIG. 34 illustrates in block form the MDI and MES Backbone in context.

We now in FIG. 34 overlay the previously described MES backbone and MDI components to create a backbone-managed production line. As illustrated in FIG. 34 the MES backbone is connected to the individual MDI instances (one at each vendor), and each MDI instance is connected to that vendor's MES and/or B2B system, as well as one or more tools.

Of course, there are many discreet steps that must be executed to construct the infrastructure illustrated above, including installation of various systems and applications at the vendors and the supplier, configuration of secure network connectivity, construction of one or more product "routes" on the MES backbone, vendor-to-supplier mapping of operations, etc. However, this scenario is designed to illustrate backbone and MDI function during normal operation, so we will assume these steps have been completed, and all systems are functioning in a normal production capacity.

Each of the vendors depicted above is assumed to be managing their individual lines using some form of local MES, and each is assumed to be utilizing one or more tools for the physical processing of the widgets. Tools are not essential to the infrastructure, but they are usually an inescapable reality of the manufacture of physical goods, and therefore must be considered. It is also true that where tools exist, the relationship between the tools and the MDI should be understood, since the MDI plays a significant role in connecting the operations and input/output of tools to the supplier's infrastructure.

In general, the introduction of the supplier's MES backbone as a supervisory element does not require change to a vendor's processes—the vendor can continue managing the local processes with the local MES. However, in order to support the integration and coordination that is required for a backbone-managed, segmented line, some formal business-to-business (B2B) communication is required. Therefore, Vendor A's MES must somehow be capable of (directly or indirectly) reporting the existence and progress of a lot to the supplier's MES backbone. Likewise, the vendor must be capable of receiving similar messages, enabling the backbone to announce the pending arrival of new product, implement state changes (hold, change quality status, etc.). The form of these reports is less important than the content. In the interest of maximum interoperability at minimum expense, an industry standard exchange protocol (such as RosettaNet) is preferred, but it is not required. All that is required is that the vendor and supplier agree upon message format and content. Regardless of the message format or protocol, the vendor's MES should be capable of reporting information to the supplier's MES backbone. These B2B exchanges should take place through the MDI, to enable it to react to them when necessary, and to drive business logic from the events that they represent.

Depending on the specific design of the MES backbone, and depending on the chosen B2B message formats, there may exist an interface layer (or mapping layer) between the B2B receive point and the MES backbone. The function of this layer is to receive B2B messages in the agreed upon format and translate them into transactions or API calls to the MES backbone.

Life-Cycle of a Lot in this Environment

Having established the business model, and having constructed the framework, we will now walk through the life-cycle of a set of widgets as they are manufactured (throughout this scenario, we will refer to the widget set as a "lot").

Inception and Initial Build

Figure 35:
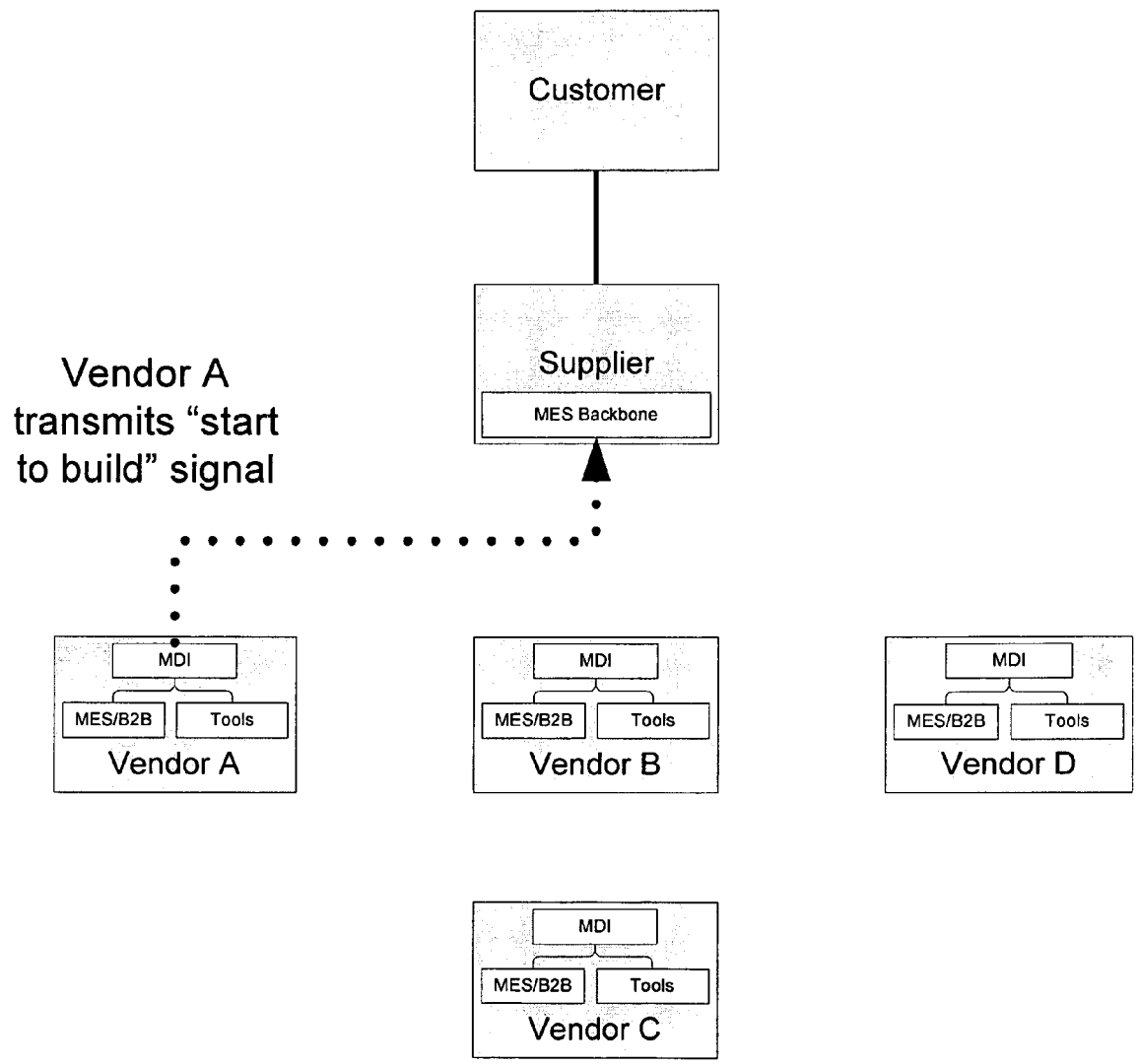
FIG. 35 illustrates in block form the start to build signal function.

In the example framework, Vendor A is responsible for the widget's initial inception. Vendor A has a contract with the supplier to begin the widget manufacture from raw materials. Therefore, it falls upon Vendor A to "announce" the inception of each widget lot so that the supplier becomes aware of the existence of the lot, so the lot can be traced on the MES backbone while it advances through Vendor A's line (and the remainder of the integrated line), and so that any data produced by Vendor A can be properly associated with the lot. Therefore, it is the responsibility of Vendor A to begin the life of a lot by introducing it to the local MES, assigning it a unique identifier (a lot label), and allowing the local MES to report the lot's inception to the MES backbone. This event (and the associated message) is commonly referred to as a "start to build" (or "STB") event which is illustrated in FIG. 35.

The MES backbone, upon receiving the "STB" signal, will create a virtual lot representing the physical lot at Vendor A. Depending on the specific details of the relationship between Vendor A and the supplier, the vendor may be responsible for requesting a new lot label from an MDI-supplied service and passing it as part of the "STB" message, or they may send a vendor-specific lot label and rely on the supplier to "map" it to a supplier-defined label. In either case, once the lot label is established, it remains constant throughout the remainder of the line to ensure constant traceability. Regardless of the method by which the lot is identified, the supplier now has registered the existence of the lot in the MES backbone, and is now prepared to track, and possibly manage, the lot's manufacture as it progresses through the line.

As the lot moves through Vendor A's line, it typically passes through many discrete manufacturing steps (or "operations"). Each time the lot (also known as "work in progress", or "WIP") moves or changes state, that change can represent a significant event that is of interest to the supplier. The level of operational granularity for reporting is completely flexible, and is typically negotiated between the vendor and the supplier. Depending on the nature of the manufacturing processes, vendor capabilities, and customer requirements, the vendor may report events as infrequently as "beginning of the line" and "end of the line" (i.e., the vendor's segment of the line is treated as a black box), or as many as once per operation. In common practice, neither extreme is used—instead, a middle point is agreed upon, where the vendor supplies several messages throughout their line segment, but not for every operation.

As the lot passes through Vendor A's line segment, it will typically come in contact with various types of tools, which will contribute to the manufacture of the lot, test the quality of the lot, or make (and possibly log) measurements on the lot. For simplicity, let's assume that Vendor A only has a single type of tool. This tool is a programmable entity, which is capable of processing a variety of widget types, each being processed with a potentially different set of parameters (a "recipe"). The tool is also capable of making measurements and writing them to a log file to be used in analysis. The customer will want to access this measurement data, so the supplier is required to retrieve and store the data for publishing to the customer.

Figure 36:
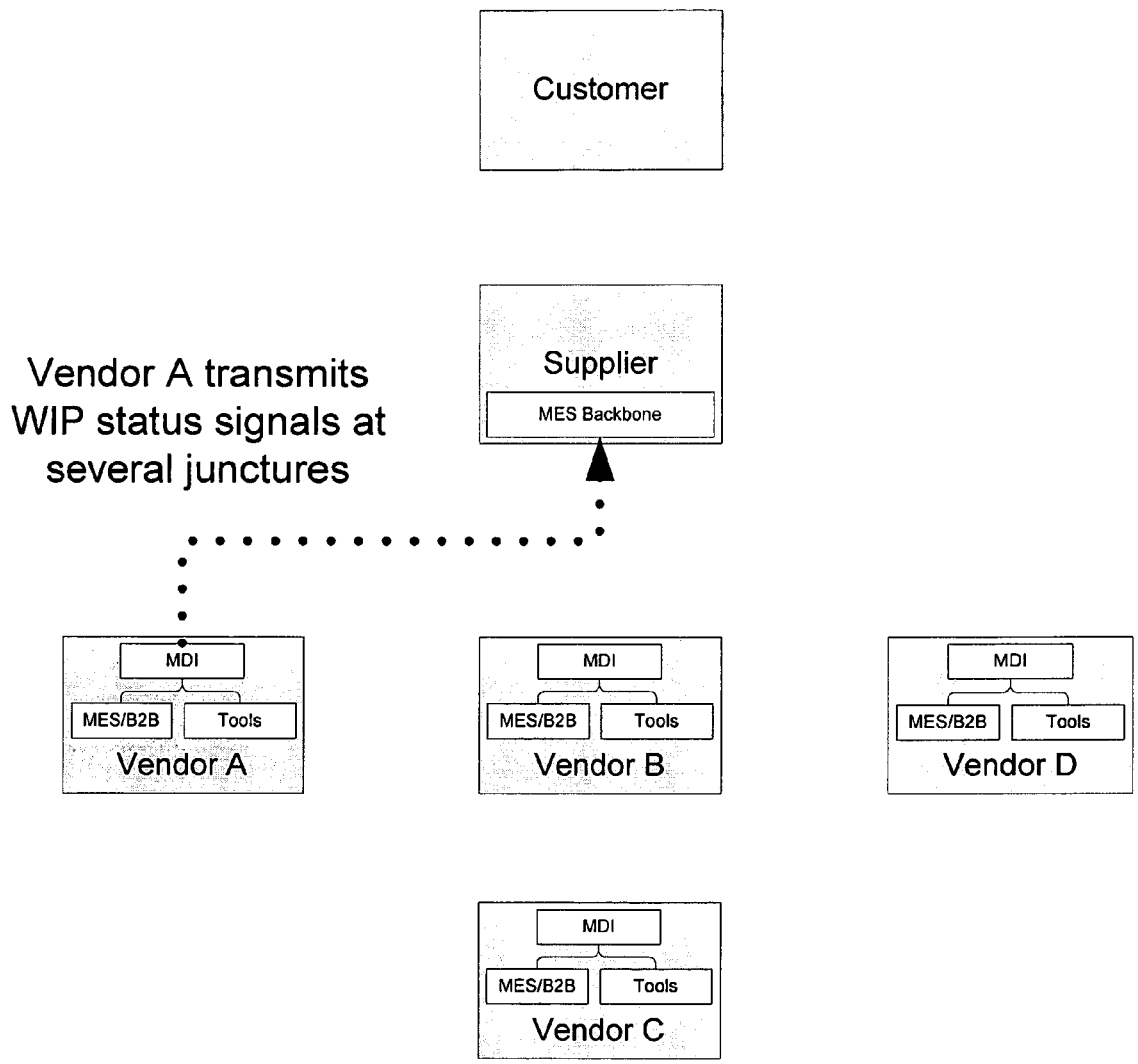
FIG. 36 illustrates in block form synchronization via the WIP status signal.

When Vendor A moves the lot to a tool, a signal may be transmitted to the supplier reporting the lot's movement to a new operation. This "WIP status" signal as illustrated in FIG. 36 may be transmitted at several points in Vendor A's line, as the product moves from operation to operation, or from tool to tool. The granularity of these signals is entirely at the mutual discretion of the supplier and the vendor—the more detailed view the supplier wants or needs into the vendor's line, the more WIP status signals will be transmitted.

As the tool is being prepared for processing of the lot, the tool may communicate with the MDI for the purpose of determining which product-specific recipe to select while processing the lot. The recipe determines how the tool parameters are set, and may also determine other factors of operation, such as the quantity or type of measurement data to collect, how many widgets to address (i.e., sample processing), etc. The tool may also request operational data from the MDI, in the form of defect maps, process rules, or other directives, which will instruct the tool on how to process the lot. In both cases, the MDI can supply this information in a context-sensitive fashion—the data sent by the MDI can be dynamically adjusted based on the lot's context or attributes.

As the tool processes the lot, the measurement data is collected and transmitted to the MDI, via one of a variety of common transfer methods (the actual method is largely determined by the type of tool and the type of data). In addition to measurement data, the tool may produce other information that pertains to the quality of the widgets (defect maps, for example). These are also transmitted to the MDI.

The MDI handles the tool data in two ways, depending on the type of data. Measurement data is typically not an operational component (i.e., it is collected, but not used during manufacturing processing), so it is simply transferred back to the supplier's central systems (typically, some type of information warehouse). Defect data, maps, and other operation data may be required by other manufacturing steps. Therefore, it is stored locally on the MDI, making it available to serve as input or control data for other tools. A copy is also transmitted back to the supplier's central systems, making it available for transmission to another vendor when the product enters a subsequent line segment.

When the lot completes processing on the tool, and is subsequently moved to the next operation, an event may be reported to the supplier, indicating the lot's movement to a new operation. Based on embedded business rules, the MDI recognizes the WIP movement event and performs a series of data receipt and data quality checks to ensure that all data deliverables that were required at the current operation were in fact met. If problems are detected, the MDI transmits a negative acknowledgement to the vendor through the B2B channel to signal that the lot should not move from the operation until the problem is resolved (which may involve reprocessing the lot, depending on the type of tool).

When the lot reaches the end of Vendor A's line segment, it must move to the next line segment. Vendor A first reports a "complete" event, announcing the end of processing at that line. The MDI may perform additional checks at this point to ensure that all requirements have been met before the product leaves Vendor A's line. As was described above, the MDI responds to any such checks that fail by transmitting a negative acknowledgement to the vendor through the B2B channel, to indicate that the lot cannot advance forward.

The Transition from Vendor to Vendor—"Where Next?"

Finally, Vendor A transmits a "ship notice" event to the supplier, announcing the shipment (or imminent shipment) of the lot. The lot is then packed, labeled, and shipped to its next destination. That destination may be Vendors B or C, or a "middle-man" agent, depending on whether or not the supplier or customer wishes to prevent vendors from being aware of one another. The destination may also be fixed or dynamic. If it is dynamic (i.e., the "where next?" decision is deferred until each lot reaches the end of a line segment), the supplier's MES backbone makes the destination information known to the vendor via the MDI (either via a B2B message, or through a service call from the vendor to the MDI).

As the supervisor and owner of the overall manufacturing process, the supplier must take some steps during the period when product is in transit from one vendor's line to another. The timing of these steps may vary, but typically they take place very soon after the product is in motion. Vendor A and Vendors B or C could be on separate continents from each other, or across the street. The closer they are, the more quickly product will move from one line to the next, so any operational data that the next line requires must be quickly fed forward to the next line to ensure it arrives in advance of the product.

The supplier, in its role as supervisor, has the responsibility for dynamic determination of product routing. As a product exits a manufacturing stage (e.g., at a vendor), the supplier should decide where it should go for the next stage of processing. This "where next?" decision may be based on capacity (one vendor may have available capacity while another does not), pricing, tax considerations, or geographic proximity. In our example scenario, Vendors B and C are both available to perform the same segment of the process, so the supplier must decide which of them will process our example lot after it exits Vendor A's line. Let us assume that the supplier's ERP systems "know" that Vendor C's line is fully loaded, so Vendor B is automatically chosen as the next destination for the lot. At this point, the MES backbone is updated to reflect that the next line segment for the lot will be Vendor B.

Figure 37:
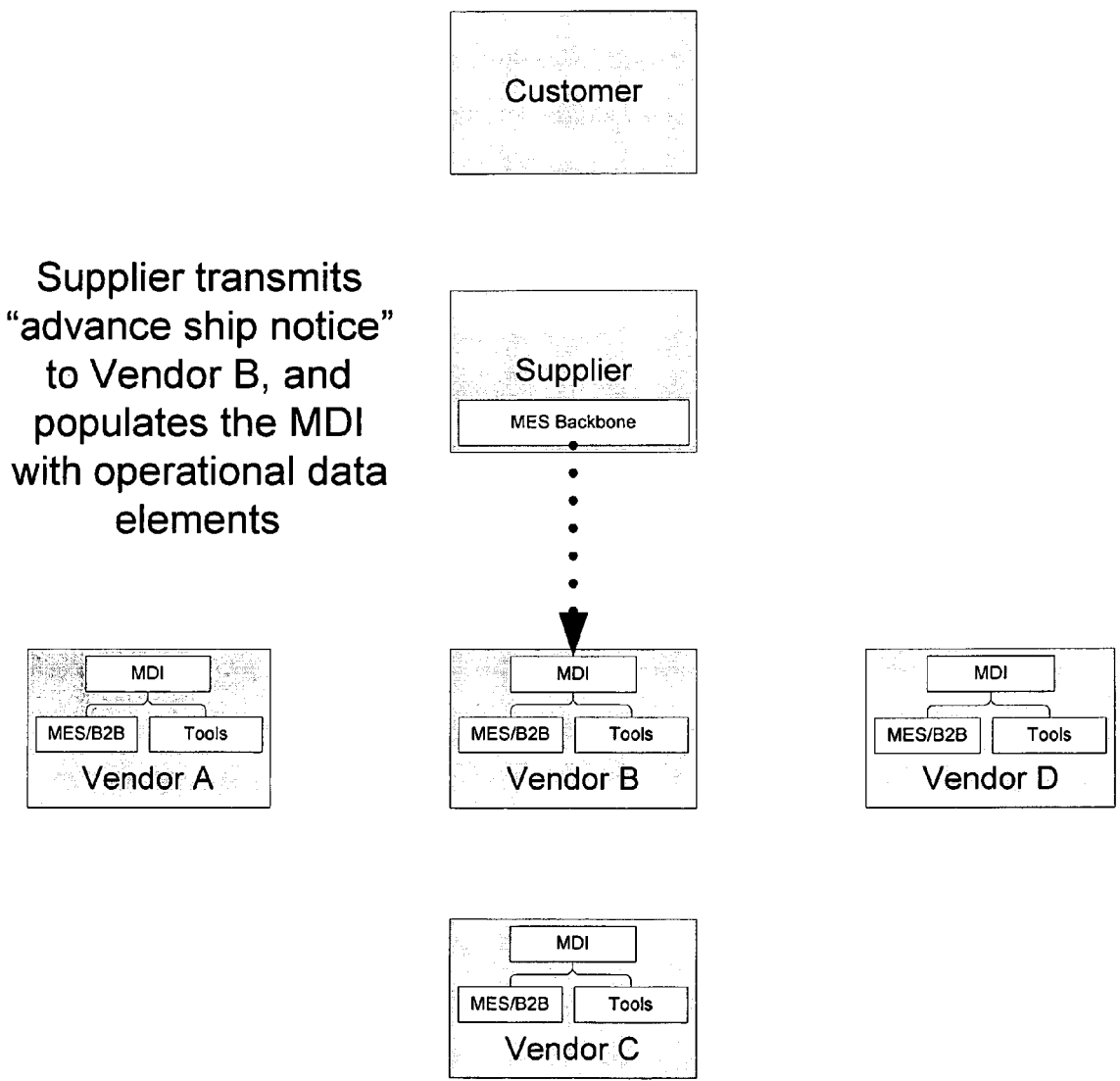
FIG. 37 illustrates in block form the advance ship notice and data feed forward functions.

As illustrated in FIG. 37, to facilitate the "feed-forward" of operational data from line segment to line segment, business logic in the supplier's MES/ERP domain triggers on key events that represent WIP movement, and invokes the appropriate services to locate and transmit the various data elements to the MDI at the destination location (in this case, Vendor B). At the same time, a set of B2B transmissions (one of which is commonly referred to as an "advance ship notice") is sent from the supplier to the next vendor to announce the pending arrival of the lot.

When Vendor B receives the B2B messages, the equivalent of a "start to build" is executed to instantiate the lot in the local MES. At this time, Vendor B may assign a local lot label, according to established local standards. However, if this is the case, either the vendor or supplier must be responsible for maintaining the association between the local lot label and the supplier's "end-to-end" lot label.

Some period of time later (depending on shipping specifics, distance, etc.), the product arrives at Vendor B's facility. Upon receiving the lot, Vendor B begins by transmitting a "receive" message to the supplier. This may occur before the product is unpacked and inspected, or afterward, depending on prior agreement between the supplier and Vendor B (the difference between these two options determines how/where cycle time is accounted for). A separate "start" message may also be transmitted to the supplier to announce the lot's release to the vendor's production line.

The lot now advances through Vendor B's line. As was discussed previously, the granularity of reports from Vendor B is dependant on mutual agreement between Vendor B and the supplier. It is important to note that the granularity for Vendor B may be very different than for Vendor A, depending on each vendor's capabilities, the nature of each vendor's line segment, etc.

Figure 38:
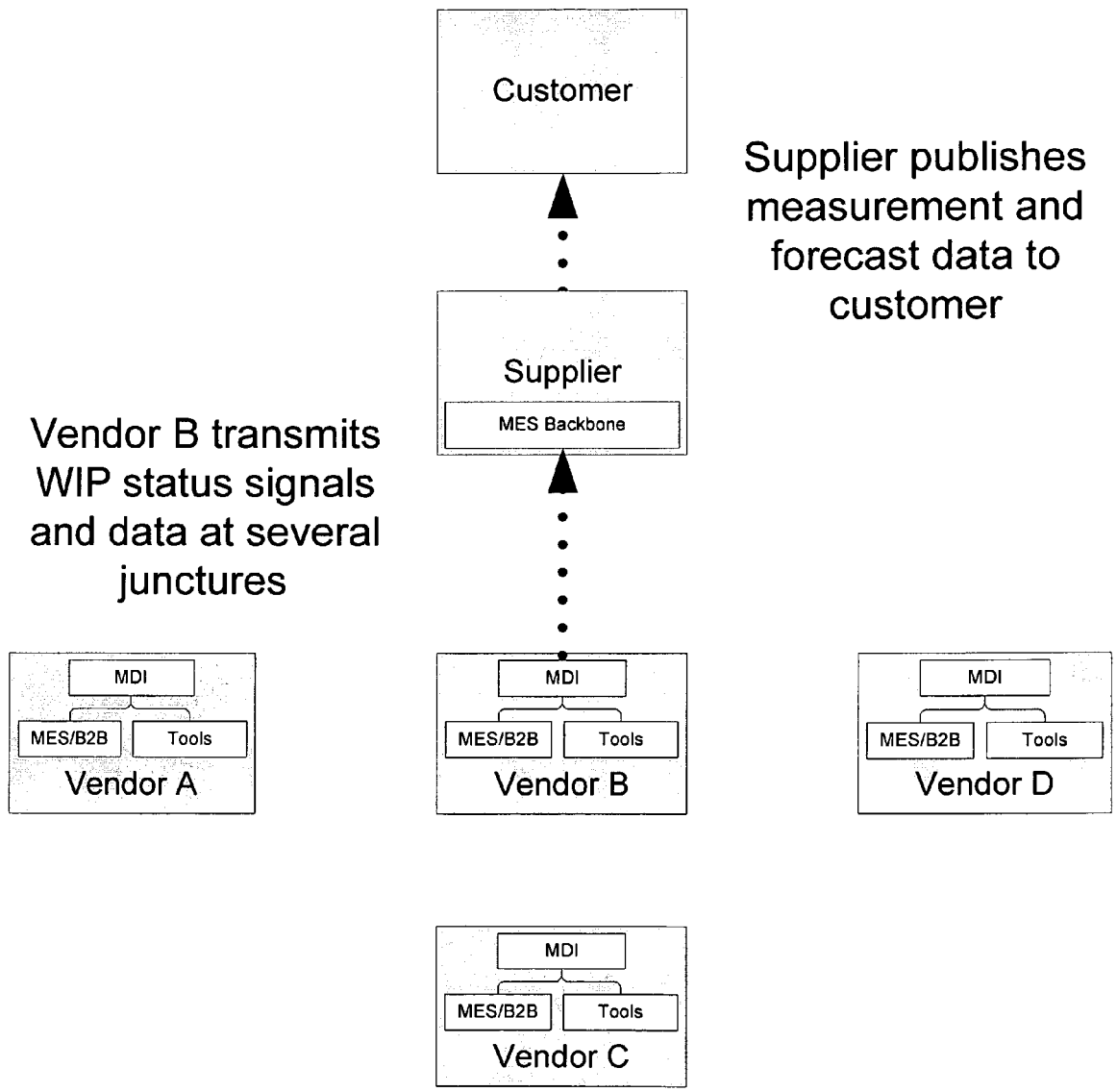
FIG. 38 illustrates in block form a vendor transmitting WIP updates and data to a supplier.

As illustrated in FIG. 38 as the lot progresses through Vendor B's line, it once again will come in contact with one or more tools, each of which will process or measure the lot in some way. At each tool, the MDI may supply any or all of the following elements: process rules, defect data from earlier processing, recipe data. Likewise, the MDI may collect from each tool any or all of the following: measurement data, new or aggregated defect data.

The MDI provides control and decision logic to directly support tools and the processes that surround them. Depending on the type of tool (measurement vs. process) and on the type of data, the MDI will invoke processes to accomplish any of these functions:

Aggregation or combination of defect data, category data, etc. (logically combining the results of multiple operations to create composite data that can be used to drive subsequent processing);

Disposition logic (on-the-fly analysis of defect or category data to determine the disposition of widgets, groups of widgets, or a lot). This logic may make decisions that result in some widgets being discarded as scrap, some being held for direct examination or investigation, and some being reprocessed;

Handling of lot divisions and combinations. When a lot is split into multiple parts, or multiple parts are combined to form a whole, the MDI must make adjustments to its working set to ensure that subsequent references to the lot(s) are properly associated with various data elements; and Assignment of lot labels. When lots are split or combined, lot labels must be generated algorithmically to ensure that traceability is maintained. The MDI provides a service that, when supplied with a "parent" lot label, will generate a related "child" lot label in accordance with the supplier's lot labeling rules.

Let us assume that Vendor B's tool is a measurement tool, and that the data it produces will be examined by the MDI to determine product disposition. As a result of that examination and determination, some widgets may need to be separated from the lot as scrap, or for further examination by Vendor B's technical staff.

The tool begins by requesting operational data from the MDI. This data, typically the results from one or more previous processing steps, determines some aspect of the tool's operation (for example, which widgets to measure, and to what extent). As the tool processes, data is collected and transmitted to the MDI. Among other things, this data indicates defect details or categorization of the widgets. The MDI examines this data and applies a set of supplier-defined rules to determine the disposition of the widgets. Many factors may be incorporated into the rules, including widget yield (how many widgets out of the entire lot are considered "good"), frequency of occurrence of one or more specific types of defects, results from related lots, etc. The collected data may also be used as input for subsequent manufacturing steps, used to influence how those steps are executed.

When processing completes, Vendor B consults the MDI to obtain disposition directives. The MDI allows a choice of interface methods, enabling the vendor to consult the disposition information manually (via an HTML-based web interface) or automatically (via a call from a vendor-supplied application to an MDI service). Which interface is used depends, of course, on the vendor's capabilities, or on their willingness to develop or purchase automation solutions.

Upon receiving the disposition information, Vendor B is instructed to handle the widgets in specific ways. Some widgets may be identified as requiring some additional processing or measurement. Others may be identified as scrap, and should be separated from the lot. Still others may require closer inspection, and should be held. For this example, let's assume that half the widgets in the lot have been identified as scrap and the other half have been identified as "good" (and should be sent forward in the manufacturing process). Under these conditions, the scrap widgets must be removed from the lot. This initiates a process known as "lot split".

Splitting a Lot

Whenever a set of widgets must be separated from a lot, the lot is said to be "split". A split can occur for a variety of reasons. Disposition directives may indicate that some widgets are scrap, and must be separated and discarded. One or more widgets may be accidentally broken or damaged, and must be separated for repair or disposal. Schedule demands may require that widgets that require some form of rework or repeat measurement be separated from their parent lot to enable the parent lot to continue rapidly advancing through the line. Regardless of the reason behind it, when a lot must be split, the vendor follows this general procedure:

1. Consult the MDI, presenting the current lot label, and obtain an algorithmically-generated "child" lot label. This lot label will be assigned to the widgets that will be removed from the "parent" lot. Like the disposition interface, the MDI offers multiple interface options for the lot label service. Thus the vendor has a choice of requesting this service manually (via a web interface), or automatically (via a service call from a vendor-supplied application to the MDI).

2. Split the lot on the local MES. Divide the widgets as directed by the MDI disposition (placing scrap widgets in the child lot, and leaving the remainder in the parent lot).

3. Report the split event to the supplier's MES backbone by transmitting a "split" message via the B2B channel. The "split" message must provide parent and child lot labels, as well as widget identity, so the split can be executed on the MES backbone identically to the local MES.

4. When the "split" message passes through the MDI, it will execute a local version of the split to ensure that the MDI's working set (defect maps, etc.) are kept in correct synchronization with the two instances of MES.

Of course, this process covers the logical aspects of splitting a lot. The vendor must also go through the steps that are required to physically separate the scrap widgets from the lot and, depending on the vendor/supplier relationship, the vendor may also be responsible for physically destroying or discarding them.

Once the logical and physical lot splits are completed, the parent lot (which still contains potentially good widgets) moves on to the next process step. At this point, as with other steps, the Vendor B may transmit another message to signify the completion of this step (and the transition to another).

Having moved through the one or more steps that comprise Vendor B's line, the lot has now reached the end of that line segment. At this point, Vendor B must execute the same basic sequence that Vendor A had to execute as the lot was leaving Vendor A's line on its way to Vendor B. First, a "complete" event is reported to the MES backbone, announcing the end of processing at that line. The MDI may perform checks at this point to ensure that all requirements have been met before the product leaves Vendor B's line. As was described above, the MDI responds to any such checks that fail by transmitting a negative acknowledgement to the vendor through the B2B channel, to indicate that the lot cannot advance forward.

Vendor B transmits a "ship notice" message to the supplier, announcing the shipment (or imminent shipment) of the lot. The lot is then packed, labeled, and shipped to its next destination.

Tracking, Reporting, and Forecasting

At this point let's take a moment to view the process from the supplier's perspective. As the lot has progressed through the various segments of the manufacturing line (spanning multiple vendors), the supplier has received a steady stream of status messages from the vendors, enabling the supplier to trace the status and progress of the lot. This, in turn, enables the supplier to locate the lot at any point in time, determine when the lot arrived at and left each operation (and therefore, how long the lot spent at each operation), project when the lot will exit the line and become available for consumption by the customer. This information can be published to the customer to enable more accurate forecasting, and to enable the customer to better balance supply and demand for their manufactured goods.

The supplier is able to combine its knowledge of the lot with other operational data (status of other lots, available capacity, demand forecast, schedules, etc.) to make real-time decisions and adjustments to the product routing. These decisions are projected downward onto the manufacturing process in various ways. For example, dynamic routing is accomplished at the MES backbone and ERP level by simply analyzing real-time demand and capacity data and selecting a product route that meets the conditions and constraints that are in effect when the lot passes across line segment boundaries. The processing of the lot can also be influenced through connected business logic (passed between the MES backbone and the individual MDIs)—directives can be sent to a specific MDI, for example, to reduce the quantity or frequency of measurement data collection in order to speed the process. Or, if a quality issue is discovered that affects a number of lots, dynamic adjustments can be made to the rules on one or more MDIs to influence disposition decisions and place widgets or lots on hold.

Of course, the specific examples are too numerous to fully explore in this example scenario. However, the key elements to recognize are the regular, near real-time, bidirectional exchanges of status data and control data, enabling the MES backbone and related systems to stay in close synchronization with the vendors' systems, and enabling the supplier to dynamically adjust the process to fit changing business requirements.

Vendor D—Final Assembly

Returning to the in-progress lot, which is now ready to exit Vendor B's line—let's assume that Vendor D, the fourth vendor in this scenario, performs final assembly of the widgets. After passing through this line segment, the widgets will be considered completed and are ready to be sold to the customer as finished goods. In truth, this may not be the true final stage of assembly, as there may still be additional steps that must be completed (packaging, quality assurance, etc.) before the customer can make use of the widgets. However, this is the end of the manufacturing process that is managed by the supplier, and is the point at which ownership of the goods (whatever their level of actual completion) is passed to the customer—i.e., they are sold.

In many ways, Vendor D is just like Vendor's B or C—as product is en route to Vendor D, the supplier will send a signal to announce the lot's pending arrival. This "advance ship notice", as described previously, will enable Vendor D to make the necessary preparations in the local MES and ERP systems so that the lot can be tracked, managed, and reported when it arrives.

The supplier also will transmit any operational data to Vendor D's MDI that the vendor's processes may require in order to process the lot. This may include lot attributes, data from prior processing (defect maps, for example), or updates to MDI's business rules.

Figure 39:
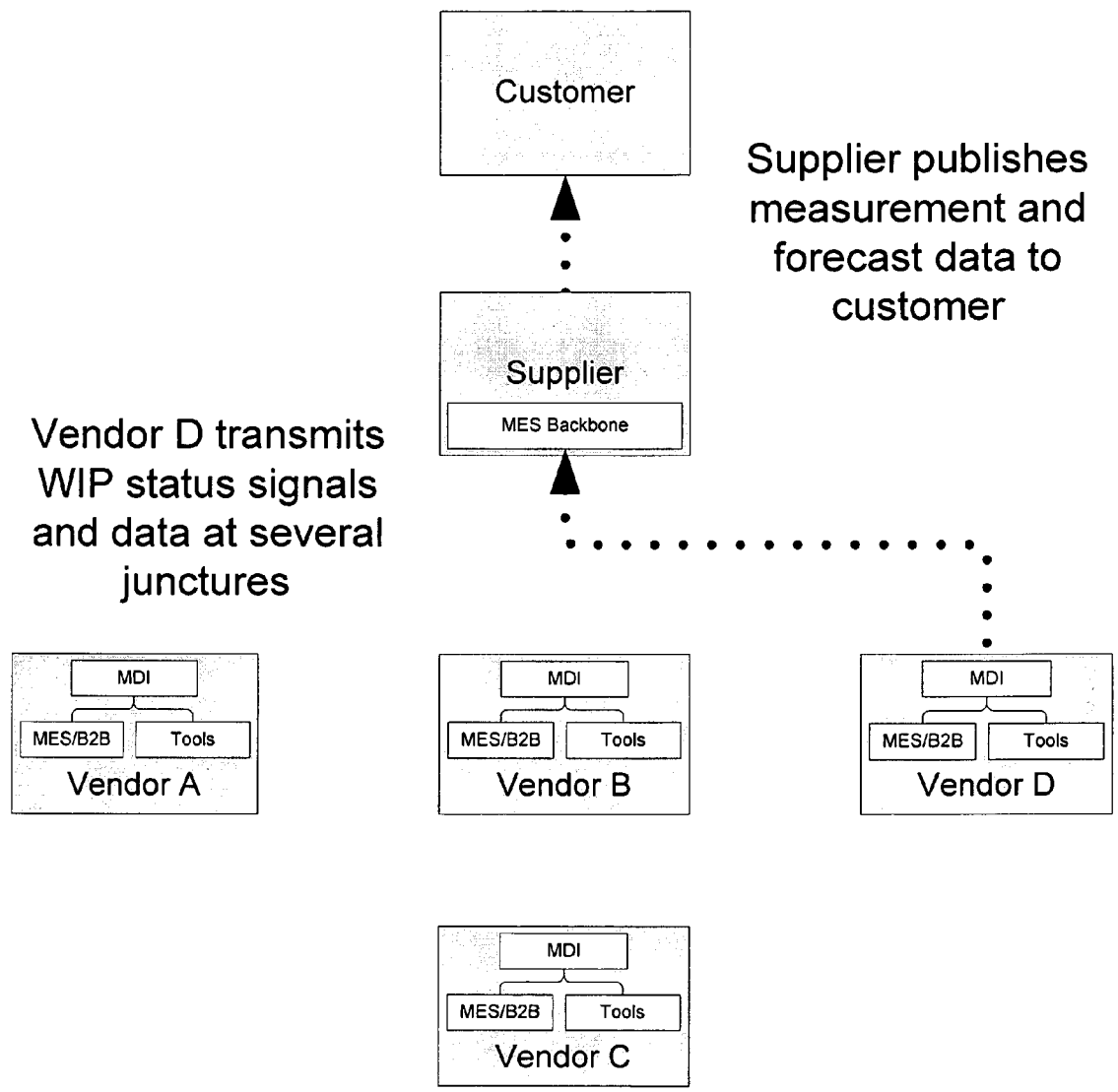
FIG. 39 illustrates in block form a vendor transmitting WIP updates and data to a supplier.

As illustrated in FIG. 39 Vendor D's processing of the lot is also quite similar to any other vendor in the manufacturing chain. As the lot passes through Vendor D's line, it will come in contact with one or more tools and/or operations each of which may require operational data from the MDI, and each of which may produce data that is of interest to the supplier, the customer, or both. And like the other vendors in the chain, Vendor D must send various signals to the supplier to enable tracking, reporting, and forecasting. These signals typically must include at least one "start" signal (announcing the lot's entry into Vendor D's line), several WIP status updates at the mutual discretion of the supplier and the vendor, and at least one "complete" signal to announce the completion of processing.

Figure 40:
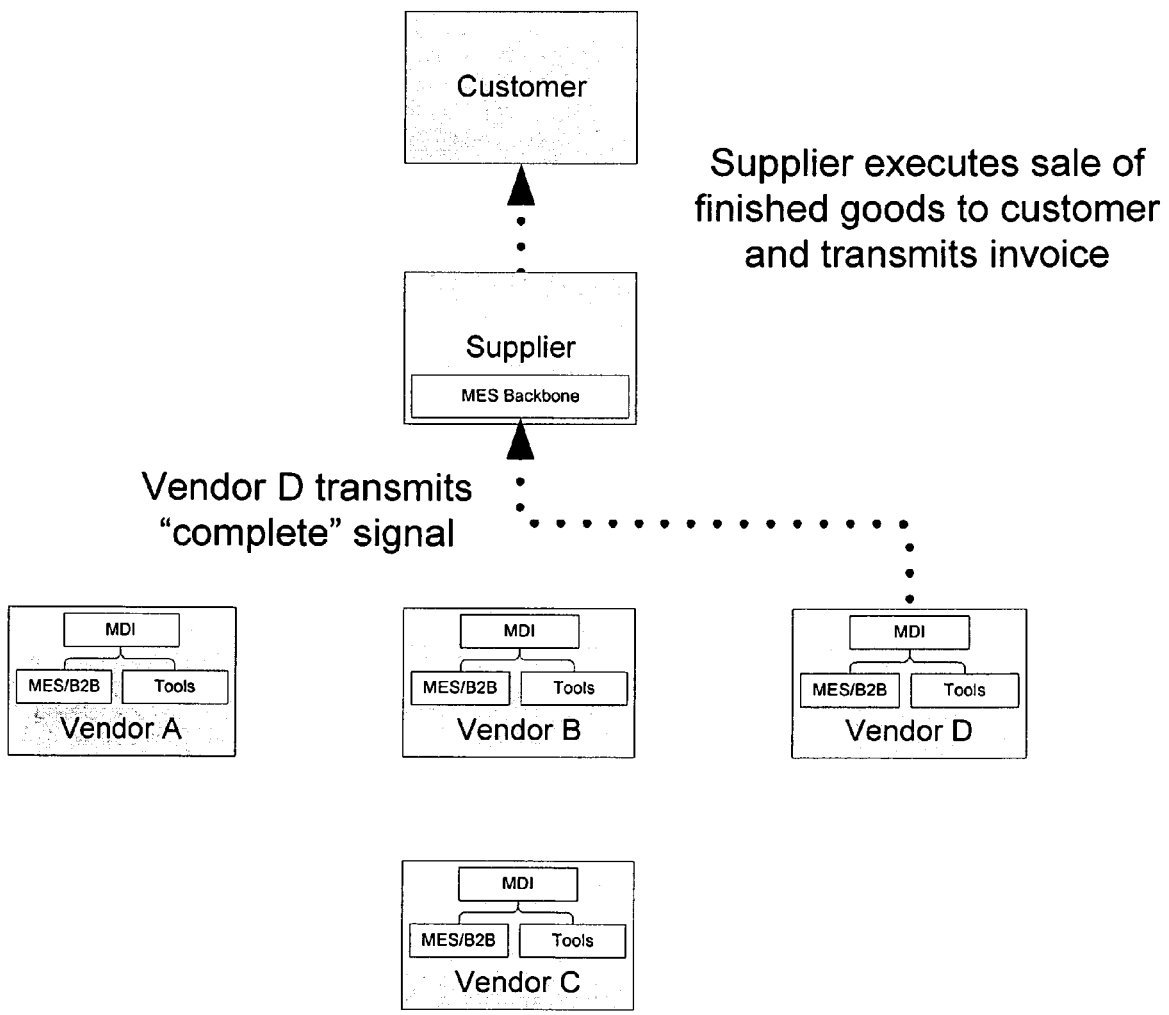
FIG. 40 illustrates in block form a vendor signaling lot completion.

In this particular scenario, as illustrated in FIG. 40, the supplier has a special interest in the "complete" signal from Vendor D. Since Vendor D has the final segment in the widget manufacturing line, widgets that exit Vendor D's line are ready for sale to the customer. Therefore, the supplier must react to completion of each lot so it can execute a sale of the goods to the customer, and so it can close accounting of the lot on its MES and ERP systems.

The "complete" signal transmitted by Vendor D may also contain additional information reporting the details of the final output from the line. For example, the vendor may provide their accounting of widget quantities. This provides the supplier with the opportunity to cross-check quantities (comparing the vendor's reported quantities with the quantities reported in the data collected automatically from the vendor's tools) before presenting the customer with an invoice for the widgets. If any discrepancy is discovered (either an error in the vendor's accounting, or a failure in the automation chain), the problem can be corrected without having to concern the customer.

Once Vendor D signals completion of the lot, and the supplier has executed the sale of the lot to the customer, the supplier has fulfilled its obligation to the customer, and the customer assumes responsibility for the disposition of that lot from there forward.

We have followed a set of widgets through the production processes of an imaginary widget manufacturing line, and have been able to see how the MES backbone is able to supervise and manage the end-to-end process. At all stages of the process, the supplier is able to track the progress of the lot through the manufacturing line because the backbone MES recorded the state and status of the lot from birth to sale. Assuming the supplier has some understanding of the various vendors' cycle times, the supplier also has the ability to predict when the lot could be expected to arrive at each manufacturing segment, and when the lot could be expected to exit the line and be available for sale.

Because the supplier is an active participant in the logistics of the manufacturing process, feeding data forward to each stage as it was required—the supplier has the ability to make dynamic routing adjustments as the lot advanced. If a vendor experiences a capacity constraint (tools unavailable, etc.), and an alternate vendor exists for that segment (for example, at the segment represented by vendors B and C), the supplier has the ability to route the lot to the available vendor. The supplier also has the ability to make other adjustments to the process in near real-time, updating business logic and transmitting updated data and directives to the various MDIs as required.

The MDI components play a dual role, acting as both a conduit through which the B2B messages passed (enabling those messages to drive business logic), and as a service provider to the vendors' local processes and tools. The MDIs supply operational data to the tools, helping drive their processing efficiently (maintaining defect data and enabling the tools to skip processing defective widgets, for example). The MDIs collect operational and measurement data from the tools, enabling the supplier to instantiate that data in its central information warehouse systems, and to subsequently publish that data to the customer. The data collected by the MDIs also serves to drive local decision processes affecting in-process widget disposition.

Through this invention, the supplier is able to utilize the infrastructure formed by the MES backbone and MDIs to integrate multiple disparate manufacturing line segments (possibly with significant geographical separation) into a single continuous manufacturing line, while at the same time enabling the product routing through that line to be tailored dynamically. The supplier is able to present the manufacturing process to the customer as a single entity, enabling the customer to receive tool data, WIP status, and forecast data to assist them in managing their product line.

The examples provided above are for illustration purposes and are not meant in any way to limit the scope of this invention. In addition, there are multiple ways to implement this invention, and there are various alternatives for the software components described in the embodiments proposed herein which one skilled in the art could apply to the invention taught herein. For example, webMethods, Inc. software could be used in place of Websphere Oracle's database can be used instead of DB2 and Fedelia software can be substituted for Tivoli. It is thus believed that the operation and construction of the present invention is apparent from the foregoing description. The description of the embodiments of the present invention is given above for the understanding of the present invention. It will be understood that the invention is not to the particular embodiments described herein, but is capable of various modifications, rearrangements and substitutions will now become apparent to those skilled in the art without departing from the scope of the invention. Therefore it is intended that the following claims cover all such modifications and changes as fall within the true spirit and scope of the invention.

What is claimed is:

1. A method for a supplier to manage the manufacture of a product using both supplier-owned and non-owned manufacturing asset types, wherein each asset type comprises a discrete manufacturing facility, the method comprising:
    creating, by a processor, a model for a product build process based on the asset types;
    using the model to provide routing from a node to instances of the asset types;
    instantiating a codified framework of rules and services at each instance of the asset types;
    controlling the product build process from the node according to the rules and services, wherein the codified framework comprises a Manufacturing Data Integrator (MDI) that aggregates process data across each instance of the asset types to the controlling node;
    introducing lots into the routing and the product build process via a Start Lot function comprising a lot start signal, a lot quantity, a product type, and lot attributes comprising a priority, quality codes, and a source manufacturing stage; and
    entering an event at each instance of the asset types, the event comprising at least one of an operation claim, a lot split, a lot merge, a Bill-of-Material (BOM) consumption, a lot hold, a lot release, a manufacturing stage complete, a ship event, and a lot attribute change.

2. The method according to claim 1 where the codified framework of rules and services communicates with the non-owned asset type MES.

3. The method according to claim 1 where the codified framework of rules is instantiated at the controlling node.

4. The method of claim 3 where the node is located at a supplier location.

5. The method of claim 4 where the instances of assets types are distributed around a central node as additional nodes in a star schema network.

6. The method of claim 1 where the routing also includes a channel for routing monitoring information and data.

7. The method of claim 5 also comprising the step of: providing a communication link from the supplier to a customer for the reporting of information from supplier non-owned assets.

8. The method of claim 1, also comprising the step of: grouping the asset types into manufacturing stages.

9. The method of claim 8, also comprising the step of: segmenting the manufacturing stages by operation.

10. The method of claim 9, also comprising the step of:
    determining transition points within a manufacturing stage to which gates can be applied and upon which the rules and services can act.

11. The method of claim 10 wherein a control point is within a gate.

12. The method of claim 10, wherein control points are placed between gates within a manufacturing stage.

13. The method of claim 8, also comprising the steps of:
    providing a rules and services for transporting data about WIP; and
    providing a control function which directs unfinished products at the completion of one manufacturing stage to one of a plurality of manufacturing assets at the next stage.

14. The method of claim 9, also comprising the step of: defining a set of attributes for lots to be carried with the lots through the manufacturing stages and transition points.

15. The method of claim 14, also comprising the step of: converting the set of attributes for transmission to a vendor's MES.

16. The method of claim 15, also comprising the step of: receiving transmissions from the vendor updating the set of lot attributes as it moves through the manufacturing stages.

17. The method of claim 15, also comprising the steps of:
    defining a lot label for the product;
    determining whether the vendor is able to carry the lot label on its MES; and
    operating in an alias or non-alias mode based on the determination.

18. The method of claim 1, wherein the method is executable by one or more processors.

19. A program storage device readable by machine, tangibly embodying a program of instructions executable by said machine for performing a method for a supplier to manage the manufacture of a product using both supplier-owned and non-owned manufacturing asset types, wherein each asset type comprises a discrete manufacturing facility, said method comprising:
    creating a model for a product build process based on the asset types;
    using the model to provide routing from a node to instances of the asset types;
    instantiating a codified framework of rules and services at each instance of the asset types;
    controlling the product build process from the node according to the rules and services, wherein the codified framework comprises a Manufacturing Data Integrator (MDI) that aggregates process data across each instance of the asset types to the controlling node;
    introducing lots into the routing and the product build process via a Start Lot function comprising a lot start signal, a lot quantity, a product type, and lot attributes comprising a priority, quality codes, and a source manufacturing stage; and entering an event at each instance of the asset types, the event comprising at least one of an operation claim, a lot split, a lot merge, a Bill-of-Material (BOM) consumption, a lot hold, a lot release, a manufacturing stage complete, a ship event, and a lot attribute change.

20. The program storage device according to claim 19 where the codified framework of rules and services communicates with the non-owned asset type MES.

21. A method for a supplier to manage the manufacture of a product using both supplier-owned and non-owned manufacturing asset types, wherein each asset type comprises a discrete manufacturing facility, the method comprising:
   creating, by a processor, a model for a product build process based on the asset types;
   using the model to provide routing from a node to instances of the asset types;
   instantiating a codified framework of rules and services at each instance of the asset types;
   controlling the product build process from the node according to the rules and services, wherein the codified framework comprises a Manufacturing Data Integrator (MDI) that aggregates process data across each instance of the asset types to the controlling node;
   defining a lot label for the product;
   determining whether a vendor is able to carry the lot label on its MES; and
   operating in an alias or non-alias mode based on the determination.

22. A method for a supplier to manage the manufacture of a product using both supplier-owned and non-owned manufacturing asset types, wherein each asset type comprises a discrete manufacturing facility, the method comprising:
   creating, by a processor, a model for a product build process based on the asset types;
   using the model to provide routing from a node to instances of the asset types;
   instantiating a codified framework of rules and services at each instance of the asset types;
   controlling the product build process from the node according to the rules and services, wherein the codified framework comprises a Manufacturing Data Integrator (MDI) that aggregates process data across each instance of the asset types to the controlling node;
   grouping the asset types into manufacturing stages;
   segmenting the manufacturing stages by operation;
   defining a set of attributes for lots to be carried with the lots through the manufacturing stages and transition points;
   defining a lot label for the product;
   determining whether a vendor is able to carry the lot label on its MES; and
   operating in an alias or non-alias mode based on the determination.

23. A program storage device readable by machine, tangibly embodying a program of instructions executable by said machine for performing a method for a supplier to manage the manufacture of a product using both supplier-owned and non-owned manufacturing asset types, wherein each asset type comprises a discrete manufacturing facility, said method comprising:
   creating a model for a product build process based on the asset types;
   using the model to provide routing from a node to instances of the asset types;
   instantiating a codified framework of rules and services at each instance of the asset types;
   controlling the product build process from the node according to the rules and services, wherein the codified framework comprises a Manufacturing Data Integrator (MDI) that aggregates process data across each instance of the asset types to the controlling node;
   defining a lot label for the product;
   determining whether a vendor is able to carry the lot label on its MES; and
   operating in an alias or non-alias mode based on the determination.

24. A program storage device readable by machine, tangibly embodying a program of instructions executable by said machine for performing a method for a supplier to manage the manufacture of a product using both supplier-owned and non-owned manufacturing asset types, wherein each asset type comprises a discrete manufacturing facility, said method comprising:
   creating a model for a product build process based on the asset types;
   using the model to provide routing from a node to instances of the asset types;
   instantiating a codified framework of rules and services at each instance of the asset types;
   controlling the product build process from the node according to the rules and services, wherein the codified framework comprises a Manufacturing Data Integrator (MDI) that aggregates process data across each instance of the asset types to the controlling node;
   grouping the asset types into manufacturing stages;
   defining a set of attributes for lots to be carried with the lots through the manufacturing stages and transition points;
   defining a lot label for the product;
   determining whether a vendor is able to carry the lot label on its MES; and
   operating in an alias or non-alias mode based on the determination.

* * * * *